United States Patent
Gustafson et al.

(10) Patent No.: US 9,347,320 B2
(45) Date of Patent: May 24, 2016

(54) TURBINE BUCKET PROFILE YIELDING IMPROVED THROAT

(71) Applicant: General Electric Company, Schenectady, NY (US)

(72) Inventors: Ross James Gustafson, Greenville, SC (US); Srinivasa Govardhan Jayana, Bangalore (IN); Spencer Aaron Kareff, Simpsonville, SC (US); Dipesh Dinesh Nanda, Bangalore (IN)

(73) Assignee: General Electric Company, Schenectady, NY (US)

( * ) Notice: Subject to any disclaimer, the term of this patent is extended or adjusted under 35 U.S.C. 154(b) by 462 days.

(21) Appl. No.: 14/061,146

(22) Filed: Oct. 23, 2013

(65) Prior Publication Data

US 2015/0107266 A1    Apr. 23, 2015

(51) Int. Cl.
*F01D 5/02* (2006.01)
*F01D 5/14* (2006.01)

(52) U.S. Cl.
CPC *F01D 5/02* (2013.01); *F01D 5/141* (2013.01); *F05D 2250/74* (2013.01); *Y02E 20/16* (2013.01); *Y02T 50/671* (2013.01); *Y02T 50/673* (2013.01)

(58) Field of Classification Search
CPC ....... F01D 5/02; F01D 5/141; F05D 2250/74; Y02E 20/16; Y02T 50/671; Y02T 50/673
See application file for complete search history.

(56) References Cited

U.S. PATENT DOCUMENTS

| | | |
|---|---|---|
| 3,844,679 A | 10/1974 | Grondahl et al. |
| 4,208,167 A | 6/1980 | Yasugahira et al. |
| 4,627,480 A | 12/1986 | Lee et al. |
| 5,282,721 A | 2/1994 | Kildea |
| 5,286,168 A * | 2/1994 | Smith ........................ F01D 5/16 416/193 A |
| 5,480,285 A * | 1/1996 | Patel ........................ F01D 5/141 416/223 A |
| 5,738,489 A | 4/1998 | Lee |
| 5,848,876 A | 12/1998 | Tomita |
| 5,980,209 A | 11/1999 | Barry et al. |
| 6,017,189 A | 1/2000 | Judet et al. |
| 6,072,829 A | 6/2000 | Dirr |
| 6,086,328 A | 7/2000 | Lee |
| 6,142,739 A | 11/2000 | Harvey |
| 6,190,130 B1 | 2/2001 | Fukue et al. |
| 6,241,467 B1 | 6/2001 | Zelesky et al. |
| 6,419,446 B1 | 7/2002 | Kvasnak et al. |
| 6,422,817 B1 | 7/2002 | Jacala |
| 6,491,496 B2 | 12/2002 | Starkweather |
| 6,579,066 B1 * | 6/2003 | Saito ........................ F01D 5/141 416/243 |

(Continued)

FOREIGN PATENT DOCUMENTS

EP    2479381 A1    7/2012

OTHER PUBLICATIONS

U.S. Appl. No. 14/060,996, Final Office Action 1 dated Mar. 4, 2016, 15 pages.

(Continued)

*Primary Examiner* — Igor Kershteyn
(74) *Attorney, Agent, or Firm* — Hoffman Warnick LLC; Ernest G. Cusick

(57) ABSTRACT

Turbine frequency tuning, fluid dynamic efficiency, and performance can be improved using a particular airfoil profile, which can be used to determine a throat between adjacent airfoils. By shaping the throat according to the particular profile, the total pressure at an endwall can be energized, improving performance of the turbine.

20 Claims, 9 Drawing Sheets

(56) References Cited

U.S. PATENT DOCUMENTS

| | | | |
|---|---|---|---|
| 6,722,851 B1 | 4/2004 | Brittingham et al. | |
| 6,761,535 B1 | 7/2004 | McGrath et al. | |
| 6,790,005 B2 | 9/2004 | Lee et al. | |
| 6,799,948 B2 * | 10/2004 | Ito | F01D 5/141 416/223 A |
| 6,957,949 B2 | 10/2005 | Hyde et al. | |
| 6,966,756 B2 | 11/2005 | McGrath et al. | |
| 6,969,232 B2 | 11/2005 | Zess et al. | |
| 7,048,509 B2 * | 5/2006 | Tominaga | F01D 5/14 416/223 A |
| 7,118,329 B2 | 10/2006 | Goodman | |
| 7,134,842 B2 | 11/2006 | Tam et al. | |
| 7,220,100 B2 | 5/2007 | Lee et al. | |
| 7,255,536 B2 | 8/2007 | Cunha et al. | |
| 7,281,894 B2 | 10/2007 | Lee et al. | |
| 7,377,746 B2 | 5/2008 | Brassfield et al. | |
| 7,416,391 B2 | 8/2008 | Veltre et al. | |
| 7,476,086 B2 * | 1/2009 | Wadia | F01D 5/141 416/223 R |
| 7,544,043 B2 | 6/2009 | Eastman et al. | |
| 7,597,539 B1 | 10/2009 | Liang | |
| 7,632,062 B2 | 12/2009 | Harvey et al. | |
| 7,674,093 B2 | 3/2010 | Lee et al. | |
| 7,731,483 B2 | 6/2010 | DeLong et al. | |
| 7,766,606 B2 | 8/2010 | Liang | |
| 7,931,444 B2 | 4/2011 | Godsk et al. | |
| 7,985,053 B2 | 7/2011 | Schott et al. | |
| 7,997,875 B2 | 8/2011 | Nanukuttan et al. | |
| 8,052,395 B2 | 11/2011 | Tragesser | |
| 8,092,178 B2 | 1/2012 | Marini et al. | |
| 8,105,031 B2 | 1/2012 | Trindade et al. | |
| 8,105,037 B2 | 1/2012 | Grover et al. | |
| 8,133,030 B2 | 3/2012 | Grafitti et al. | |
| 8,133,032 B2 | 3/2012 | Tibbott et al. | |
| 8,147,188 B2 | 4/2012 | Reeves et al. | |
| 8,172,533 B2 | 5/2012 | Pinero et al. | |
| 8,347,947 B2 | 1/2013 | Dube et al. | |
| 8,371,815 B2 | 2/2013 | Farrell | |
| 8,449,249 B2 * | 5/2013 | Suchezky | 29/889.22 |
| 8,568,097 B1 | 10/2013 | Liang | |
| 8,591,189 B2 | 11/2013 | Correia et al. | |
| 8,602,740 B2 * | 12/2013 | O'Hearn | F01D 5/141 416/191 |
| 8,647,066 B2 | 2/2014 | Guimbard et al. | |
| 8,647,067 B2 | 2/2014 | Pandey et al. | |
| 8,684,684 B2 | 4/2014 | Clements et al. | |
| 8,720,207 B2 | 5/2014 | Gersbach et al. | |
| 8,721,291 B2 | 5/2014 | Lee et al. | |
| 8,821,111 B2 | 9/2014 | Gear et al. | |
| 8,870,524 B1 | 10/2014 | Liang | |
| 8,870,585 B2 | 10/2014 | Lee et al. | |
| 8,967,959 B2 * | 3/2015 | Stein | F01D 5/141 415/192 |
| 9,103,213 B2 | 8/2015 | Barr et al. | |
| 9,188,017 B2 * | 11/2015 | Xu | F01D 8/041 |
| 2004/0081548 A1 | 4/2004 | Zess et al. | |
| 2007/0059173 A1 | 3/2007 | Lee et al. | |
| 2007/0059182 A1 | 3/2007 | Stegemiller et al. | |
| 2007/0128033 A1 | 6/2007 | Lee et al. | |
| 2007/0258810 A1 | 11/2007 | Aotsuka et al. | |
| 2007/0258819 A1 | 11/2007 | Allen-Bradley et al. | |
| 2008/0232968 A1 | 9/2008 | Nguyen | |
| 2009/0003987 A1 | 1/2009 | Zausner et al. | |
| 2010/0143139 A1 | 6/2010 | Pandey et al. | |
| 2010/0158696 A1 | 6/2010 | Pandey et al. | |
| 2010/0189023 A1 | 7/2010 | Lindgren et al. | |
| 2010/0196154 A1 | 8/2010 | Sakamoto et al. | |
| 2010/0278644 A1 | 11/2010 | Gersbach et al. | |
| 2011/0044818 A1 | 2/2011 | Kuhne et al. | |
| 2012/0163993 A1 | 6/2012 | Levine et al. | |
| 2012/0201688 A1 | 8/2012 | Mahle et al. | |
| 2012/0328451 A1 | 12/2012 | Lomas et al. | |
| 2013/0017095 A1 | 1/2013 | Lee et al. | |
| 2013/0108424 A1 | 5/2013 | Stein et al. | |
| 2014/0271225 A1 | 9/2014 | Herzlinger et al. | |
| 2015/0110639 A1 | 4/2015 | Herzlinger et al. | |
| 2015/0110640 A1 | 4/2015 | Herzlinger et al. | |
| 2015/0110641 A1 | 4/2015 | Herzlinger et al. | |

OTHER PUBLICATIONS

U.S. Appl. No. 14/061,221, Office Action 1 dated Mar. 14, 2016, 15 pages.

U.S. Appl. No. 14/061,193, Office Action 1 dated Mar. 16, 2016, 17 pages.

U.S. Appl. No. 14/061,363, Office Action 1 dated Mar. 28, 2016, 23 pages.

Booth et al., "Rotor-Tip Leakage: Part 1—Basic Methodology", Journal of Engineering for Power, Transactions of the ASME, vol. 104, Jan. 1982, pp. 154-161.

U.S. Appl. No. 14/061,107, Office Action dated Apr. 5, 2016, 15 pages.

* cited by examiner

TURBINE BUCKET PROFILE YIELDING IMPROVED THROAT

BACKGROUND OF THE INVENTION

The subject matter disclosed herein relates to turbine components for aircraft and power generation applications, and, more specifically, to turbine buckets including a base, an airfoil portion having a profile configured to yield a throat between adjacent airfoils that can increase total pressure at sidewalls of the airfoils.

Some aircraft and/or power plant systems, for example certain jet aircraft, nuclear, simple cycle and combined cycle power plant systems, employ turbines in their design and operation. Some of these turbines include one or more stages of buckets which during operation are exposed to fluid flows. Each bucket can include a base supporting a respective airfoil (e.g., turbine blade, blade, etc.) configured to aerodynamically interact with and extract work from fluid flow (e.g., creating thrust, driving machinery, converting thermal energy to mechanical energy, etc.) as part of, for example, power generation. As a result of this interaction and conversion, the aerodynamic characteristics and losses of these airfoils have an impact on system and turbine operation, performance, thrust, efficiency, and power at each stage.

BRIEF DESCRIPTION OF THE INVENTION

A first embodiment of the invention disclosed herein can include a turbomachine including a row of substantially identical buckets circumferentially mounted on a rotor, each bucket including a respective airfoil with opposed pressure and suction sidewalls extending chordwise between opposed leading and trailing edges and spanwise between a root and a tip. A flow passage between each pair of airfoils can include a pressure sidewall of a first airfoil and a suction sidewall of a second airfoil substantially facing the pressure sidewall of the first airfoil. A throat can include an area defined at least in part by a minimum gap between the pressure sidewall of the first airfoil and the suction sidewall of the second airfoil for each corresponding chord along spans of the first and second airfoils, an absolute value of a rate of change of the width of the throat versus span increasing with decreasing distance to at least one of the tips or the roots of the first and second airfoils within a first distance from the at least one of the tips or the roots.

In addition, a second embodiment of the invention disclosed herein can be implemented as a turbine with a plurality of airfoils mounted on a rotor of a turbine about an axis of rotation of the turbine in a substantially circumferential, spaced-apart fashion, each airfoil including respective opposed pressure and suction sidewalls extending chordwise between respective opposed leading and trailing edges and spanwise between opposed inner and outer endwalls, a respective root of each airfoil connected to one of the inner and outer endwalls, and at least one of the suction sidewall or the pressure sidewall including a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall. A total throat can include a component throat between adjacent airfoils of the plurality of airfoils, each component throat including a minimum gap between a pressure sidewall of a first airfoil and a suction sidewall of a second airfoil adjacent to the first airfoil for all corresponding points along spans of the first and second airfoils, a width of the component throat increasing with decreasing distance to at least one of the tips of the roots within a first distance away from the at least one of the tips or the roots.

Further, a third embodiment of the invention disclosed herein can take the form of a turbine system having a compressor section, a combustion section, and a turbine section, wherein a stage of the turbine section includes a plurality of substantially identical airfoils substantially circumferentially spaced apart about an axis of rotation of the turbine section, each airfoil including opposed pressure and suction sidewalls extending chordwise between opposed leading and trailing edges and spanwise between opposed respective roots and tips. At least one of the suction sidewall or the pressure sidewall of each airfoil can include a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall. A total throat can include a component throat between each pair of adjacent airfoils, each component throat including an area defined at least in part by a minimum gap between a pressure sidewall of a first airfoil and a suction sidewall of an adjacent second airfoil for all points along spans of the first and second airfoils, a width of the component throat increasing with decreasing distance to the roots of the first and second airfoils within a first distance from the roots and within a second distance from the tips.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-9, like numbering may represent like elements. Redundant explanation of these elements has been omitted for clarity. Finally, it is understood that the components of FIGS. 1-9 and their accompanying descriptions may be applied to any embodiment described herein.

DETAILED DESCRIPTION OF THE INVENTION

Aspects of the invention provide for a turbine bucket including improved features, such as an airfoil including a particular profile and/or a fillet on an end of the airfoil that can yield a performance-enhancing throat of a turbine stage. In addition, thermal and mechanical operating requirements for a given stage can be met, component lifetime can be improved, cost can be lowered, and/or any other suitable system requirement and/or design goal can be improved.

In addition, aspects of the invention include a turbine bucket including a base supporting an airfoil at a first end of the airfoil. A top portion of the base at the first end of the airfoil can be construed as a platform or as an endwall. The airfoil can have a profile that can enhance fluid flow over the airfoil and/or over the endwall. The profile of the airfoil can be defined using multiple sets of two-dimensional coordinates, each set being provided for a respective section of the respective profile along the span of the airfoil. The profile can be used to determine and/or design a throat of a stage including the bucket and/or profile to enhance fluid flow from the stage to a next stage or other portion of a turbine in which the bucket is employed.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along any radius r extending substantially perpendicular to a rotational or longitudinal axis A, also called an axis of rotation. Additionally, the terms "circumferential" and/or "circumferentially" refer to the relative position/direction of objects along a circumference which surrounds axis A but does not intersect axis A at any location.

Figure 1:
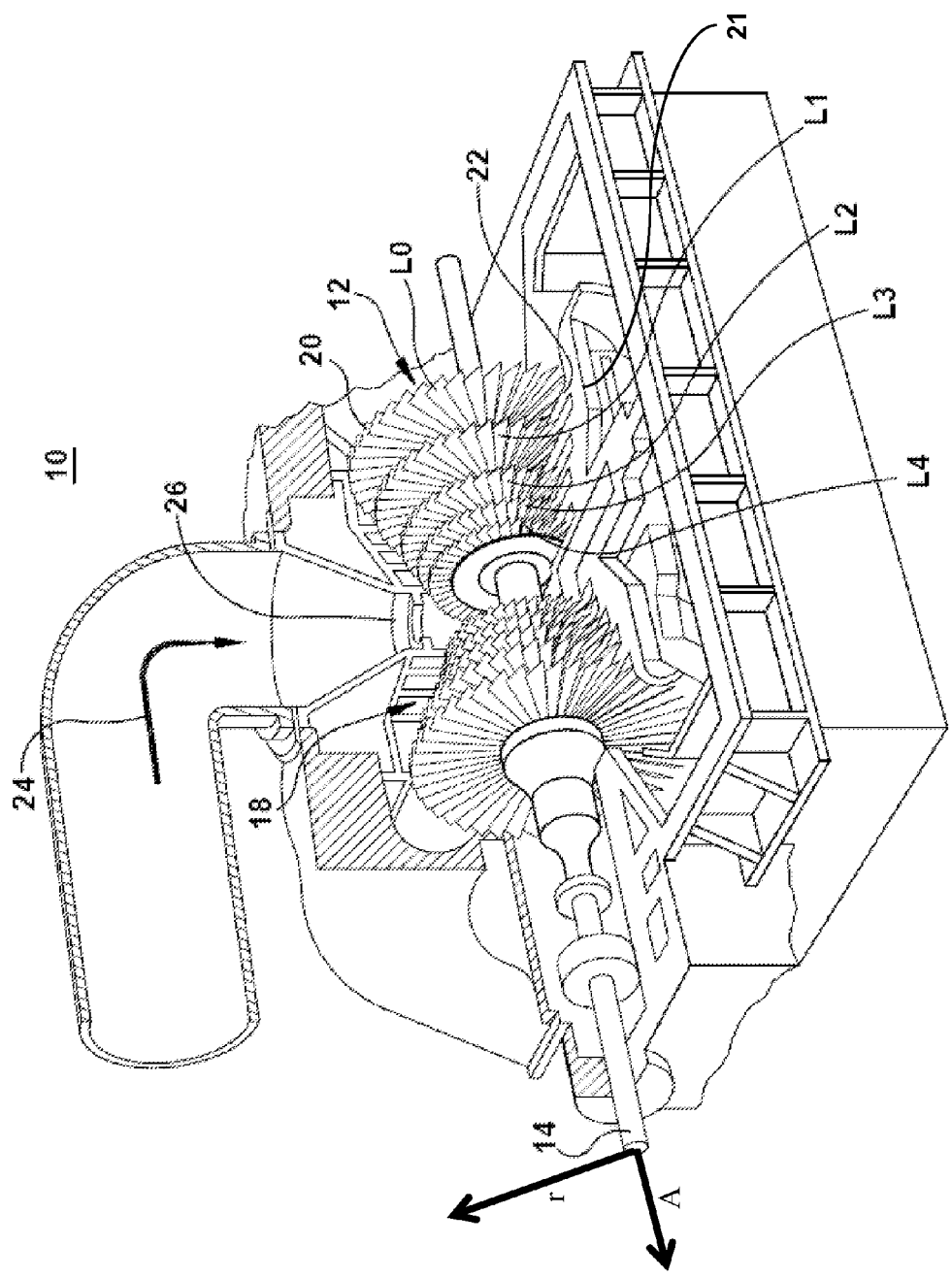
FIG. 1 shows a three-dimensional partial cut-away perspective view of a portion of a turbine according to an embodiment of the invention.

Referring to the drawings, FIG. 1 shows a perspective partial cut-away illustration of a turbine 10, such as a gas or steam turbine. Turbine 10 can include a rotor 12 that with a rotating shaft 14 and a plurality of axially spaced rotor wheels 18. A plurality of dynamic blades or buckets 20 can be mechanically coupled to each rotor wheel 18, and can be arranged in a row that can extend circumferentially around a respective rotor wheel 18. So arranged, when a rotor wheel 18 rotates, its respective dynamic blades or buckets 20 can revolve about an axis of rotation of the respective rotor wheel. A nozzle 21 can support a plurality of stationary blades or nozzles 22 circumferentially around shaft 14 between adjacent rotor wheels 18 and/or rows of dynamic buckets 20. Blades or nozzles 22 can cooperate with dynamic blades or buckets 20 to form a stage of turbine 10 and to define a portion of a flow path through turbine 10. As shown, nozzle 21 can at least partially surround rotor 12 (shown in this cut-away view) and in embodiments can completely surround rotor 12.

While turbine 10 is shown in FIG. 1 as a dual-flow turbine 10 with an axially centered inlet mouth feeding two sets of turbine stages, various teachings disclosed herein can be applied to any suitable turbine, such as an axial turbine with a single primary direction of flow. For example, various teachings herein can be applied to an axial inlet gas turbine in which a combustion gas passes through an inlet at a first axial end, any stages of the turbine, and an outlet at a second axial end of the turbine, which enables the gas to perform mechanical work on the turbine.

In operation of the example turbine 10 shown in FIG. 1, gas 24 can enter an inlet 26 of turbine 10 and can flow and/or be directed through stationary blades or nozzles 22. Stationary blades or nozzles 22 can direct gas 24 against dynamic blades or buckets 20 so that gas 24 can pass around and/or over dynamic blades or buckets 20. As a result of aerodynamic interaction between dynamic blades or buckets 20 and gas 24, dynamic blades or buckets 20 can impart rotation to rotor wheel 18. In embodiments of the invention disclosed herein, turbine 10 can include multiple stages, which can each include a respective row of stationary blades or nozzles 22 in nozzle 21 and a respective row of dynamic blades or buckets 20 on a respective rotor wheel 18. It should be understood that, while there may be a plurality of rotor wheels 18, they can all be affixed to shaft 14 so as to rotate in unison, all dynamic blades or buckets 20 thus imparting rotation on shaft 14 in concert.

In the example shown in FIG. 1, turbine 10 can include five stages identified as a first stage L4, a second stage L3, a third stage L2, a fourth stage L1, and a fifth stage L0, which is also the last stage. Each stage has a respective radius, with first stage L4 having the smallest radius of the five stages and each subsequent stage having a larger radius, with fifth stage L0 having a largest radius of the five stages. While five stages are shown in FIG. 1, this simply a non-limiting example, and the teachings herein can be applied to turbines having more or fewer stages, including a turbine with a single stage. In addition, while the example shown in FIG. 1 is stationary, the teachings herein can be applied to any suitable turbine, including turbines used in aircraft engines, and may also be applied to compressors.

Figure 2:
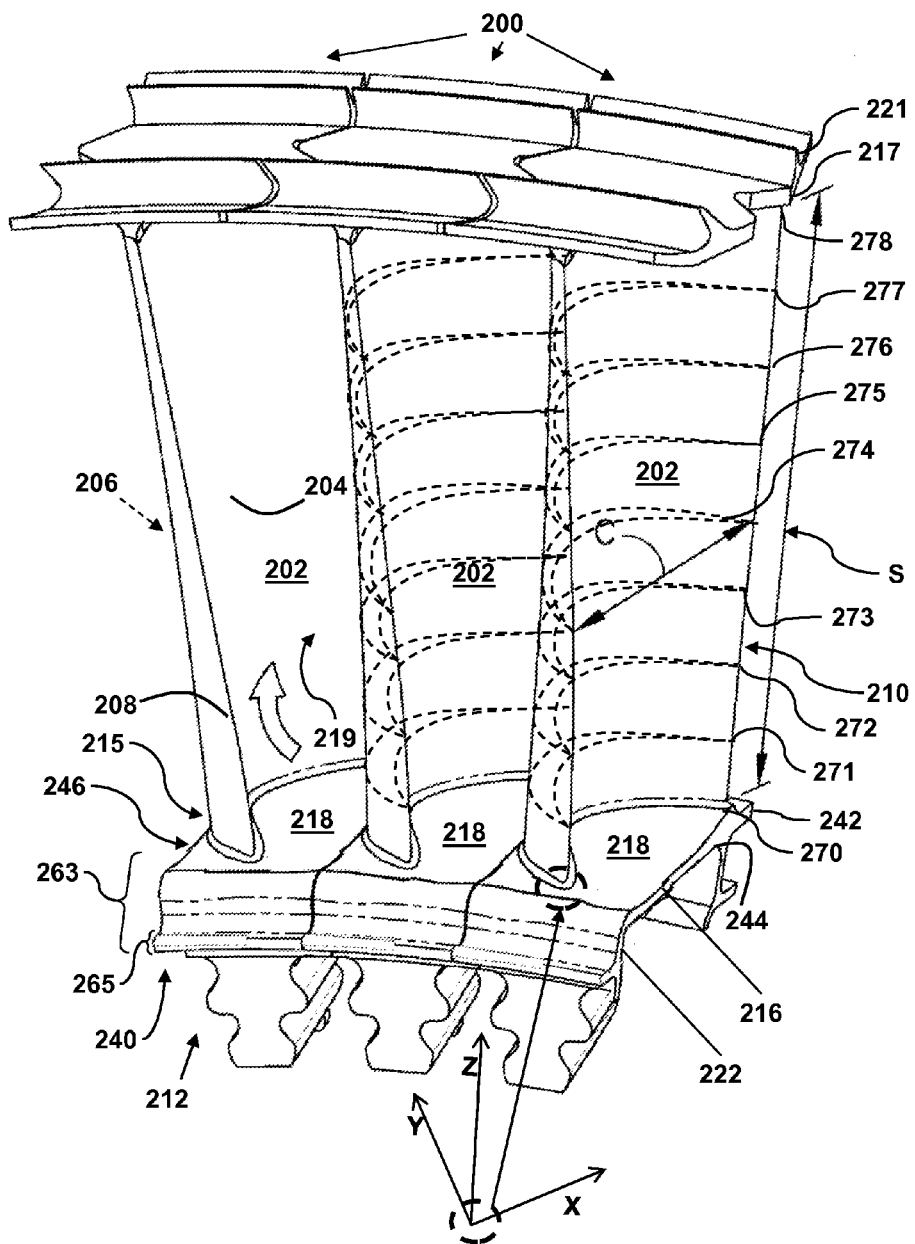
FIG. 2 shows a portion of a set of buckets according to embodiments of the invention disclosed herein.
Figure 3:
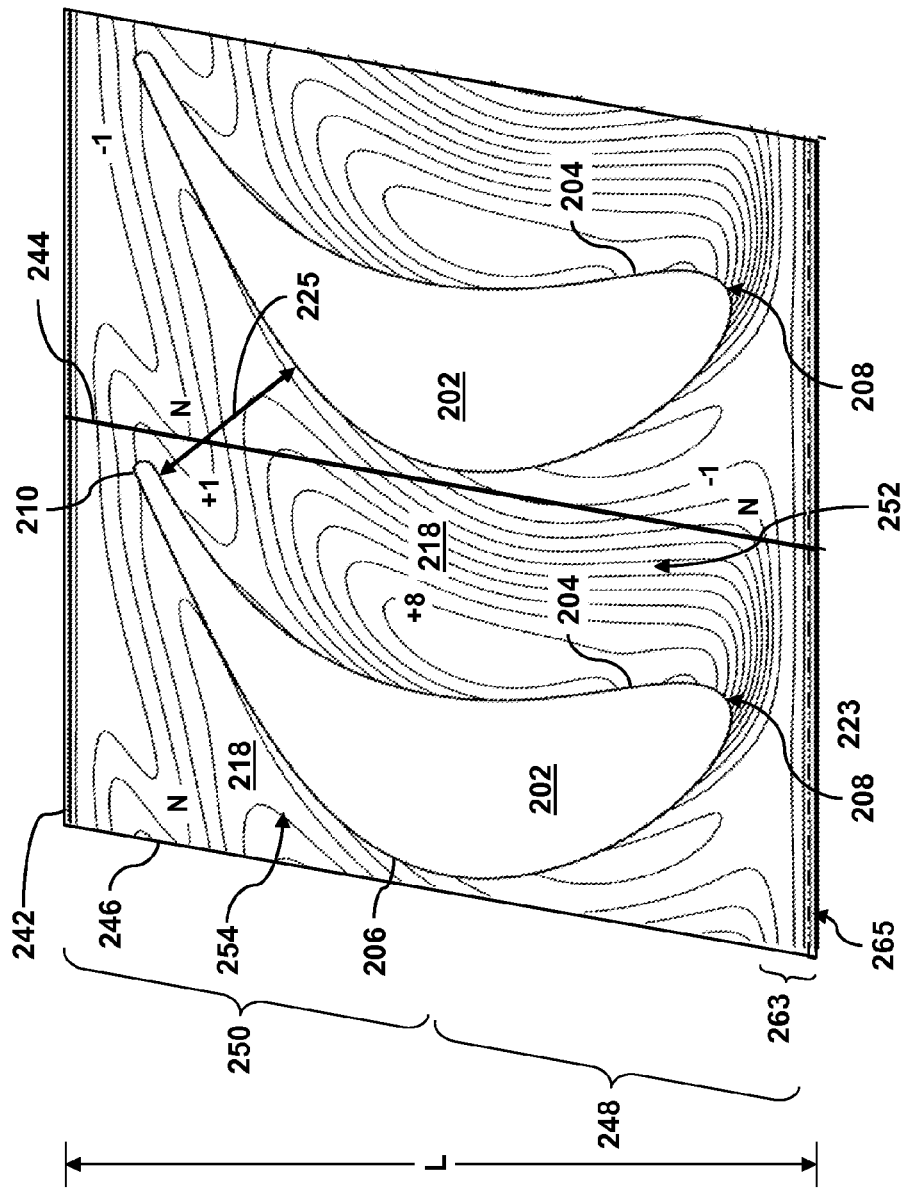
FIG. 3 shows a cross sectional view of a pair of the buckets according to embodiments of the invention disclosed herein and shown in FIG. 2 taken along corresponding sections 271.
Figure 4:
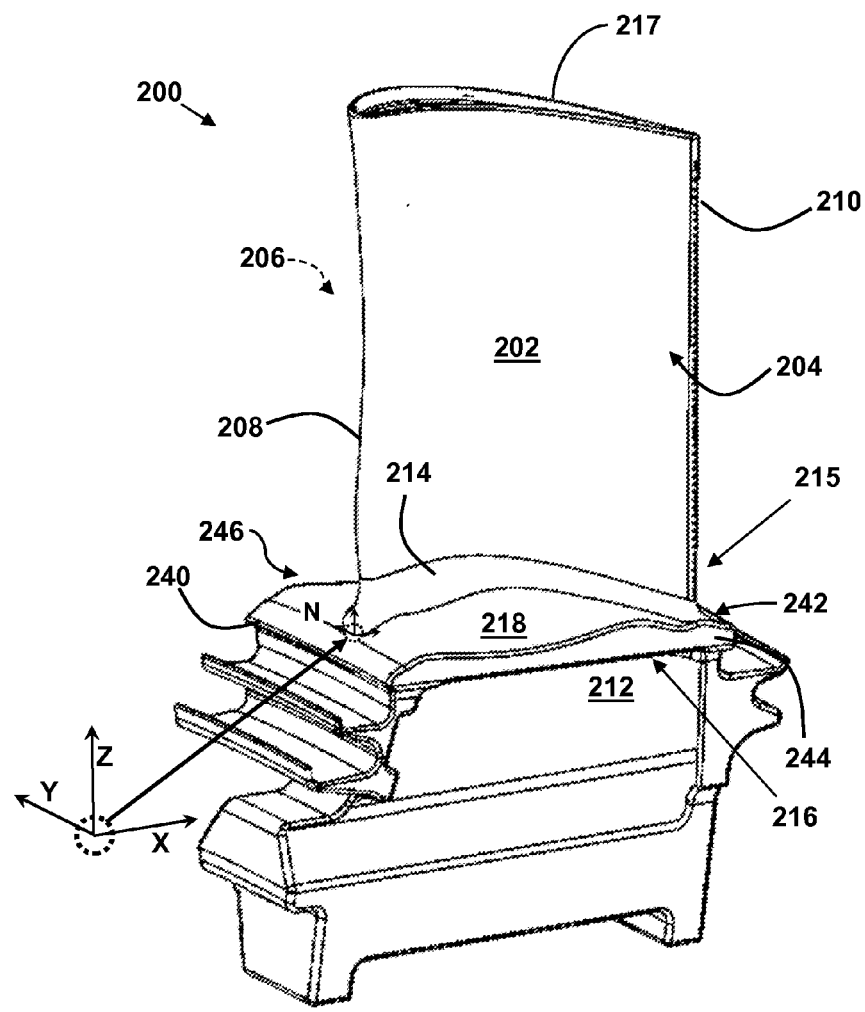
FIG. 4 shows a perspective view of a turbine bucket according to embodiments of the invention disclosed herein.

Each set of blades 20, 22 has a number of factors that can affect performance of turbine 10. For example, FIGS. 2 and 3 illustrate part of a set of circumferentially spaced-apart blades 200, which will be described as dynamic blades or buckets 20 of a rotor wheel 18, though aspects of the description can apply to sets of stationary blades or nozzles 22 depending on a particular implementation. Additional reference can be made to FIG. 4, which shows a single bucket 200 of embodiments in perspective. It is understood that bucket 200 can be configured to couple (mechanically couple via fasteners, welds, slot/grooves, contact, etc.) with a plurality of similar and/or distinct buckets (e.g., buckets 200 or other buckets) to form a set of buckets in a stage of the turbine. In addition, bucket 200 can be attached to a rotor wheel to form a set of buckets, which rotor wheel can be mounted on a shaft with fasteners, slots and grooves, welds, and/or other devices and/or techniques, and/or a hub of the rotor wheel can be integral with the shaft, and/or the hub can include a portion of the shaft that can be attached to other portions of the shaft via any suitable coupling.

Each bucket 200 can include an airfoil 202 with a pressure sidewall 204 and an opposed suction sidewall 206, as well as a leading edge 208 and a trailing edge 210. Each airfoil 202 can include a chord C between leading edge 208 and trailing edge 210 such that pressure and suction sidewalls 204, 206 can be said to extend in chord or chordwise between leading edge 208 and trailing edge 210. Airfoil 202 can be supported by a base 212, and a fillet 214 can connect a first end 215 of airfoil 202 to a first endwall 216, such as a radially inner endwall. Fillet 214 can include a weld or braze fillet, which can be formed via conventional MIG welding, TIG welding, brazing, etc., and can include a profile that can reduce fluid dynamic losses as a result of the presence of fillet 214. In embodiments, base 212, airfoil 202, and fillet 214 can be formed as a single component, such as by casting and/or machining and/or 3D printing and/or any other suitable technique now known or later developed and/or discovered.

As is known in the art, base 212 can be designed to fit into a mating slot in a hub of a rotor wheel and/or a turbine rotor shaft, such as shaft 14 of FIG. 1, and can engage and/or mate with adjacent base components of other buckets 200 if desired and/or suitable. In the case of a stationary blade or nozzle, base 212 can be designed to fit into a slot or other mounting feature in a nozzle of a turbine, such as nozzle 21 of FIG. 1. In embodiments, because base 212 of dynamic blade or bucket 200 can have a relatively large mass, base 212 can be designed to be located radially inboard of airfoil 202 to reduce forces and stresses arising from revolution of bucket 200 about an axis of rotation during rotation of a respective rotor wheel and/or turbine shaft. Should appropriate materials and/or techniques be developed, base 212 and/or endwall 216 could instead be designed to be radially outward of airfoil 202. In addition, in embodiments in the case of a stationary blade or nozzle, the corresponding base can be radially outward of the corresponding airfoil.

Airfoil 202 of dynamic blade or bucket 200 can extend radially from endwall 216 and can further have a span S between first end 215 and a second end 217 of airfoil 202. Pressure and suction sidewalls 204, 206 can be said to extend in span or spanwise between first and second ends 215, 217 of airfoil 202. That is, each bucket 200 can include an airfoil 202 having opposed pressure and suction sidewalls 204, 206 extending in chord or chordwise between opposed leading and trailing edges 208, 210 and extending in span or spanwise between opposed first and second ends 215, 217 of airfoil 202.

First endwall 216 can include a first contour 218 in embodiments that can be described relative to a nominal surface N of endwall 216. Nominal surface N need not be an actual, physical surface, and instead can simply be a frame of reference. While any surface can be employed, in embodiments, referential or nominal surface N can be substantially cylindrical and located at any suitable known location. For example, nominal surface N can be located at a known radius of curvature, such as a radial distance from an axis of rotation of turbine 10 and/or where a surface of an uncontoured endwall ordinarily would be.

With particular reference to FIG. 3, each passage 219 between each pair of airfoils 202 can be regarded as bounded by pressure sidewall 204 of a first airfoil 202, suction sidewall 206 of a second airfoil 202, and portions of first endwall 216 of each of the first and second buckets 200. In embodiments, second end 217 of each airfoil 202 can end in proximity to a second endwall 221, such as a radially outer endwall or shroud, and portions of adjacent second endwalls 221 can act as an additional boundary of passage 219. In additional embodiments, particularly where airfoils 202 are part of stationary blades or nozzles, second end 217 of each airfoil 202 can be connected to endwall 221.

Figure 5:
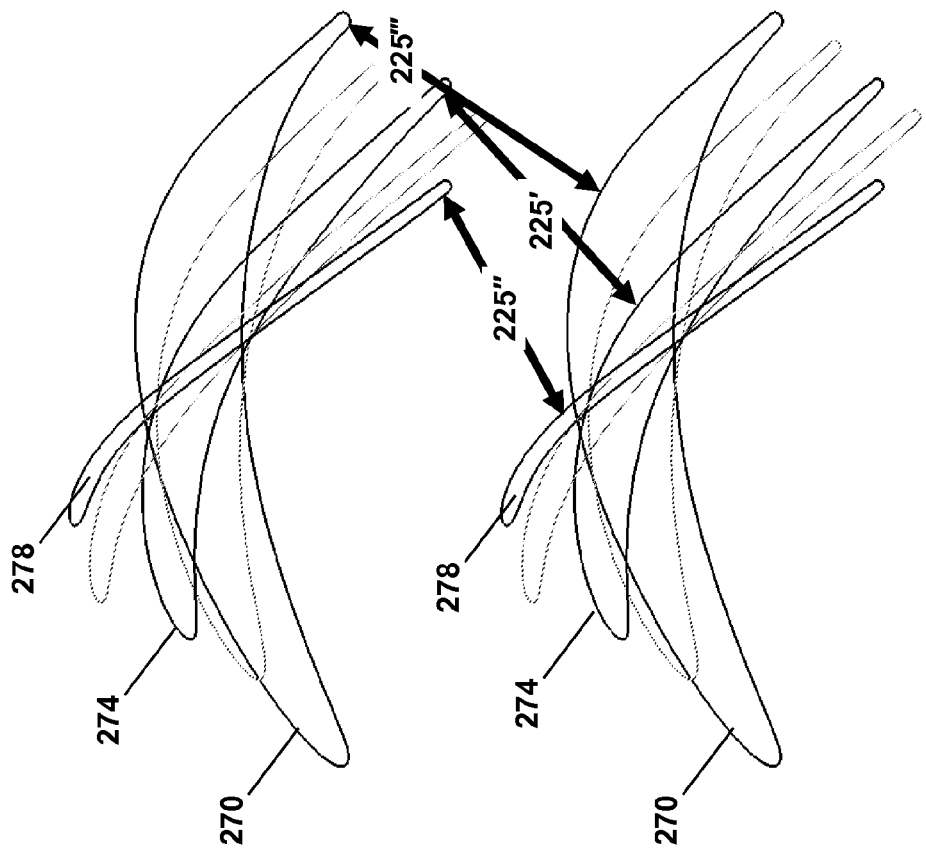
FIG. 5 shows a representation of a throat between a pair of adjacent buckets employing an airfoil profile according to embodiments of the invention disclosed herein viewed from tips of the buckets toward roots of the buckets.

Passage 219 can have at least one minimum gap 225 between airfoils 202 along corresponding chord lines C at a point along spans S of airfoils 202. The combined minimum gaps 225 of all corresponding chord lines along spans S can define a throat of the pair of airfoils 202, which is an area that can be visualized as a virtual surface. In embodiments, every throat between a respective pair of airfoils of a stage of buckets can be substantially identical, in part to avoid vibration that can be introduced by different flow rates in respective throats, which can damage a given stage of buckets or even an entire turbine. Thus, the sum of the throats of a stage of buckets 200 can be used to determine a total minimum area of the stage, which can be important to performance of and/or used to analyze and/or design a rotor wheel 18 and/or turbine 10.

Where surfaces and edges of a pair of airfoils extend substantially along respective radii of a respective rotor wheel, the throat can be determined by measuring minimum gap at a few points, such as near the inner endwall, midspan, and near the outer endwall, averaging the values measured, and multiplying the average by the span of the airfoils. The resulting minimum area between the airfoils can be visualized as a virtual surface of substantially a quadrilateral shape and substantially planar. However, airfoil 202 can be a high-performance airfoil as seen, for example, in FIG. 4, with a more complex shape and/or profile that can include curvature, twists, and other variations. As a result, a throat between two such more variable airfoils can be complex, as illustrated and/or visualized in FIGS. 5 and 6. In FIG. 5, two adjacent buckets 200 employing twisted or otherwise variable airfoils are shown, viewed from tips 217 toward roots 215. As can be seen, the orientation and length of minimum gap 225 can vary, illustrated by minimum gap 225' at tips 217, minimum gap 225" at midspan, and minimum gap 225'" at roots 215. Thus, minimum gap 225 can define a throat as a complex area or virtual surface 227 shown in FIG. 6. Applying techniques used for simpler airfoils can therefore introduce error, such as up to 20%, which can be significant in design and analysis of a stage of buckets 200 and turbine 10 as a whole. In addition, while typical inner and/or outer endwalls can be substantially uniform, inner and outer endwalls 216, 221 can include contours, which can further complicate determination of the throat. Such more complex profiles and/or contours can produce more efficient flow in passage 219, as well provide additional space for cooling passages and/or support structures within parts of a bucket.

Determination of throat 227 between pairs of high-performance airfoils 202 can be aided using a set of coordinates describing and/or defining the three-dimensional profile of each airfoil. For example, a unique set or loci of points in space can be provided, such as those listed in TABLE I, below, and can meet stage requirements for manufacture and performance. The loci of points can be arrived at by iteration between aerodynamic, thermal, and mechanical loadings enabling operation in an efficient, safe, and smooth manner. The loci, as embodied by the invention, can define the bucket airfoil profile for airfoil 202 and can comprise a set of points relative to any suitable frame of reference and/or origin, such as the axis of rotation of turbine 10, a coordinate system of turbine 10, and/or an origin located at a desired and/or suitable point of the airfoil and/or base and/or any other suitable component.

For example, a Cartesian coordinate system of X, Y, and Z values can be used to define a profile of airfoil 202, such as the values listed in TABLE I, below. With the origin at leading edge 208 in nominal surface N, the X and Y axes can be rotated such that the X axis extends along a chord of airfoil 202 at the nominal surface N, and such that the Y axis lies orthogonal to the X axis in the nominal surface N. The Z axis can then extend radially away from nominal surface N. Any other suitable orientation of the axes relative to airfoil 202 can be used so long as such orientation is taken into account in the resulting coordinate values. In embodiments, the coordinate system that defines the profile can be based on its own geometry and thus can be used to produce an airfoil with the described profile regardless of its location.

With reference to FIG. 2, a plurality of points 270-278 along span S, including root 215 and tip 217, can correspond to Z coordinate values of chord lines, and a cross section of airfoil 202 at each point can be described by a respective set of X and Y coordinates. For example, 100 points can be listed for each of pressure side 204 and suction side 206 for each cross section 270-278, though it should be apparent that more or fewer points can be used for each cross section, and more or fewer cross sections can be used, as may be desired and/or appropriate. The X, Y, and Z coordinate values in TABLE I have been expressed in non-dimensionalized form representing normalized distances in values that can range from −1 to 1, but it should be apparent that any or all of the coordinate values could instead be expressed in distance units so long as the proportions are maintained. TABLE I includes the heading, "Non-Dimensionalized (X Y Z/Span)," and in embodiments a desired span can be used to convert a coordinate value of TABLE I to a respective coordinate value in units of distance, such as inches or meters. In other words, the non-dimensional values given in TABLE I can be multiplied by a desired span of airfoil 202, such as, for example, a desired span of between about 3 inches and about 10 inches, such as between about 5 inches and about 8 inches, to obtain coordinate values in units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the airfoil profile.

The 2,200 points for the coordinate values shown in TABLE I are generated and shown to three decimal places for determining the profile of a nominal airfoil 202 at ambient, non-operating, or non-hot conditions, and do not take any coatings or fillets into account, though embodiments could account for other conditions, coatings, and/or fillets. To allow for typical manufacturing tolerances and/or coating thicknesses, ±values can be added to the values listed in TABLE I, particularly to the X and Y values therein. For example, a tolerance of about 10-20 percent of a thickness of the trailing edge in a direction normal to any surface location along the airfoil profile can define an airfoil profile envelope for a bucket airfoil design at cold or room temperature. In other words, a distance of about ±10% to about ±20% (±0.010 to ±0.020 non-dimensionally) of the thickness of the trailing edge in a direction normal to any surface location along the airfoil profile can define a range of variation between measured points on an actual airfoil surface and ideal positions of those points, particularly at a cold or room temperature, as embodied by the invention. The bucket airfoil design, as embodied by the invention, is robust to this range of variation without impairment of mechanical and aerodynamic functions. Likewise, the profile and/or design can be scaled up or down, such as geometrically, without impairment of operation, and such scaling can be facilitated by use of normalized coordinate values, i.e. multiplying the normalized values by a scaling factor, or a larger or smaller span in distance units than might have otherwise been used.

Figure 6:
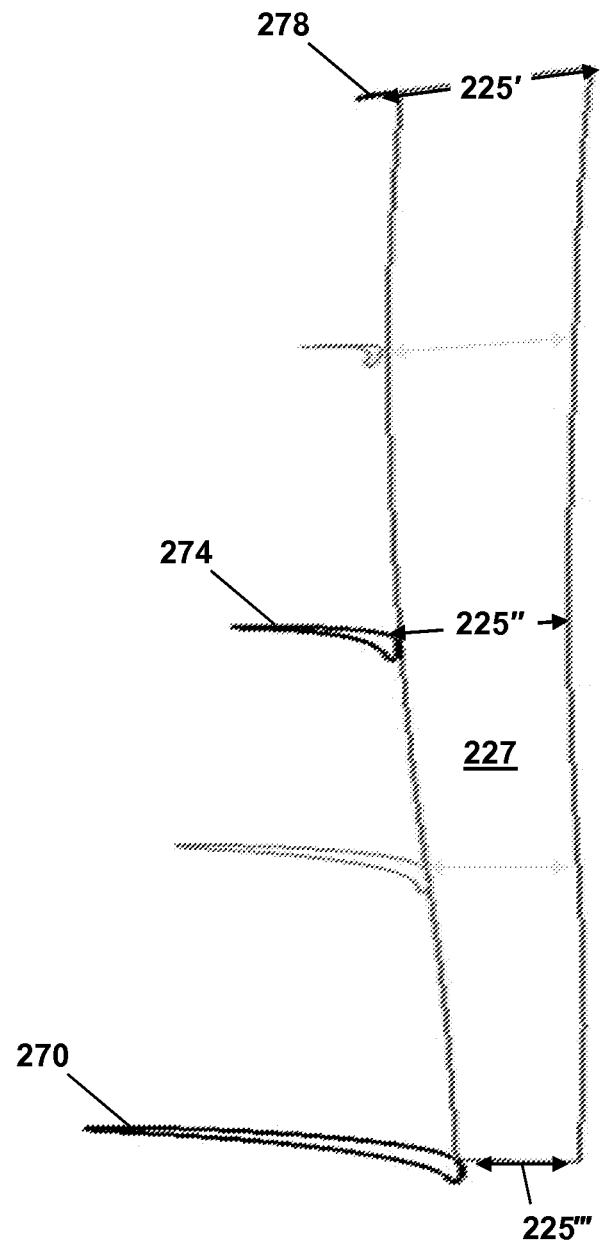
FIG. 6 shows a graphical representation of an imaginary surface of a throat according to embodiments of the invention disclosed herein.

By employing coordinates defining a profile of airfoil 202, a throat between adjacent airfoils 202 can be determined to at least ends of airfoils 202. For example, FIG. 6 shows a virtual surface representing a particular throat 227 that can be found between adjacent airfoils 202 using the profile shown in TABLE I. As can be seen in FIG. 6, the surface can be quite complex. In embodiments, a width of throat 227 along a span of airfoils 202 can vary as shown by example in FIG. 7, which shows that throat width can be increased near root 215. In addition, embodiments can increase the width of throat 227 near tip 217. More particularly, in embodiments, a width of throat 227 can be increased within a first distance from first end 215 of the airfoil(s) 202 and/or a first endwall of flow passage 219, such as endwall 216, and can also be increased within a second distance from second end 217 of airfoil(s) 202 and/or a second endwall of flow passage 219, such as endwall 221, if present and/or used. For example, the first and/or second distance can be no more than about 25% of the span(s) of airfoil(s) 202, and can in embodiments be no more than about 20% of the span(s).

The width of throat 227 can increase in embodiments by no more than about 15% of its value at the first and/or second distance mark, such as no more than about 10%, though in embodiments, other increases can be employed, and there need not be symmetry in the manner in which throat width may change as between first end 215 and second end 217. For example, the throat width at first end 215 can be about 110% of the throat width at about 20% span and/or the throat width at second end 217 can be about 110% of the throat width at about 80% span (about 20% span away from second end 217). Throat 227 in embodiments can flare open more toward first end 215 within about 20% span from first end 215 than throat 227 flares open toward second end 217 within about 20% span from second end 217, and/or throat 227 can flare open more toward second end 217 within about 20% span from second end 217 than throat 227 flares open toward first end 215 within about 20% span from first end 215. Also, throat 227 can flare open to at least about 10% of its width at about 20% span from at least one of first and second ends 215, 217. In addition to increasing the width of the throat, a rate of change of the width can be varied within the first distance from the first endwall and/or the second distance from the second endwall, if present and/or used. For example, an absolute value of the rate of change of the width with respect to span can increase within the first distance from the first endwall and/or within the second distance from the second endwall.

Figure 7:
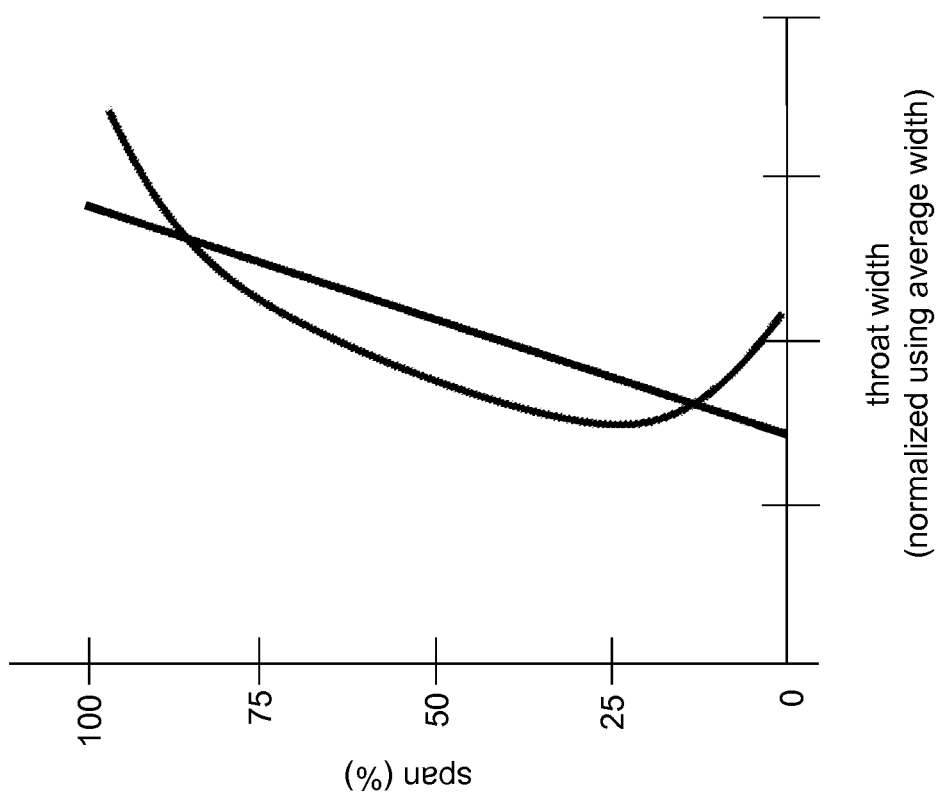
FIG. 7 shows a schematic graph of span versus throat width of a pair of buckets employing the airfoil profile according to embodiments of the invention disclosed herein.

Returning to the example of a plot of span vs. throat width is shown in FIG. 7, the widening of the throat at the root and/or tip of an airfoil can be seen as compared to a throat between airfoils employing a typical profile. In addition, the absolute value of a rate of change of the width of the throat vs. span of the airfoil(s), as represented by absolute value of the inverse of the slope of the curve shown in FIG. 7, can also be seen to increase. By introducing such an increase of throat width, as well as such an increase in a rate of change of throat width, a total pressure at the respective pressure and suction sidewalls 204, 206 of adjacent airfoils 202 can be increased. The increased total pressure can energize the flow over the airfoil sidewalls, which can reduce pressure separation of the flow, thus improving stage and/or diffuser and/or turbine efficiency.

Figure 8:
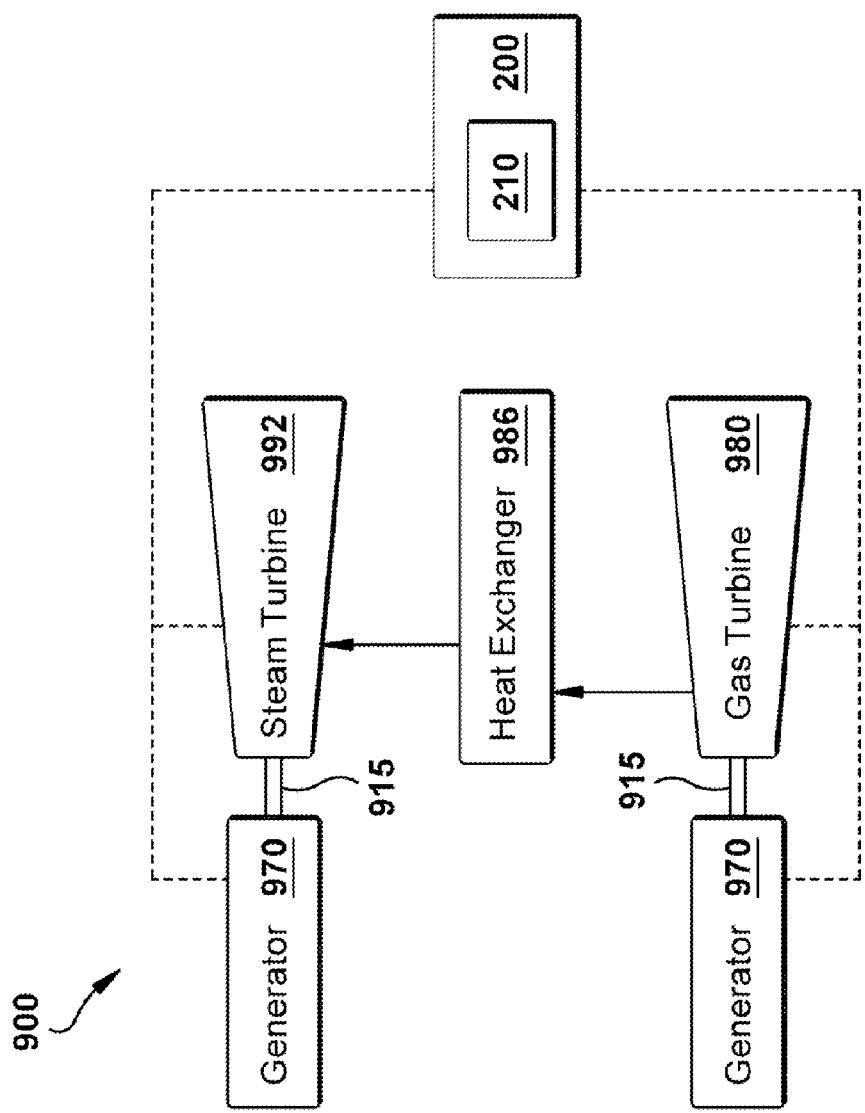
FIG. 8 shows a schematic block diagram illustrating portions of a combined cycle power plant system in which embodiments of the invention disclosed herein can be used.
Figure 9:
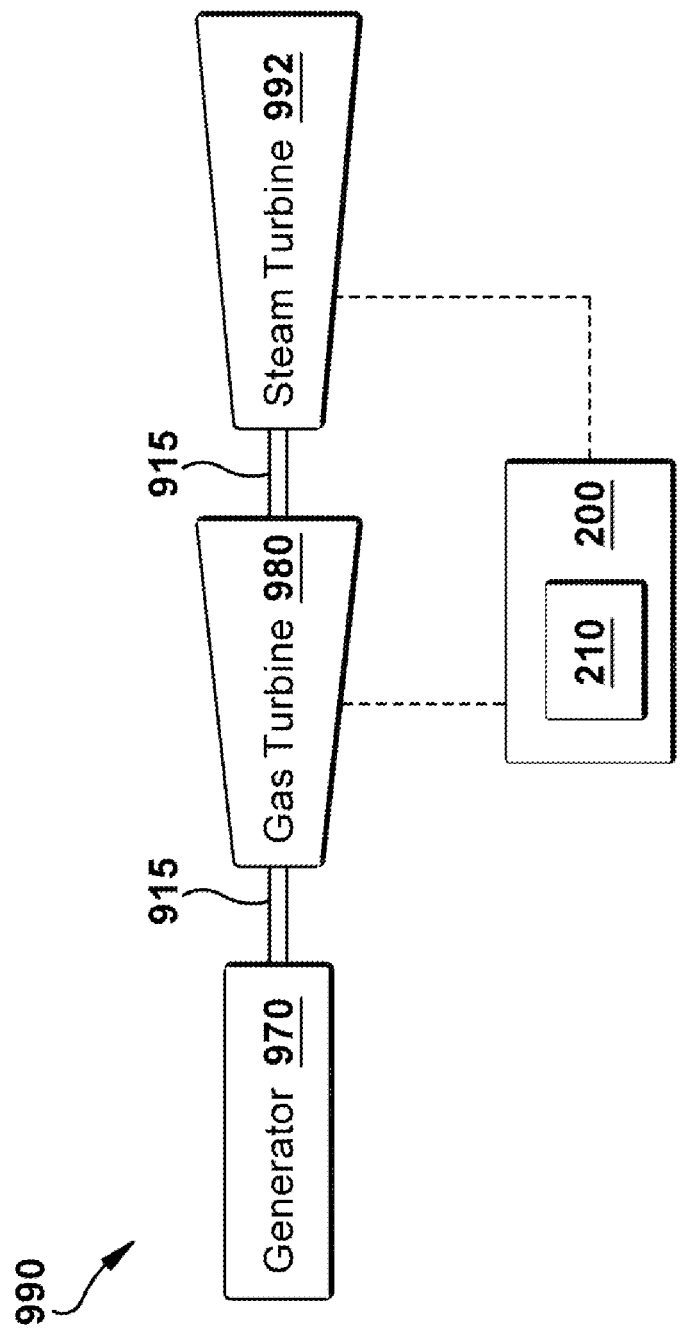
FIG. 9 shows a schematic block diagram illustrating portions of a single-shaft combined cycle power plant system in which embodiments of the invention disclosed herein can be used.

Turning to FIG. 8, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 10 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more buckets 200 as shown and described with reference to FIGS. 2-4 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 9, a single shaft combined cycle power plant 990 may include a single generator 970 coupled to both gas turbine 980 and steam turbine 992 via a single shaft 915. Steam turbine 992 and/or gas turbine 980 may include one or more buckets 200 shown and described with reference to FIGS. 2-4 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

TABLE I

| | Non-Dimensionalized (X Y Z/Span) | | | |
|---|---|---|---|---|
| N | Location | X | Y | Z |
| 1 | suction-side | 0.000 | 0.000 | 0.000 |
| 2 | suction-side | 0.000 | 0.000 | 0.000 |
| 3 | suction-side | 0.000 | 0.006 | 0.000 |
| 4 | suction-side | 0.002 | 0.009 | 0.000 |
| 5 | suction-side | 0.004 | 0.012 | 0.000 |
| 6 | suction-side | 0.006 | 0.014 | 0.000 |
| 7 | suction-side | 0.008 | 0.017 | 0.000 |
| 8 | suction-side | 0.010 | 0.019 | 0.000 |
| 9 | suction-side | 0.013 | 0.022 | 0.000 |
| 10 | suction-side | 0.015 | 0.024 | 0.000 |
| 11 | suction-side | 0.017 | 0.026 | 0.000 |
| 12 | suction-side | 0.020 | 0.028 | 0.000 |
| 13 | suction-side | 0.023 | 0.030 | 0.000 |
| 14 | suction-side | 0.025 | 0.033 | 0.000 |
| 15 | suction-side | 0.028 | 0.035 | 0.000 |
| 16 | suction-side | 0.030 | 0.037 | 0.000 |
| 17 | suction-side | 0.033 | 0.039 | 0.000 |
| 18 | suction-side | 0.036 | 0.041 | 0.000 |
| 19 | suction-side | 0.038 | 0.043 | 0.000 |
| 20 | suction-side | 0.041 | 0.044 | 0.000 |
| 21 | suction-side | 0.044 | 0.046 | 0.000 |
| 22 | suction-side | 0.046 | 0.048 | 0.000 |
| 23 | suction-side | 0.049 | 0.050 | 0.000 |
| 24 | suction-side | 0.052 | 0.052 | 0.000 |
| 25 | suction-side | 0.055 | 0.053 | 0.000 |
| 26 | suction-side | 0.058 | 0.055 | 0.000 |
| 27 | suction-side | 0.060 | 0.057 | 0.000 |
| 28 | suction-side | 0.063 | 0.059 | 0.000 |
| 29 | suction-side | 0.066 | 0.060 | 0.000 |
| 30 | suction-side | 0.069 | 0.062 | 0.000 |
| 31 | suction-side | 0.072 | 0.063 | 0.000 |
| 32 | suction-side | 0.075 | 0.065 | 0.000 |
| 33 | suction-side | 0.078 | 0.066 | 0.000 |
| 34 | suction-side | 0.081 | 0.068 | 0.000 |
| 35 | suction-side | 0.084 | 0.069 | 0.000 |
| 36 | suction-side | 0.087 | 0.070 | 0.000 |
| 37 | suction-side | 0.090 | 0.072 | 0.000 |
| 38 | suction-side | 0.093 | 0.073 | 0.000 |
| 39 | suction-side | 0.096 | 0.074 | 0.000 |
| 40 | suction-side | 0.099 | 0.075 | 0.000 |
| 41 | suction-side | 0.102 | 0.076 | 0.000 |
| 42 | suction-side | 0.105 | 0.078 | 0.000 |
| 43 | suction-side | 0.108 | 0.078 | 0.000 |
| 44 | suction-side | 0.112 | 0.079 | 0.000 |
| 45 | suction-side | 0.115 | 0.080 | 0.000 |
| 46 | suction-side | 0.118 | 0.081 | 0.000 |
| 47 | suction-side | 0.121 | 0.082 | 0.000 |
| 48 | suction-side | 0.125 | 0.082 | 0.000 |
| 49 | suction-side | 0.128 | 0.083 | 0.000 |
| 50 | suction-side | 0.131 | 0.083 | 0.000 |
| 51 | suction-side | 0.134 | 0.084 | 0.000 |
| 52 | suction-side | 0.138 | 0.084 | 0.000 |
| 53 | suction-side | 0.141 | 0.084 | 0.000 |
| 54 | suction-side | 0.144 | 0.084 | 0.000 |
| 55 | suction-side | 0.148 | 0.084 | 0.000 |
| 56 | suction-side | 0.151 | 0.084 | 0.000 |
| 57 | suction-side | 0.154 | 0.084 | 0.000 |
| 58 | suction-side | 0.158 | 0.083 | 0.000 |
| 59 | suction-side | 0.161 | 0.083 | 0.000 |
| 60 | suction-side | 0.164 | 0.082 | 0.000 |
| 61 | suction-side | 0.167 | 0.081 | 0.000 |
| 62 | suction-side | 0.170 | 0.080 | 0.000 |
| 63 | suction-side | 0.174 | 0.079 | 0.000 |
| 64 | suction-side | 0.177 | 0.078 | 0.000 |
| 65 | suction-side | 0.180 | 0.077 | 0.000 |
| 66 | suction-side | 0.183 | 0.075 | 0.000 |
| 67 | suction-side | 0.186 | 0.074 | 0.000 |
| 68 | suction-side | 0.188 | 0.072 | 0.000 |
| 69 | suction-side | 0.191 | 0.070 | 0.000 |
| 70 | suction-side | 0.194 | 0.068 | 0.000 |
| 71 | suction-side | 0.197 | 0.066 | 0.000 |
| 72 | suction-side | 0.199 | 0.064 | 0.000 |
| 73 | suction-side | 0.202 | 0.062 | 0.000 |
| 74 | suction-side | 0.204 | 0.060 | 0.000 |
| 75 | suction-side | 0.207 | 0.058 | 0.000 |
| 76 | suction-side | 0.209 | 0.055 | 0.000 |
| 77 | suction-side | 0.211 | 0.053 | 0.000 |
| 78 | suction-side | 0.213 | 0.050 | 0.000 |
| 79 | suction-side | 0.216 | 0.048 | 0.000 |
| 80 | suction-side | 0.218 | 0.045 | 0.000 |
| 81 | suction-side | 0.220 | 0.043 | 0.000 |
| 82 | suction-side | 0.222 | 0.040 | 0.000 |
| 83 | suction-side | 0.224 | 0.038 | 0.000 |
| 84 | suction-side | 0.226 | 0.035 | 0.000 |
| 85 | suction-side | 0.228 | 0.032 | 0.000 |
| 86 | suction-side | 0.230 | 0.030 | 0.000 |
| 87 | suction-side | 0.232 | 0.027 | 0.000 |
| 88 | suction-side | 0.234 | 0.024 | 0.000 |
| 89 | suction-side | 0.236 | 0.022 | 0.000 |
| 90 | suction-side | 0.238 | 0.019 | 0.000 |
| 91 | suction-side | 0.240 | 0.017 | 0.000 |
| 92 | suction-side | 0.243 | 0.014 | 0.000 |
| 93 | suction-side | 0.245 | 0.011 | 0.000 |
| 94 | suction-side | 0.247 | 0.009 | 0.000 |
| 95 | suction-side | 0.248 | 0.003 | 0.000 |
| 96 | suction-side | 0.248 | 0.003 | 0.000 |
| 97 | suction-side | 0.248 | 0.004 | 0.000 |
| 98 | suction-side | 0.248 | 0.006 | 0.000 |
| 99 | suction-side | 0.249 | 0.005 | 0.000 |
| 100 | suction-side | 0.249 | 0.005 | 0.000 |
| 101 | pressure-side | 0.000 | 0.000 | 0.000 |

TABLE I-continued

Non-Dimensionalized (X Y Z/Span)

| N | Location | X | Y | Z |
|---|---|---|---|---|
| 102 | pressure-side | 0.003 | 0.000 | 0.000 |
| 103 | pressure-side | 0.005 | 0.000 | 0.000 |
| 104 | pressure-side | 0.008 | 0.001 | 0.000 |
| 105 | pressure-side | 0.011 | 0.003 | 0.000 |
| 106 | pressure-side | 0.013 | 0.004 | 0.000 |
| 107 | pressure-side | 0.016 | 0.005 | 0.000 |
| 108 | pressure-side | 0.018 | 0.006 | 0.000 |
| 109 | pressure-side | 0.021 | 0.008 | 0.000 |
| 110 | pressure-side | 0.023 | 0.009 | 0.000 |
| 111 | pressure-side | 0.026 | 0.010 | 0.000 |
| 112 | pressure-side | 0.028 | 0.011 | 0.000 |
| 113 | pressure-side | 0.031 | 0.013 | 0.000 |
| 114 | pressure-side | 0.033 | 0.014 | 0.000 |
| 115 | pressure-side | 0.036 | 0.015 | 0.000 |
| 116 | pressure-side | 0.038 | 0.016 | 0.000 |
| 117 | pressure-side | 0.041 | 0.017 | 0.000 |
| 118 | pressure-side | 0.044 | 0.019 | 0.000 |
| 119 | pressure-side | 0.046 | 0.020 | 0.000 |
| 120 | pressure-side | 0.049 | 0.021 | 0.000 |
| 121 | pressure-side | 0.051 | 0.022 | 0.000 |
| 122 | pressure-side | 0.054 | 0.023 | 0.000 |
| 123 | pressure-side | 0.056 | 0.024 | 0.000 |
| 124 | pressure-side | 0.059 | 0.025 | 0.000 |
| 125 | pressure-side | 0.062 | 0.026 | 0.000 |
| 126 | pressure-side | 0.064 | 0.027 | 0.000 |
| 127 | pressure-side | 0.067 | 0.028 | 0.000 |
| 128 | pressure-side | 0.070 | 0.029 | 0.000 |
| 129 | pressure-side | 0.072 | 0.030 | 0.000 |
| 130 | pressure-side | 0.075 | 0.031 | 0.000 |
| 131 | pressure-side | 0.078 | 0.032 | 0.000 |
| 132 | pressure-side | 0.080 | 0.033 | 0.000 |
| 133 | pressure-side | 0.083 | 0.034 | 0.000 |
| 134 | pressure-side | 0.086 | 0.034 | 0.000 |
| 135 | pressure-side | 0.088 | 0.035 | 0.000 |
| 136 | pressure-side | 0.091 | 0.036 | 0.000 |
| 137 | pressure-side | 0.094 | 0.037 | 0.000 |
| 138 | pressure-side | 0.096 | 0.037 | 0.000 |
| 139 | pressure-side | 0.099 | 0.038 | 0.000 |
| 140 | pressure-side | 0.102 | 0.039 | 0.000 |
| 141 | pressure-side | 0.105 | 0.039 | 0.000 |
| 142 | pressure-side | 0.107 | 0.040 | 0.000 |
| 143 | pressure-side | 0.110 | 0.040 | 0.000 |
| 144 | pressure-side | 0.113 | 0.041 | 0.000 |
| 145 | pressure-side | 0.116 | 0.041 | 0.000 |
| 146 | pressure-side | 0.119 | 0.041 | 0.000 |
| 147 | pressure-side | 0.121 | 0.042 | 0.000 |
| 148 | pressure-side | 0.124 | 0.042 | 0.000 |
| 149 | pressure-side | 0.127 | 0.042 | 0.000 |
| 150 | pressure-side | 0.130 | 0.043 | 0.000 |
| 151 | pressure-side | 0.133 | 0.043 | 0.000 |
| 152 | pressure-side | 0.135 | 0.043 | 0.000 |
| 153 | pressure-side | 0.138 | 0.043 | 0.000 |
| 154 | pressure-side | 0.141 | 0.043 | 0.000 |
| 155 | pressure-side | 0.144 | 0.043 | 0.000 |
| 156 | pressure-side | 0.147 | 0.043 | 0.000 |
| 157 | pressure-side | 0.149 | 0.043 | 0.000 |
| 158 | pressure-side | 0.152 | 0.043 | 0.000 |
| 159 | pressure-side | 0.155 | 0.042 | 0.000 |
| 160 | pressure-side | 0.158 | 0.042 | 0.000 |
| 161 | pressure-side | 0.161 | 0.042 | 0.000 |
| 162 | pressure-side | 0.163 | 0.042 | 0.000 |
| 163 | pressure-side | 0.166 | 0.041 | 0.000 |
| 164 | pressure-side | 0.169 | 0.041 | 0.000 |
| 165 | pressure-side | 0.172 | 0.040 | 0.000 |
| 166 | pressure-side | 0.174 | 0.040 | 0.000 |
| 167 | pressure-side | 0.177 | 0.039 | 0.000 |
| 168 | pressure-side | 0.180 | 0.039 | 0.000 |
| 169 | pressure-side | 0.183 | 0.038 | 0.000 |
| 170 | pressure-side | 0.185 | 0.037 | 0.000 |
| 171 | pressure-side | 0.188 | 0.037 | 0.000 |
| 172 | pressure-side | 0.191 | 0.036 | 0.000 |
| 173 | pressure-side | 0.193 | 0.035 | 0.000 |
| 174 | pressure-side | 0.196 | 0.034 | 0.000 |
| 175 | pressure-side | 0.199 | 0.033 | 0.000 |
| 176 | pressure-side | 0.201 | 0.032 | 0.000 |
| 177 | pressure-side | 0.204 | 0.031 | 0.000 |
| 178 | pressure-side | 0.207 | 0.030 | 0.000 |
| 179 | pressure-side | 0.209 | 0.029 | 0.000 |
| 180 | pressure-side | 0.212 | 0.028 | 0.000 |
| 181 | pressure-side | 0.214 | 0.027 | 0.000 |
| 182 | pressure-side | 0.217 | 0.025 | 0.000 |
| 183 | pressure-side | 0.219 | 0.024 | 0.000 |
| 184 | pressure-side | 0.222 | 0.023 | 0.000 |
| 185 | pressure-side | 0.224 | 0.021 | 0.000 |
| 186 | pressure-side | 0.226 | 0.019 | 0.000 |
| 187 | pressure-side | 0.228 | 0.018 | 0.000 |
| 188 | pressure-side | 0.231 | 0.016 | 0.000 |
| 189 | pressure-side | 0.233 | 0.014 | 0.000 |
| 190 | pressure-side | 0.235 | 0.012 | 0.000 |
| 191 | pressure-side | 0.237 | 0.010 | 0.000 |
| 192 | pressure-side | 0.239 | 0.008 | 0.000 |
| 193 | pressure-side | 0.241 | 0.006 | 0.000 |
| 194 | pressure-side | 0.243 | 0.004 | 0.000 |
| 195 | pressure-side | 0.245 | 0.002 | 0.000 |
| 196 | pressure-side | 0.245 | 0.002 | 0.000 |
| 197 | pressure-side | 0.246 | 0.002 | 0.000 |
| 198 | pressure-side | 0.247 | 0.002 | 0.000 |
| 199 | pressure-side | 0.248 | 0.003 | 0.000 |
| 200 | pressure-side | 0.248 | 0.003 | 0.000 |
| 1 | suction-side | 0.009 | 0.018 | 0.100 |
| 2 | suction-side | 0.009 | 0.015 | 0.100 |
| 3 | suction-side | 0.010 | 0.021 | 0.100 |
| 4 | suction-side | 0.012 | 0.023 | 0.100 |
| 5 | suction-side | 0.014 | 0.026 | 0.100 |
| 6 | suction-side | 0.017 | 0.028 | 0.100 |
| 7 | suction-side | 0.019 | 0.030 | 0.100 |
| 8 | suction-side | 0.021 | 0.033 | 0.100 |
| 9 | suction-side | 0.023 | 0.035 | 0.100 |
| 10 | suction-side | 0.026 | 0.037 | 0.100 |
| 11 | suction-side | 0.028 | 0.039 | 0.100 |
| 12 | suction-side | 0.031 | 0.041 | 0.100 |
| 13 | suction-side | 0.033 | 0.043 | 0.100 |
| 14 | suction-side | 0.035 | 0.045 | 0.100 |
| 15 | suction-side | 0.038 | 0.047 | 0.100 |
| 16 | suction-side | 0.040 | 0.048 | 0.100 |
| 17 | suction-side | 0.043 | 0.050 | 0.100 |
| 18 | suction-side | 0.046 | 0.052 | 0.100 |
| 19 | suction-side | 0.048 | 0.054 | 0.100 |
| 20 | suction-side | 0.051 | 0.055 | 0.100 |
| 21 | suction-side | 0.053 | 0.057 | 0.100 |
| 22 | suction-side | 0.056 | 0.059 | 0.100 |
| 23 | suction-side | 0.059 | 0.060 | 0.100 |
| 24 | suction-side | 0.062 | 0.062 | 0.100 |
| 25 | suction-side | 0.064 | 0.063 | 0.100 |
| 26 | suction-side | 0.067 | 0.065 | 0.100 |
| 27 | suction-side | 0.070 | 0.066 | 0.100 |
| 28 | suction-side | 0.073 | 0.067 | 0.100 |
| 29 | suction-side | 0.076 | 0.069 | 0.100 |
| 30 | suction-side | 0.078 | 0.070 | 0.100 |
| 31 | suction-side | 0.081 | 0.071 | 0.100 |
| 32 | suction-side | 0.084 | 0.072 | 0.100 |
| 33 | suction-side | 0.087 | 0.073 | 0.100 |
| 34 | suction-side | 0.090 | 0.074 | 0.100 |
| 35 | suction-side | 0.093 | 0.075 | 0.100 |
| 36 | suction-side | 0.096 | 0.076 | 0.100 |
| 37 | suction-side | 0.099 | 0.077 | 0.100 |
| 38 | suction-side | 0.102 | 0.078 | 0.100 |
| 39 | suction-side | 0.105 | 0.078 | 0.100 |
| 40 | suction-side | 0.108 | 0.079 | 0.100 |
| 41 | suction-side | 0.111 | 0.080 | 0.100 |
| 42 | suction-side | 0.115 | 0.080 | 0.100 |
| 43 | suction-side | 0.118 | 0.081 | 0.100 |
| 44 | suction-side | 0.121 | 0.081 | 0.100 |
| 45 | suction-side | 0.124 | 0.081 | 0.100 |
| 46 | suction-side | 0.127 | 0.081 | 0.100 |
| 47 | suction-side | 0.130 | 0.082 | 0.100 |
| 48 | suction-side | 0.133 | 0.082 | 0.100 |
| 49 | suction-side | 0.137 | 0.082 | 0.100 |
| 50 | suction-side | 0.140 | 0.081 | 0.100 |
| 51 | suction-side | 0.143 | 0.081 | 0.100 |
| 52 | suction-side | 0.146 | 0.081 | 0.100 |
| 53 | suction-side | 0.149 | 0.080 | 0.100 |

TABLE I-continued

Non-Dimensionalized (X Y Z/Span)

| N | Location | X | Y | Z |
|---|---|---|---|---|
| 54 | suction-side | 0.152 | 0.080 | 0.100 |
| 55 | suction-side | 0.155 | 0.079 | 0.100 |
| 56 | suction-side | 0.158 | 0.079 | 0.100 |
| 57 | suction-side | 0.161 | 0.078 | 0.100 |
| 58 | suction-side | 0.164 | 0.077 | 0.100 |
| 59 | suction-side | 0.167 | 0.076 | 0.100 |
| 60 | suction-side | 0.170 | 0.075 | 0.100 |
| 61 | suction-side | 0.173 | 0.074 | 0.100 |
| 62 | suction-side | 0.176 | 0.072 | 0.100 |
| 63 | suction-side | 0.179 | 0.071 | 0.100 |
| 64 | suction-side | 0.182 | 0.069 | 0.100 |
| 65 | suction-side | 0.184 | 0.068 | 0.100 |
| 66 | suction-side | 0.187 | 0.066 | 0.100 |
| 67 | suction-side | 0.190 | 0.064 | 0.100 |
| 68 | suction-side | 0.192 | 0.062 | 0.100 |
| 69 | suction-side | 0.195 | 0.060 | 0.100 |
| 70 | suction-side | 0.197 | 0.058 | 0.100 |
| 71 | suction-side | 0.199 | 0.056 | 0.100 |
| 72 | suction-side | 0.202 | 0.054 | 0.100 |
| 73 | suction-side | 0.204 | 0.052 | 0.100 |
| 74 | suction-side | 0.206 | 0.050 | 0.100 |
| 75 | suction-side | 0.208 | 0.048 | 0.100 |
| 76 | suction-side | 0.211 | 0.045 | 0.100 |
| 77 | suction-side | 0.213 | 0.043 | 0.100 |
| 78 | suction-side | 0.215 | 0.041 | 0.100 |
| 79 | suction-side | 0.217 | 0.038 | 0.100 |
| 80 | suction-side | 0.219 | 0.036 | 0.100 |
| 81 | suction-side | 0.221 | 0.034 | 0.100 |
| 82 | suction-side | 0.223 | 0.031 | 0.100 |
| 83 | suction-side | 0.225 | 0.029 | 0.100 |
| 84 | suction-side | 0.227 | 0.026 | 0.100 |
| 85 | suction-side | 0.228 | 0.024 | 0.100 |
| 86 | suction-side | 0.230 | 0.021 | 0.100 |
| 87 | suction-side | 0.232 | 0.019 | 0.100 |
| 88 | suction-side | 0.234 | 0.016 | 0.100 |
| 89 | suction-side | 0.236 | 0.014 | 0.100 |
| 90 | suction-side | 0.238 | 0.011 | 0.100 |
| 91 | suction-side | 0.240 | 0.009 | 0.100 |
| 92 | suction-side | 0.242 | 0.006 | 0.100 |
| 93 | suction-side | 0.244 | 0.004 | 0.100 |
| 94 | suction-side | 0.245 | 0.001 | 0.100 |
| 95 | suction-side | 0.247 | −0.004 | 0.100 |
| 96 | suction-side | 0.247 | −0.004 | 0.100 |
| 97 | suction-side | 0.247 | −0.003 | 0.100 |
| 98 | suction-side | 0.247 | −0.001 | 0.100 |
| 99 | suction-side | 0.247 | −0.003 | 0.100 |
| 100 | suction-side | 0.247 | −0.002 | 0.100 |
| 101 | pressure-side | 0.009 | 0.015 | 0.100 |
| 102 | pressure-side | 0.012 | 0.014 | 0.100 |
| 103 | pressure-side | 0.014 | 0.014 | 0.100 |
| 104 | pressure-side | 0.017 | 0.015 | 0.100 |
| 105 | pressure-side | 0.020 | 0.015 | 0.100 |
| 106 | pressure-side | 0.022 | 0.016 | 0.100 |
| 107 | pressure-side | 0.025 | 0.017 | 0.100 |
| 108 | pressure-side | 0.027 | 0.018 | 0.100 |
| 109 | pressure-side | 0.030 | 0.019 | 0.100 |
| 110 | pressure-side | 0.032 | 0.020 | 0.100 |
| 111 | pressure-side | 0.035 | 0.022 | 0.100 |
| 112 | pressure-side | 0.037 | 0.023 | 0.100 |
| 113 | pressure-side | 0.040 | 0.024 | 0.100 |
| 114 | pressure-side | 0.042 | 0.025 | 0.100 |
| 115 | pressure-side | 0.045 | 0.026 | 0.100 |
| 116 | pressure-side | 0.047 | 0.027 | 0.100 |
| 117 | pressure-side | 0.050 | 0.028 | 0.100 |
| 118 | pressure-side | 0.052 | 0.029 | 0.100 |
| 119 | pressure-side | 0.055 | 0.030 | 0.100 |
| 120 | pressure-side | 0.057 | 0.031 | 0.100 |
| 121 | pressure-side | 0.060 | 0.032 | 0.100 |
| 122 | pressure-side | 0.062 | 0.033 | 0.100 |
| 123 | pressure-side | 0.065 | 0.034 | 0.100 |
| 124 | pressure-side | 0.068 | 0.035 | 0.100 |
| 125 | pressure-side | 0.070 | 0.036 | 0.100 |
| 126 | pressure-side | 0.073 | 0.037 | 0.100 |
| 127 | pressure-side | 0.075 | 0.038 | 0.100 |
| 128 | pressure-side | 0.078 | 0.038 | 0.100 |
| 129 | pressure-side | 0.081 | 0.039 | 0.100 |
| 130 | pressure-side | 0.083 | 0.040 | 0.100 |
| 131 | pressure-side | 0.086 | 0.041 | 0.100 |
| 132 | pressure-side | 0.088 | 0.041 | 0.100 |
| 133 | pressure-side | 0.091 | 0.042 | 0.100 |
| 134 | pressure-side | 0.094 | 0.042 | 0.100 |
| 135 | pressure-side | 0.096 | 0.043 | 0.100 |
| 136 | pressure-side | 0.099 | 0.043 | 0.100 |
| 137 | pressure-side | 0.102 | 0.044 | 0.100 |
| 138 | pressure-side | 0.104 | 0.044 | 0.100 |
| 139 | pressure-side | 0.107 | 0.045 | 0.100 |
| 140 | pressure-side | 0.110 | 0.045 | 0.100 |
| 141 | pressure-side | 0.112 | 0.045 | 0.100 |
| 142 | pressure-side | 0.115 | 0.046 | 0.100 |
| 143 | pressure-side | 0.118 | 0.046 | 0.100 |
| 144 | pressure-side | 0.121 | 0.046 | 0.100 |
| 145 | pressure-side | 0.123 | 0.046 | 0.100 |
| 146 | pressure-side | 0.126 | 0.046 | 0.100 |
| 147 | pressure-side | 0.129 | 0.047 | 0.100 |
| 148 | pressure-side | 0.131 | 0.047 | 0.100 |
| 149 | pressure-side | 0.134 | 0.047 | 0.100 |
| 150 | pressure-side | 0.137 | 0.047 | 0.100 |
| 151 | pressure-side | 0.140 | 0.046 | 0.100 |
| 152 | pressure-side | 0.142 | 0.046 | 0.100 |
| 153 | pressure-side | 0.145 | 0.046 | 0.100 |
| 154 | pressure-side | 0.148 | 0.046 | 0.100 |
| 155 | pressure-side | 0.151 | 0.046 | 0.100 |
| 156 | pressure-side | 0.153 | 0.045 | 0.100 |
| 157 | pressure-side | 0.156 | 0.045 | 0.100 |
| 158 | pressure-side | 0.159 | 0.045 | 0.100 |
| 159 | pressure-side | 0.161 | 0.044 | 0.100 |
| 160 | pressure-side | 0.164 | 0.044 | 0.100 |
| 161 | pressure-side | 0.167 | 0.043 | 0.100 |
| 162 | pressure-side | 0.170 | 0.043 | 0.100 |
| 163 | pressure-side | 0.172 | 0.042 | 0.100 |
| 164 | pressure-side | 0.175 | 0.041 | 0.100 |
| 165 | pressure-side | 0.177 | 0.041 | 0.100 |
| 166 | pressure-side | 0.180 | 0.040 | 0.100 |
| 167 | pressure-side | 0.183 | 0.039 | 0.100 |
| 168 | pressure-side | 0.185 | 0.038 | 0.100 |
| 169 | pressure-side | 0.188 | 0.037 | 0.100 |
| 170 | pressure-side | 0.190 | 0.036 | 0.100 |
| 171 | pressure-side | 0.193 | 0.035 | 0.100 |
| 172 | pressure-side | 0.195 | 0.034 | 0.100 |
| 173 | pressure-side | 0.198 | 0.033 | 0.100 |
| 174 | pressure-side | 0.200 | 0.032 | 0.100 |
| 175 | pressure-side | 0.203 | 0.031 | 0.100 |
| 176 | pressure-side | 0.205 | 0.029 | 0.100 |
| 177 | pressure-side | 0.208 | 0.028 | 0.100 |
| 178 | pressure-side | 0.210 | 0.027 | 0.100 |
| 179 | pressure-side | 0.212 | 0.025 | 0.100 |
| 180 | pressure-side | 0.214 | 0.024 | 0.100 |
| 181 | pressure-side | 0.217 | 0.022 | 0.100 |
| 182 | pressure-side | 0.219 | 0.020 | 0.100 |
| 183 | pressure-side | 0.221 | 0.019 | 0.100 |
| 184 | pressure-side | 0.223 | 0.017 | 0.100 |
| 185 | pressure-side | 0.225 | 0.015 | 0.100 |
| 186 | pressure-side | 0.227 | 0.013 | 0.100 |
| 187 | pressure-side | 0.229 | 0.011 | 0.100 |
| 188 | pressure-side | 0.231 | 0.010 | 0.100 |
| 189 | pressure-side | 0.233 | 0.008 | 0.100 |
| 190 | pressure-side | 0.235 | 0.006 | 0.100 |
| 191 | pressure-side | 0.237 | 0.004 | 0.100 |
| 192 | pressure-side | 0.238 | 0.001 | 0.100 |
| 193 | pressure-side | 0.240 | −0.001 | 0.100 |
| 194 | pressure-side | 0.242 | −0.003 | 0.100 |
| 195 | pressure-side | 0.244 | −0.005 | 0.100 |
| 196 | pressure-side | 0.244 | −0.005 | 0.100 |
| 197 | pressure-side | 0.245 | −0.005 | 0.100 |
| 198 | pressure-side | 0.246 | −0.005 | 0.100 |
| 199 | pressure-side | 0.247 | −0.004 | 0.100 |
| 200 | pressure-side | 0.247 | −0.004 | 0.100 |
| 1 | suction-side | 0.018 | 0.031 | 0.200 |
| 2 | suction-side | 0.018 | 0.034 | 0.200 |
| 3 | suction-side | 0.020 | 0.036 | 0.200 |
| 4 | suction-side | 0.022 | 0.039 | 0.200 |
| 5 | suction-side | 0.024 | 0.041 | 0.200 |

TABLE I-continued

Non-Dimensionalized (X Y Z/Span)

| N | Location | X | Y | Z |
|---|---|---|---|---|
| 6 | suction-side | 0.026 | 0.043 | 0.200 |
| 7 | suction-side | 0.028 | 0.045 | 0.200 |
| 8 | suction-side | 0.030 | 0.047 | 0.200 |
| 9 | suction-side | 0.032 | 0.049 | 0.200 |
| 10 | suction-side | 0.035 | 0.050 | 0.200 |
| 11 | suction-side | 0.037 | 0.052 | 0.200 |
| 12 | suction-side | 0.039 | 0.054 | 0.200 |
| 13 | suction-side | 0.042 | 0.056 | 0.200 |
| 14 | suction-side | 0.044 | 0.057 | 0.200 |
| 15 | suction-side | 0.047 | 0.059 | 0.200 |
| 16 | suction-side | 0.049 | 0.060 | 0.200 |
| 17 | suction-side | 0.052 | 0.062 | 0.200 |
| 18 | suction-side | 0.054 | 0.063 | 0.200 |
| 19 | suction-side | 0.057 | 0.065 | 0.200 |
| 20 | suction-side | 0.059 | 0.066 | 0.200 |
| 21 | suction-side | 0.062 | 0.068 | 0.200 |
| 22 | suction-side | 0.065 | 0.069 | 0.200 |
| 23 | suction-side | 0.067 | 0.070 | 0.200 |
| 24 | suction-side | 0.070 | 0.071 | 0.200 |
| 25 | suction-side | 0.073 | 0.072 | 0.200 |
| 26 | suction-side | 0.075 | 0.073 | 0.200 |
| 27 | suction-side | 0.078 | 0.074 | 0.200 |
| 28 | suction-side | 0.081 | 0.075 | 0.200 |
| 29 | suction-side | 0.084 | 0.076 | 0.200 |
| 30 | suction-side | 0.087 | 0.077 | 0.200 |
| 31 | suction-side | 0.089 | 0.078 | 0.200 |
| 32 | suction-side | 0.092 | 0.078 | 0.200 |
| 33 | suction-side | 0.095 | 0.079 | 0.200 |
| 34 | suction-side | 0.098 | 0.080 | 0.200 |
| 35 | suction-side | 0.101 | 0.080 | 0.200 |
| 36 | suction-side | 0.104 | 0.081 | 0.200 |
| 37 | suction-side | 0.107 | 0.081 | 0.200 |
| 38 | suction-side | 0.110 | 0.081 | 0.200 |
| 39 | suction-side | 0.113 | 0.081 | 0.200 |
| 40 | suction-side | 0.116 | 0.082 | 0.200 |
| 41 | suction-side | 0.119 | 0.082 | 0.200 |
| 42 | suction-side | 0.121 | 0.082 | 0.200 |
| 43 | suction-side | 0.124 | 0.082 | 0.200 |
| 44 | suction-side | 0.127 | 0.081 | 0.200 |
| 45 | suction-side | 0.130 | 0.081 | 0.200 |
| 46 | suction-side | 0.133 | 0.081 | 0.200 |
| 47 | suction-side | 0.136 | 0.080 | 0.200 |
| 48 | suction-side | 0.139 | 0.080 | 0.200 |
| 49 | suction-side | 0.142 | 0.079 | 0.200 |
| 50 | suction-side | 0.145 | 0.079 | 0.200 |
| 51 | suction-side | 0.148 | 0.078 | 0.200 |
| 52 | suction-side | 0.150 | 0.077 | 0.200 |
| 53 | suction-side | 0.153 | 0.076 | 0.200 |
| 54 | suction-side | 0.156 | 0.075 | 0.200 |
| 55 | suction-side | 0.159 | 0.074 | 0.200 |
| 56 | suction-side | 0.162 | 0.073 | 0.200 |
| 57 | suction-side | 0.164 | 0.072 | 0.200 |
| 58 | suction-side | 0.167 | 0.070 | 0.200 |
| 59 | suction-side | 0.169 | 0.069 | 0.200 |
| 60 | suction-side | 0.172 | 0.068 | 0.200 |
| 61 | suction-side | 0.174 | 0.066 | 0.200 |
| 62 | suction-side | 0.177 | 0.065 | 0.200 |
| 63 | suction-side | 0.179 | 0.063 | 0.200 |
| 64 | suction-side | 0.182 | 0.061 | 0.200 |
| 65 | suction-side | 0.184 | 0.059 | 0.200 |
| 66 | suction-side | 0.186 | 0.057 | 0.200 |
| 67 | suction-side | 0.189 | 0.056 | 0.200 |
| 68 | suction-side | 0.191 | 0.054 | 0.200 |
| 69 | suction-side | 0.193 | 0.052 | 0.200 |
| 70 | suction-side | 0.195 | 0.050 | 0.200 |
| 71 | suction-side | 0.197 | 0.048 | 0.200 |
| 72 | suction-side | 0.199 | 0.046 | 0.200 |
| 73 | suction-side | 0.201 | 0.043 | 0.200 |
| 74 | suction-side | 0.203 | 0.041 | 0.200 |
| 75 | suction-side | 0.205 | 0.039 | 0.200 |
| 76 | suction-side | 0.207 | 0.037 | 0.200 |
| 77 | suction-side | 0.209 | 0.035 | 0.200 |
| 78 | suction-side | 0.211 | 0.032 | 0.200 |
| 79 | suction-side | 0.213 | 0.030 | 0.200 |
| 80 | suction-side | 0.215 | 0.028 | 0.200 |
| 81 | suction-side | 0.216 | 0.026 | 0.200 |
| 82 | suction-side | 0.218 | 0.023 | 0.200 |
| 83 | suction-side | 0.220 | 0.021 | 0.200 |
| 84 | suction-side | 0.222 | 0.019 | 0.200 |
| 85 | suction-side | 0.224 | 0.016 | 0.200 |
| 86 | suction-side | 0.225 | 0.014 | 0.200 |
| 87 | suction-side | 0.227 | 0.012 | 0.200 |
| 88 | suction-side | 0.229 | 0.009 | 0.200 |
| 89 | suction-side | 0.231 | 0.007 | 0.200 |
| 90 | suction-side | 0.232 | 0.005 | 0.200 |
| 91 | suction-side | 0.234 | 0.002 | 0.200 |
| 92 | suction-side | 0.236 | 0.000 | 0.200 |
| 93 | suction-side | 0.238 | −0.002 | 0.200 |
| 94 | suction-side | 0.239 | −0.005 | 0.200 |
| 95 | suction-side | 0.240 | −0.010 | 0.200 |
| 96 | suction-side | 0.241 | −0.009 | 0.200 |
| 97 | suction-side | 0.241 | −0.009 | 0.200 |
| 98 | suction-side | 0.241 | −0.007 | 0.200 |
| 99 | suction-side | 0.241 | −0.008 | 0.200 |
| 100 | suction-side | 0.241 | −0.008 | 0.200 |
| 101 | pressure-side | 0.018 | 0.031 | 0.200 |
| 102 | pressure-side | 0.020 | 0.030 | 0.200 |
| 103 | pressure-side | 0.022 | 0.029 | 0.200 |
| 104 | pressure-side | 0.025 | 0.029 | 0.200 |
| 105 | pressure-side | 0.028 | 0.030 | 0.200 |
| 106 | pressure-side | 0.030 | 0.031 | 0.200 |
| 107 | pressure-side | 0.033 | 0.031 | 0.200 |
| 108 | pressure-side | 0.035 | 0.032 | 0.200 |
| 109 | pressure-side | 0.038 | 0.033 | 0.200 |
| 110 | pressure-side | 0.040 | 0.034 | 0.200 |
| 111 | pressure-side | 0.042 | 0.034 | 0.200 |
| 112 | pressure-side | 0.045 | 0.035 | 0.200 |
| 113 | pressure-side | 0.047 | 0.036 | 0.200 |
| 114 | pressure-side | 0.050 | 0.037 | 0.200 |
| 115 | pressure-side | 0.052 | 0.038 | 0.200 |
| 116 | pressure-side | 0.055 | 0.039 | 0.200 |
| 117 | pressure-side | 0.057 | 0.039 | 0.200 |
| 118 | pressure-side | 0.060 | 0.040 | 0.200 |
| 119 | pressure-side | 0.062 | 0.041 | 0.200 |
| 120 | pressure-side | 0.065 | 0.042 | 0.200 |
| 121 | pressure-side | 0.067 | 0.042 | 0.200 |
| 122 | pressure-side | 0.070 | 0.043 | 0.200 |
| 123 | pressure-side | 0.072 | 0.044 | 0.200 |
| 124 | pressure-side | 0.075 | 0.044 | 0.200 |
| 125 | pressure-side | 0.077 | 0.045 | 0.200 |
| 126 | pressure-side | 0.080 | 0.045 | 0.200 |
| 127 | pressure-side | 0.082 | 0.046 | 0.200 |
| 128 | pressure-side | 0.085 | 0.046 | 0.200 |
| 129 | pressure-side | 0.087 | 0.047 | 0.200 |
| 130 | pressure-side | 0.090 | 0.047 | 0.200 |
| 131 | pressure-side | 0.092 | 0.048 | 0.200 |
| 132 | pressure-side | 0.095 | 0.048 | 0.200 |
| 133 | pressure-side | 0.098 | 0.048 | 0.200 |
| 134 | pressure-side | 0.100 | 0.048 | 0.200 |
| 135 | pressure-side | 0.103 | 0.049 | 0.200 |
| 136 | pressure-side | 0.105 | 0.049 | 0.200 |
| 137 | pressure-side | 0.108 | 0.049 | 0.200 |
| 138 | pressure-side | 0.110 | 0.049 | 0.200 |
| 139 | pressure-side | 0.113 | 0.049 | 0.200 |
| 140 | pressure-side | 0.116 | 0.049 | 0.200 |
| 141 | pressure-side | 0.118 | 0.049 | 0.200 |
| 142 | pressure-side | 0.121 | 0.049 | 0.200 |
| 143 | pressure-side | 0.123 | 0.049 | 0.200 |
| 144 | pressure-side | 0.126 | 0.049 | 0.200 |
| 145 | pressure-side | 0.129 | 0.049 | 0.200 |
| 146 | pressure-side | 0.131 | 0.049 | 0.200 |
| 147 | pressure-side | 0.134 | 0.048 | 0.200 |
| 148 | pressure-side | 0.136 | 0.048 | 0.200 |
| 149 | pressure-side | 0.139 | 0.048 | 0.200 |
| 150 | pressure-side | 0.141 | 0.047 | 0.200 |
| 151 | pressure-side | 0.144 | 0.047 | 0.200 |
| 152 | pressure-side | 0.146 | 0.047 | 0.200 |
| 153 | pressure-side | 0.149 | 0.046 | 0.200 |
| 154 | pressure-side | 0.152 | 0.046 | 0.200 |
| 155 | pressure-side | 0.154 | 0.045 | 0.200 |
| 156 | pressure-side | 0.157 | 0.045 | 0.200 |
| 157 | pressure-side | 0.159 | 0.044 | 0.200 |

TABLE I-continued

| | | Non-Dimensionalized (X Y Z/Span) | | |
|---|---|---|---|---|
| N | Location | X | Y | Z |
| 158 | pressure-side | 0.162 | 0.043 | 0.200 |
| 159 | pressure-side | 0.164 | 0.043 | 0.200 |
| 160 | pressure-side | 0.166 | 0.042 | 0.200 |
| 161 | pressure-side | 0.169 | 0.041 | 0.200 |
| 162 | pressure-side | 0.171 | 0.040 | 0.200 |
| 163 | pressure-side | 0.174 | 0.039 | 0.200 |
| 164 | pressure-side | 0.176 | 0.039 | 0.200 |
| 165 | pressure-side | 0.179 | 0.038 | 0.200 |
| 166 | pressure-side | 0.181 | 0.037 | 0.200 |
| 167 | pressure-side | 0.183 | 0.036 | 0.200 |
| 168 | pressure-side | 0.186 | 0.035 | 0.200 |
| 169 | pressure-side | 0.188 | 0.033 | 0.200 |
| 170 | pressure-side | 0.190 | 0.032 | 0.200 |
| 171 | pressure-side | 0.193 | 0.031 | 0.200 |
| 172 | pressure-side | 0.195 | 0.030 | 0.200 |
| 173 | pressure-side | 0.197 | 0.028 | 0.200 |
| 174 | pressure-side | 0.199 | 0.027 | 0.200 |
| 175 | pressure-side | 0.201 | 0.026 | 0.200 |
| 176 | pressure-side | 0.203 | 0.024 | 0.200 |
| 177 | pressure-side | 0.206 | 0.023 | 0.200 |
| 178 | pressure-side | 0.208 | 0.021 | 0.200 |
| 179 | pressure-side | 0.210 | 0.020 | 0.200 |
| 180 | pressure-side | 0.211 | 0.018 | 0.200 |
| 181 | pressure-side | 0.213 | 0.016 | 0.200 |
| 182 | pressure-side | 0.215 | 0.015 | 0.200 |
| 183 | pressure-side | 0.217 | 0.013 | 0.200 |
| 184 | pressure-side | 0.219 | 0.011 | 0.200 |
| 185 | pressure-side | 0.221 | 0.009 | 0.200 |
| 186 | pressure-side | 0.223 | 0.007 | 0.200 |
| 187 | pressure-side | 0.224 | 0.005 | 0.200 |
| 188 | pressure-side | 0.226 | 0.004 | 0.200 |
| 189 | pressure-side | 0.228 | 0.002 | 0.200 |
| 190 | pressure-side | 0.229 | 0.000 | 0.200 |
| 191 | pressure-side | 0.231 | −0.002 | 0.200 |
| 192 | pressure-side | 0.233 | −0.004 | 0.200 |
| 193 | pressure-side | 0.234 | −0.006 | 0.200 |
| 194 | pressure-side | 0.236 | −0.008 | 0.200 |
| 195 | pressure-side | 0.238 | −0.010 | 0.200 |
| 196 | pressure-side | 0.238 | −0.010 | 0.200 |
| 197 | pressure-side | 0.239 | −0.010 | 0.200 |
| 198 | pressure-side | 0.240 | −0.010 | 0.200 |
| 199 | pressure-side | 0.240 | −0.010 | 0.200 |
| 200 | pressure-side | 0.240 | −0.010 | 0.200 |
| 1 | suction-side | 0.026 | 0.048 | 0.300 |
| 2 | suction-side | 0.027 | 0.050 | 0.300 |
| 3 | suction-side | 0.028 | 0.053 | 0.300 |
| 4 | suction-side | 0.030 | 0.055 | 0.300 |
| 5 | suction-side | 0.032 | 0.056 | 0.300 |
| 6 | suction-side | 0.034 | 0.058 | 0.300 |
| 7 | suction-side | 0.036 | 0.060 | 0.300 |
| 8 | suction-side | 0.038 | 0.062 | 0.300 |
| 9 | suction-side | 0.040 | 0.063 | 0.300 |
| 10 | suction-side | 0.043 | 0.065 | 0.300 |
| 11 | suction-side | 0.045 | 0.066 | 0.300 |
| 12 | suction-side | 0.047 | 0.068 | 0.300 |
| 13 | suction-side | 0.050 | 0.069 | 0.300 |
| 14 | suction-side | 0.052 | 0.070 | 0.300 |
| 15 | suction-side | 0.054 | 0.072 | 0.300 |
| 16 | suction-side | 0.057 | 0.073 | 0.300 |
| 17 | suction-side | 0.059 | 0.074 | 0.300 |
| 18 | suction-side | 0.062 | 0.075 | 0.300 |
| 19 | suction-side | 0.064 | 0.076 | 0.300 |
| 20 | suction-side | 0.067 | 0.077 | 0.300 |
| 21 | suction-side | 0.069 | 0.078 | 0.300 |
| 22 | suction-side | 0.072 | 0.079 | 0.300 |
| 23 | suction-side | 0.075 | 0.079 | 0.300 |
| 24 | suction-side | 0.077 | 0.080 | 0.300 |
| 25 | suction-side | 0.080 | 0.081 | 0.300 |
| 26 | suction-side | 0.083 | 0.081 | 0.300 |
| 27 | suction-side | 0.085 | 0.082 | 0.300 |
| 28 | suction-side | 0.088 | 0.082 | 0.300 |
| 29 | suction-side | 0.091 | 0.083 | 0.300 |
| 30 | suction-side | 0.093 | 0.083 | 0.300 |
| 31 | suction-side | 0.096 | 0.083 | 0.300 |
| 32 | suction-side | 0.099 | 0.084 | 0.300 |
| 33 | suction-side | 0.101 | 0.084 | 0.300 |
| 34 | suction-side | 0.104 | 0.084 | 0.300 |
| 35 | suction-side | 0.107 | 0.084 | 0.300 |
| 36 | suction-side | 0.110 | 0.084 | 0.300 |
| 37 | suction-side | 0.112 | 0.084 | 0.300 |
| 38 | suction-side | 0.115 | 0.084 | 0.300 |
| 39 | suction-side | 0.118 | 0.083 | 0.300 |
| 40 | suction-side | 0.120 | 0.083 | 0.300 |
| 41 | suction-side | 0.123 | 0.083 | 0.300 |
| 42 | suction-side | 0.126 | 0.082 | 0.300 |
| 43 | suction-side | 0.128 | 0.081 | 0.300 |
| 44 | suction-side | 0.131 | 0.081 | 0.300 |
| 45 | suction-side | 0.134 | 0.080 | 0.300 |
| 46 | suction-side | 0.136 | 0.079 | 0.300 |
| 47 | suction-side | 0.139 | 0.078 | 0.300 |
| 48 | suction-side | 0.141 | 0.077 | 0.300 |
| 49 | suction-side | 0.144 | 0.076 | 0.300 |
| 50 | suction-side | 0.146 | 0.075 | 0.300 |
| 51 | suction-side | 0.149 | 0.074 | 0.300 |
| 52 | suction-side | 0.151 | 0.073 | 0.300 |
| 53 | suction-side | 0.154 | 0.072 | 0.300 |
| 54 | suction-side | 0.156 | 0.070 | 0.300 |
| 55 | suction-side | 0.158 | 0.069 | 0.300 |
| 56 | suction-side | 0.161 | 0.067 | 0.300 |
| 57 | suction-side | 0.163 | 0.066 | 0.300 |
| 58 | suction-side | 0.165 | 0.064 | 0.300 |
| 59 | suction-side | 0.167 | 0.063 | 0.300 |
| 60 | suction-side | 0.169 | 0.061 | 0.300 |
| 61 | suction-side | 0.171 | 0.059 | 0.300 |
| 62 | suction-side | 0.173 | 0.057 | 0.300 |
| 63 | suction-side | 0.175 | 0.055 | 0.300 |
| 64 | suction-side | 0.177 | 0.054 | 0.300 |
| 65 | suction-side | 0.179 | 0.052 | 0.300 |
| 66 | suction-side | 0.181 | 0.050 | 0.300 |
| 67 | suction-side | 0.183 | 0.048 | 0.300 |
| 68 | suction-side | 0.185 | 0.046 | 0.300 |
| 69 | suction-side | 0.187 | 0.044 | 0.300 |
| 70 | suction-side | 0.189 | 0.042 | 0.300 |
| 71 | suction-side | 0.191 | 0.040 | 0.300 |
| 72 | suction-side | 0.192 | 0.038 | 0.300 |
| 73 | suction-side | 0.194 | 0.036 | 0.300 |
| 74 | suction-side | 0.196 | 0.034 | 0.300 |
| 75 | suction-side | 0.198 | 0.032 | 0.300 |
| 76 | suction-side | 0.199 | 0.029 | 0.300 |
| 77 | suction-side | 0.201 | 0.027 | 0.300 |
| 78 | suction-side | 0.203 | 0.025 | 0.300 |
| 79 | suction-side | 0.205 | 0.023 | 0.300 |
| 80 | suction-side | 0.206 | 0.021 | 0.300 |
| 81 | suction-side | 0.208 | 0.019 | 0.300 |
| 82 | suction-side | 0.210 | 0.017 | 0.300 |
| 83 | suction-side | 0.211 | 0.015 | 0.300 |
| 84 | suction-side | 0.213 | 0.012 | 0.300 |
| 85 | suction-side | 0.215 | 0.010 | 0.300 |
| 86 | suction-side | 0.216 | 0.008 | 0.300 |
| 87 | suction-side | 0.218 | 0.006 | 0.300 |
| 88 | suction-side | 0.220 | 0.004 | 0.300 |
| 89 | suction-side | 0.221 | 0.001 | 0.300 |
| 90 | suction-side | 0.223 | −0.001 | 0.300 |
| 91 | suction-side | 0.225 | −0.003 | 0.300 |
| 92 | suction-side | 0.226 | −0.005 | 0.300 |
| 93 | suction-side | 0.228 | −0.007 | 0.300 |
| 94 | suction-side | 0.229 | −0.010 | 0.300 |
| 95 | suction-side | 0.230 | −0.014 | 0.300 |
| 96 | suction-side | 0.231 | −0.014 | 0.300 |
| 97 | suction-side | 0.231 | −0.013 | 0.300 |
| 98 | suction-side | 0.231 | −0.012 | 0.300 |
| 99 | suction-side | 0.231 | −0.013 | 0.300 |
| 100 | suction-side | 0.231 | −0.012 | 0.300 |
| 101 | pressure-side | 0.026 | 0.048 | 0.300 |
| 102 | pressure-side | 0.028 | 0.046 | 0.300 |
| 103 | pressure-side | 0.031 | 0.046 | 0.300 |
| 104 | pressure-side | 0.033 | 0.046 | 0.300 |
| 105 | pressure-side | 0.035 | 0.046 | 0.300 |
| 106 | pressure-side | 0.038 | 0.047 | 0.300 |
| 107 | pressure-side | 0.040 | 0.047 | 0.300 |
| 108 | pressure-side | 0.042 | 0.048 | 0.300 |
| 109 | pressure-side | 0.045 | 0.048 | 0.300 |

TABLE I-continued

Non-Dimensionalized (X Y Z/Span)

| N | Location | X | Y | Z |
|---|---|---|---|---|
| 110 | pressure-side | 0.047 | 0.048 | 0.300 |
| 111 | pressure-side | 0.049 | 0.049 | 0.300 |
| 112 | pressure-side | 0.052 | 0.049 | 0.300 |
| 113 | pressure-side | 0.054 | 0.050 | 0.300 |
| 114 | pressure-side | 0.057 | 0.050 | 0.300 |
| 115 | pressure-side | 0.059 | 0.050 | 0.300 |
| 116 | pressure-side | 0.061 | 0.051 | 0.300 |
| 117 | pressure-side | 0.064 | 0.051 | 0.300 |
| 118 | pressure-side | 0.066 | 0.051 | 0.300 |
| 119 | pressure-side | 0.068 | 0.052 | 0.300 |
| 120 | pressure-side | 0.071 | 0.052 | 0.300 |
| 121 | pressure-side | 0.073 | 0.052 | 0.300 |
| 122 | pressure-side | 0.075 | 0.052 | 0.300 |
| 123 | pressure-side | 0.078 | 0.052 | 0.300 |
| 124 | pressure-side | 0.080 | 0.053 | 0.300 |
| 125 | pressure-side | 0.083 | 0.053 | 0.300 |
| 126 | pressure-side | 0.085 | 0.053 | 0.300 |
| 127 | pressure-side | 0.087 | 0.053 | 0.300 |
| 128 | pressure-side | 0.090 | 0.053 | 0.300 |
| 129 | pressure-side | 0.092 | 0.053 | 0.300 |
| 130 | pressure-side | 0.095 | 0.053 | 0.300 |
| 131 | pressure-side | 0.097 | 0.053 | 0.300 |
| 132 | pressure-side | 0.099 | 0.053 | 0.300 |
| 133 | pressure-side | 0.102 | 0.052 | 0.300 |
| 134 | pressure-side | 0.104 | 0.052 | 0.300 |
| 135 | pressure-side | 0.107 | 0.052 | 0.300 |
| 136 | pressure-side | 0.109 | 0.052 | 0.300 |
| 137 | pressure-side | 0.111 | 0.052 | 0.300 |
| 138 | pressure-side | 0.114 | 0.051 | 0.300 |
| 139 | pressure-side | 0.116 | 0.051 | 0.300 |
| 140 | pressure-side | 0.118 | 0.051 | 0.300 |
| 141 | pressure-side | 0.121 | 0.050 | 0.300 |
| 142 | pressure-side | 0.123 | 0.050 | 0.300 |
| 143 | pressure-side | 0.125 | 0.049 | 0.300 |
| 144 | pressure-side | 0.128 | 0.049 | 0.300 |
| 145 | pressure-side | 0.130 | 0.048 | 0.300 |
| 146 | pressure-side | 0.132 | 0.048 | 0.300 |
| 147 | pressure-side | 0.135 | 0.047 | 0.300 |
| 148 | pressure-side | 0.137 | 0.047 | 0.300 |
| 149 | pressure-side | 0.139 | 0.046 | 0.300 |
| 150 | pressure-side | 0.142 | 0.046 | 0.300 |
| 151 | pressure-side | 0.144 | 0.045 | 0.300 |
| 152 | pressure-side | 0.146 | 0.044 | 0.300 |
| 153 | pressure-side | 0.149 | 0.043 | 0.300 |
| 154 | pressure-side | 0.151 | 0.043 | 0.300 |
| 155 | pressure-side | 0.153 | 0.042 | 0.300 |
| 156 | pressure-side | 0.155 | 0.041 | 0.300 |
| 157 | pressure-side | 0.157 | 0.040 | 0.300 |
| 158 | pressure-side | 0.160 | 0.039 | 0.300 |
| 159 | pressure-side | 0.162 | 0.038 | 0.300 |
| 160 | pressure-side | 0.164 | 0.037 | 0.300 |
| 161 | pressure-side | 0.166 | 0.036 | 0.300 |
| 162 | pressure-side | 0.168 | 0.035 | 0.300 |
| 163 | pressure-side | 0.170 | 0.034 | 0.300 |
| 164 | pressure-side | 0.173 | 0.033 | 0.300 |
| 165 | pressure-side | 0.175 | 0.032 | 0.300 |
| 166 | pressure-side | 0.177 | 0.031 | 0.300 |
| 167 | pressure-side | 0.179 | 0.030 | 0.300 |
| 168 | pressure-side | 0.181 | 0.029 | 0.300 |
| 169 | pressure-side | 0.183 | 0.027 | 0.300 |
| 170 | pressure-side | 0.185 | 0.026 | 0.300 |
| 171 | pressure-side | 0.187 | 0.025 | 0.300 |
| 172 | pressure-side | 0.189 | 0.023 | 0.300 |
| 173 | pressure-side | 0.191 | 0.022 | 0.300 |
| 174 | pressure-side | 0.193 | 0.021 | 0.300 |
| 175 | pressure-side | 0.195 | 0.019 | 0.300 |
| 176 | pressure-side | 0.196 | 0.018 | 0.300 |
| 177 | pressure-side | 0.198 | 0.016 | 0.300 |
| 178 | pressure-side | 0.200 | 0.015 | 0.300 |
| 179 | pressure-side | 0.202 | 0.013 | 0.300 |
| 180 | pressure-side | 0.204 | 0.012 | 0.300 |
| 181 | pressure-side | 0.205 | 0.010 | 0.300 |
| 182 | pressure-side | 0.207 | 0.008 | 0.300 |
| 183 | pressure-side | 0.209 | 0.007 | 0.300 |
| 184 | pressure-side | 0.210 | 0.005 | 0.300 |
| 185 | pressure-side | 0.212 | 0.003 | 0.300 |
| 186 | pressure-side | 0.214 | 0.001 | 0.300 |
| 187 | pressure-side | 0.215 | 0.000 | 0.300 |
| 188 | pressure-side | 0.217 | −0.002 | 0.300 |
| 189 | pressure-side | 0.218 | −0.004 | 0.300 |
| 190 | pressure-side | 0.220 | −0.006 | 0.300 |
| 191 | pressure-side | 0.222 | −0.007 | 0.300 |
| 192 | pressure-side | 0.223 | −0.009 | 0.300 |
| 193 | pressure-side | 0.225 | −0.011 | 0.300 |
| 194 | pressure-side | 0.226 | −0.013 | 0.300 |
| 195 | pressure-side | 0.228 | −0.015 | 0.300 |
| 196 | pressure-side | 0.228 | −0.015 | 0.300 |
| 197 | pressure-side | 0.229 | −0.015 | 0.300 |
| 198 | pressure-side | 0.230 | −0.015 | 0.300 |
| 199 | pressure-side | 0.230 | −0.014 | 0.300 |
| 200 | pressure-side | 0.230 | −0.014 | 0.300 |
| 1 | suction-side | 0.032 | 0.064 | 0.400 |
| 2 | suction-side | 0.032 | 0.067 | 0.400 |
| 3 | suction-side | 0.034 | 0.069 | 0.400 |
| 4 | suction-side | 0.036 | 0.071 | 0.400 |
| 5 | suction-side | 0.038 | 0.073 | 0.400 |
| 6 | suction-side | 0.040 | 0.074 | 0.400 |
| 7 | suction-side | 0.042 | 0.076 | 0.400 |
| 8 | suction-side | 0.044 | 0.077 | 0.400 |
| 9 | suction-side | 0.047 | 0.078 | 0.400 |
| 10 | suction-side | 0.049 | 0.079 | 0.400 |
| 11 | suction-side | 0.051 | 0.081 | 0.400 |
| 12 | suction-side | 0.054 | 0.082 | 0.400 |
| 13 | suction-side | 0.056 | 0.083 | 0.400 |
| 14 | suction-side | 0.058 | 0.084 | 0.400 |
| 15 | suction-side | 0.061 | 0.084 | 0.400 |
| 16 | suction-side | 0.063 | 0.085 | 0.400 |
| 17 | suction-side | 0.066 | 0.086 | 0.400 |
| 18 | suction-side | 0.068 | 0.086 | 0.400 |
| 19 | suction-side | 0.071 | 0.087 | 0.400 |
| 20 | suction-side | 0.073 | 0.087 | 0.400 |
| 21 | suction-side | 0.076 | 0.088 | 0.400 |
| 22 | suction-side | 0.078 | 0.088 | 0.400 |
| 23 | suction-side | 0.081 | 0.088 | 0.400 |
| 24 | suction-side | 0.084 | 0.089 | 0.400 |
| 25 | suction-side | 0.086 | 0.089 | 0.400 |
| 26 | suction-side | 0.089 | 0.089 | 0.400 |
| 27 | suction-side | 0.091 | 0.089 | 0.400 |
| 28 | suction-side | 0.094 | 0.089 | 0.400 |
| 29 | suction-side | 0.097 | 0.089 | 0.400 |
| 30 | suction-side | 0.099 | 0.089 | 0.400 |
| 31 | suction-side | 0.102 | 0.088 | 0.400 |
| 32 | suction-side | 0.104 | 0.088 | 0.400 |
| 33 | suction-side | 0.107 | 0.088 | 0.400 |
| 34 | suction-side | 0.109 | 0.087 | 0.400 |
| 35 | suction-side | 0.112 | 0.087 | 0.400 |
| 36 | suction-side | 0.114 | 0.086 | 0.400 |
| 37 | suction-side | 0.117 | 0.086 | 0.400 |
| 38 | suction-side | 0.119 | 0.085 | 0.400 |
| 39 | suction-side | 0.122 | 0.084 | 0.400 |
| 40 | suction-side | 0.124 | 0.083 | 0.400 |
| 41 | suction-side | 0.127 | 0.083 | 0.400 |
| 42 | suction-side | 0.129 | 0.082 | 0.400 |
| 43 | suction-side | 0.131 | 0.081 | 0.400 |
| 44 | suction-side | 0.134 | 0.079 | 0.400 |
| 45 | suction-side | 0.136 | 0.078 | 0.400 |
| 46 | suction-side | 0.138 | 0.077 | 0.400 |
| 47 | suction-side | 0.141 | 0.076 | 0.400 |
| 48 | suction-side | 0.143 | 0.074 | 0.400 |
| 49 | suction-side | 0.145 | 0.073 | 0.400 |
| 50 | suction-side | 0.147 | 0.071 | 0.400 |
| 51 | suction-side | 0.149 | 0.070 | 0.400 |
| 52 | suction-side | 0.151 | 0.068 | 0.400 |
| 53 | suction-side | 0.153 | 0.067 | 0.400 |
| 54 | suction-side | 0.155 | 0.065 | 0.400 |
| 55 | suction-side | 0.157 | 0.063 | 0.400 |
| 56 | suction-side | 0.159 | 0.062 | 0.400 |
| 57 | suction-side | 0.161 | 0.060 | 0.400 |
| 58 | suction-side | 0.163 | 0.058 | 0.400 |
| 59 | suction-side | 0.165 | 0.056 | 0.400 |
| 60 | suction-side | 0.166 | 0.054 | 0.400 |
| 61 | suction-side | 0.168 | 0.053 | 0.400 |

TABLE I-continued

Non-Dimensionalized (X Y Z/Span)

| N | Location | X | Y | Z |
|---|---|---|---|---|
| 62 | suction-side | 0.170 | 0.051 | 0.400 |
| 63 | suction-side | 0.172 | 0.049 | 0.400 |
| 64 | suction-side | 0.173 | 0.047 | 0.400 |
| 65 | suction-side | 0.175 | 0.045 | 0.400 |
| 66 | suction-side | 0.177 | 0.043 | 0.400 |
| 67 | suction-side | 0.178 | 0.041 | 0.400 |
| 68 | suction-side | 0.180 | 0.039 | 0.400 |
| 69 | suction-side | 0.182 | 0.037 | 0.400 |
| 70 | suction-side | 0.183 | 0.035 | 0.400 |
| 71 | suction-side | 0.185 | 0.033 | 0.400 |
| 72 | suction-side | 0.186 | 0.031 | 0.400 |
| 73 | suction-side | 0.188 | 0.029 | 0.400 |
| 74 | suction-side | 0.190 | 0.027 | 0.400 |
| 75 | suction-side | 0.191 | 0.025 | 0.400 |
| 76 | suction-side | 0.193 | 0.023 | 0.400 |
| 77 | suction-side | 0.195 | 0.021 | 0.400 |
| 78 | suction-side | 0.196 | 0.019 | 0.400 |
| 79 | suction-side | 0.198 | 0.017 | 0.400 |
| 80 | suction-side | 0.199 | 0.015 | 0.400 |
| 81 | suction-side | 0.201 | 0.013 | 0.400 |
| 82 | suction-side | 0.202 | 0.011 | 0.400 |
| 83 | suction-side | 0.204 | 0.009 | 0.400 |
| 84 | suction-side | 0.206 | 0.006 | 0.400 |
| 85 | suction-side | 0.207 | 0.004 | 0.400 |
| 86 | suction-side | 0.209 | 0.002 | 0.400 |
| 87 | suction-side | 0.210 | 0.000 | 0.400 |
| 88 | suction-side | 0.212 | −0.002 | 0.400 |
| 89 | suction-side | 0.213 | −0.004 | 0.400 |
| 90 | suction-side | 0.215 | −0.006 | 0.400 |
| 91 | suction-side | 0.216 | −0.008 | 0.400 |
| 92 | suction-side | 0.218 | −0.010 | 0.400 |
| 93 | suction-side | 0.220 | −0.012 | 0.400 |
| 94 | suction-side | 0.221 | −0.014 | 0.400 |
| 95 | suction-side | 0.222 | −0.019 | 0.400 |
| 96 | suction-side | 0.222 | −0.018 | 0.400 |
| 97 | suction-side | 0.222 | −0.018 | 0.400 |
| 98 | suction-side | 0.222 | −0.016 | 0.400 |
| 99 | suction-side | 0.223 | −0.018 | 0.400 |
| 100 | suction-side | 0.223 | −0.017 | 0.400 |
| 101 | pressure-side | 0.032 | 0.064 | 0.400 |
| 102 | pressure-side | 0.034 | 0.063 | 0.400 |
| 103 | pressure-side | 0.036 | 0.063 | 0.400 |
| 104 | pressure-side | 0.038 | 0.063 | 0.400 |
| 105 | pressure-side | 0.041 | 0.063 | 0.400 |
| 106 | pressure-side | 0.043 | 0.063 | 0.400 |
| 107 | pressure-side | 0.045 | 0.063 | 0.400 |
| 108 | pressure-side | 0.048 | 0.064 | 0.400 |
| 109 | pressure-side | 0.050 | 0.064 | 0.400 |
| 110 | pressure-side | 0.052 | 0.064 | 0.400 |
| 111 | pressure-side | 0.054 | 0.064 | 0.400 |
| 112 | pressure-side | 0.057 | 0.064 | 0.400 |
| 113 | pressure-side | 0.059 | 0.064 | 0.400 |
| 114 | pressure-side | 0.061 | 0.064 | 0.400 |
| 115 | pressure-side | 0.064 | 0.064 | 0.400 |
| 116 | pressure-side | 0.066 | 0.064 | 0.400 |
| 117 | pressure-side | 0.068 | 0.064 | 0.400 |
| 118 | pressure-side | 0.070 | 0.064 | 0.400 |
| 119 | pressure-side | 0.073 | 0.064 | 0.400 |
| 120 | pressure-side | 0.075 | 0.064 | 0.400 |
| 121 | pressure-side | 0.077 | 0.064 | 0.400 |
| 122 | pressure-side | 0.080 | 0.063 | 0.400 |
| 123 | pressure-side | 0.082 | 0.063 | 0.400 |
| 124 | pressure-side | 0.084 | 0.063 | 0.400 |
| 125 | pressure-side | 0.086 | 0.063 | 0.400 |
| 126 | pressure-side | 0.089 | 0.062 | 0.400 |
| 127 | pressure-side | 0.091 | 0.062 | 0.400 |
| 128 | pressure-side | 0.093 | 0.062 | 0.400 |
| 129 | pressure-side | 0.095 | 0.061 | 0.400 |
| 130 | pressure-side | 0.098 | 0.061 | 0.400 |
| 131 | pressure-side | 0.100 | 0.060 | 0.400 |
| 132 | pressure-side | 0.102 | 0.060 | 0.400 |
| 133 | pressure-side | 0.104 | 0.059 | 0.400 |
| 134 | pressure-side | 0.107 | 0.059 | 0.400 |
| 135 | pressure-side | 0.109 | 0.058 | 0.400 |
| 136 | pressure-side | 0.111 | 0.057 | 0.400 |
| 137 | pressure-side | 0.113 | 0.057 | 0.400 |
| 138 | pressure-side | 0.115 | 0.056 | 0.400 |
| 139 | pressure-side | 0.118 | 0.055 | 0.400 |
| 140 | pressure-side | 0.120 | 0.055 | 0.400 |
| 141 | pressure-side | 0.122 | 0.054 | 0.400 |
| 142 | pressure-side | 0.124 | 0.053 | 0.400 |
| 143 | pressure-side | 0.126 | 0.052 | 0.400 |
| 144 | pressure-side | 0.128 | 0.051 | 0.400 |
| 145 | pressure-side | 0.130 | 0.051 | 0.400 |
| 146 | pressure-side | 0.133 | 0.050 | 0.400 |
| 147 | pressure-side | 0.135 | 0.049 | 0.400 |
| 148 | pressure-side | 0.137 | 0.048 | 0.400 |
| 149 | pressure-side | 0.139 | 0.047 | 0.400 |
| 150 | pressure-side | 0.141 | 0.046 | 0.400 |
| 151 | pressure-side | 0.143 | 0.045 | 0.400 |
| 152 | pressure-side | 0.145 | 0.044 | 0.400 |
| 153 | pressure-side | 0.147 | 0.043 | 0.400 |
| 154 | pressure-side | 0.149 | 0.042 | 0.400 |
| 155 | pressure-side | 0.151 | 0.040 | 0.400 |
| 156 | pressure-side | 0.153 | 0.039 | 0.400 |
| 157 | pressure-side | 0.155 | 0.038 | 0.400 |
| 158 | pressure-side | 0.157 | 0.037 | 0.400 |
| 159 | pressure-side | 0.159 | 0.036 | 0.400 |
| 160 | pressure-side | 0.161 | 0.035 | 0.400 |
| 161 | pressure-side | 0.163 | 0.033 | 0.400 |
| 162 | pressure-side | 0.165 | 0.032 | 0.400 |
| 163 | pressure-side | 0.166 | 0.031 | 0.400 |
| 164 | pressure-side | 0.168 | 0.029 | 0.400 |
| 165 | pressure-side | 0.170 | 0.028 | 0.400 |
| 166 | pressure-side | 0.172 | 0.027 | 0.400 |
| 167 | pressure-side | 0.174 | 0.025 | 0.400 |
| 168 | pressure-side | 0.176 | 0.024 | 0.400 |
| 169 | pressure-side | 0.177 | 0.023 | 0.400 |
| 170 | pressure-side | 0.179 | 0.021 | 0.400 |
| 171 | pressure-side | 0.181 | 0.020 | 0.400 |
| 172 | pressure-side | 0.183 | 0.018 | 0.400 |
| 173 | pressure-side | 0.185 | 0.017 | 0.400 |
| 174 | pressure-side | 0.186 | 0.015 | 0.400 |
| 175 | pressure-side | 0.188 | 0.014 | 0.400 |
| 176 | pressure-side | 0.190 | 0.012 | 0.400 |
| 177 | pressure-side | 0.191 | 0.011 | 0.400 |
| 178 | pressure-side | 0.193 | 0.009 | 0.400 |
| 179 | pressure-side | 0.195 | 0.008 | 0.400 |
| 180 | pressure-side | 0.196 | 0.006 | 0.400 |
| 181 | pressure-side | 0.198 | 0.004 | 0.400 |
| 182 | pressure-side | 0.200 | 0.003 | 0.400 |
| 183 | pressure-side | 0.201 | 0.001 | 0.400 |
| 184 | pressure-side | 0.203 | 0.000 | 0.400 |
| 185 | pressure-side | 0.204 | −0.002 | 0.400 |
| 186 | pressure-side | 0.206 | −0.004 | 0.400 |
| 187 | pressure-side | 0.207 | −0.006 | 0.400 |
| 188 | pressure-side | 0.209 | −0.007 | 0.400 |
| 189 | pressure-side | 0.210 | −0.009 | 0.400 |
| 190 | pressure-side | 0.212 | −0.011 | 0.400 |
| 191 | pressure-side | 0.214 | −0.012 | 0.400 |
| 192 | pressure-side | 0.215 | −0.014 | 0.400 |
| 193 | pressure-side | 0.216 | −0.016 | 0.400 |
| 194 | pressure-side | 0.218 | −0.018 | 0.400 |
| 195 | pressure-side | 0.220 | −0.019 | 0.400 |
| 196 | pressure-side | 0.220 | −0.019 | 0.400 |
| 197 | pressure-side | 0.221 | −0.019 | 0.400 |
| 198 | pressure-side | 0.221 | −0.019 | 0.400 |
| 199 | pressure-side | 0.222 | −0.019 | 0.400 |
| 200 | pressure-side | 0.222 | −0.019 | 0.400 |
| 1 | suction-side | 0.035 | 0.082 | 0.500 |
| 2 | suction-side | 0.035 | 0.084 | 0.500 |
| 3 | suction-side | 0.037 | 0.086 | 0.500 |
| 4 | suction-side | 0.039 | 0.088 | 0.500 |
| 5 | suction-side | 0.041 | 0.089 | 0.500 |
| 6 | suction-side | 0.043 | 0.090 | 0.500 |
| 7 | suction-side | 0.045 | 0.092 | 0.500 |
| 8 | suction-side | 0.048 | 0.093 | 0.500 |
| 9 | suction-side | 0.050 | 0.094 | 0.500 |
| 10 | suction-side | 0.053 | 0.094 | 0.500 |
| 11 | suction-side | 0.055 | 0.095 | 0.500 |
| 12 | suction-side | 0.057 | 0.096 | 0.500 |
| 13 | suction-side | 0.060 | 0.096 | 0.500 |

TABLE I-continued

Non-Dimensionalized (X Y Z/Span)

| N | Location | X | Y | Z |
|---|---|---|---|---|
| 14 | suction-side | 0.062 | 0.097 | 0.500 |
| 15 | suction-side | 0.065 | 0.097 | 0.500 |
| 16 | suction-side | 0.067 | 0.098 | 0.500 |
| 17 | suction-side | 0.070 | 0.098 | 0.500 |
| 18 | suction-side | 0.073 | 0.098 | 0.500 |
| 19 | suction-side | 0.075 | 0.098 | 0.500 |
| 20 | suction-side | 0.078 | 0.098 | 0.500 |
| 21 | suction-side | 0.080 | 0.098 | 0.500 |
| 22 | suction-side | 0.083 | 0.098 | 0.500 |
| 23 | suction-side | 0.085 | 0.098 | 0.500 |
| 24 | suction-side | 0.088 | 0.097 | 0.500 |
| 25 | suction-side | 0.090 | 0.097 | 0.500 |
| 26 | suction-side | 0.093 | 0.097 | 0.500 |
| 27 | suction-side | 0.095 | 0.096 | 0.500 |
| 28 | suction-side | 0.098 | 0.096 | 0.500 |
| 29 | suction-side | 0.100 | 0.095 | 0.500 |
| 30 | suction-side | 0.103 | 0.094 | 0.500 |
| 31 | suction-side | 0.105 | 0.093 | 0.500 |
| 32 | suction-side | 0.108 | 0.093 | 0.500 |
| 33 | suction-side | 0.110 | 0.092 | 0.500 |
| 34 | suction-side | 0.112 | 0.091 | 0.500 |
| 35 | suction-side | 0.115 | 0.090 | 0.500 |
| 36 | suction-side | 0.117 | 0.089 | 0.500 |
| 37 | suction-side | 0.119 | 0.087 | 0.500 |
| 38 | suction-side | 0.121 | 0.086 | 0.500 |
| 39 | suction-side | 0.124 | 0.085 | 0.500 |
| 40 | suction-side | 0.126 | 0.084 | 0.500 |
| 41 | suction-side | 0.128 | 0.082 | 0.500 |
| 42 | suction-side | 0.130 | 0.081 | 0.500 |
| 43 | suction-side | 0.132 | 0.079 | 0.500 |
| 44 | suction-side | 0.134 | 0.078 | 0.500 |
| 45 | suction-side | 0.136 | 0.076 | 0.500 |
| 46 | suction-side | 0.138 | 0.075 | 0.500 |
| 47 | suction-side | 0.140 | 0.073 | 0.500 |
| 48 | suction-side | 0.142 | 0.071 | 0.500 |
| 49 | suction-side | 0.144 | 0.070 | 0.500 |
| 50 | suction-side | 0.146 | 0.068 | 0.500 |
| 51 | suction-side | 0.147 | 0.066 | 0.500 |
| 52 | suction-side | 0.149 | 0.064 | 0.500 |
| 53 | suction-side | 0.151 | 0.063 | 0.500 |
| 54 | suction-side | 0.153 | 0.061 | 0.500 |
| 55 | suction-side | 0.154 | 0.059 | 0.500 |
| 56 | suction-side | 0.156 | 0.057 | 0.500 |
| 57 | suction-side | 0.158 | 0.055 | 0.500 |
| 58 | suction-side | 0.160 | 0.053 | 0.500 |
| 59 | suction-side | 0.161 | 0.051 | 0.500 |
| 60 | suction-side | 0.163 | 0.049 | 0.500 |
| 61 | suction-side | 0.164 | 0.047 | 0.500 |
| 62 | suction-side | 0.166 | 0.045 | 0.500 |
| 63 | suction-side | 0.168 | 0.043 | 0.500 |
| 64 | suction-side | 0.169 | 0.041 | 0.500 |
| 65 | suction-side | 0.171 | 0.039 | 0.500 |
| 66 | suction-side | 0.172 | 0.037 | 0.500 |
| 67 | suction-side | 0.174 | 0.035 | 0.500 |
| 68 | suction-side | 0.176 | 0.033 | 0.500 |
| 69 | suction-side | 0.177 | 0.031 | 0.500 |
| 70 | suction-side | 0.179 | 0.029 | 0.500 |
| 71 | suction-side | 0.180 | 0.027 | 0.500 |
| 72 | suction-side | 0.182 | 0.025 | 0.500 |
| 73 | suction-side | 0.183 | 0.023 | 0.500 |
| 74 | suction-side | 0.185 | 0.021 | 0.500 |
| 75 | suction-side | 0.186 | 0.019 | 0.500 |
| 76 | suction-side | 0.188 | 0.017 | 0.500 |
| 77 | suction-side | 0.189 | 0.015 | 0.500 |
| 78 | suction-side | 0.191 | 0.013 | 0.500 |
| 79 | suction-side | 0.193 | 0.011 | 0.500 |
| 80 | suction-side | 0.194 | 0.009 | 0.500 |
| 81 | suction-side | 0.196 | 0.007 | 0.500 |
| 82 | suction-side | 0.197 | 0.005 | 0.500 |
| 83 | suction-side | 0.199 | 0.003 | 0.500 |
| 84 | suction-side | 0.200 | 0.001 | 0.500 |
| 85 | suction-side | 0.202 | −0.001 | 0.500 |
| 86 | suction-side | 0.203 | −0.003 | 0.500 |
| 87 | suction-side | 0.205 | −0.005 | 0.500 |
| 88 | suction-side | 0.206 | −0.007 | 0.500 |
| 89 | suction-side | 0.208 | −0.009 | 0.500 |
| 90 | suction-side | 0.209 | −0.011 | 0.500 |
| 91 | suction-side | 0.211 | −0.013 | 0.500 |
| 92 | suction-side | 0.212 | −0.015 | 0.500 |
| 93 | suction-side | 0.214 | −0.017 | 0.500 |
| 94 | suction-side | 0.215 | −0.020 | 0.500 |
| 95 | suction-side | 0.216 | −0.024 | 0.500 |
| 96 | suction-side | 0.216 | −0.024 | 0.500 |
| 97 | suction-side | 0.216 | −0.023 | 0.500 |
| 98 | suction-side | 0.217 | −0.022 | 0.500 |
| 99 | suction-side | 0.217 | −0.023 | 0.500 |
| 100 | suction-side | 0.217 | −0.022 | 0.500 |
| 101 | pressure-side | 0.035 | 0.082 | 0.500 |
| 102 | pressure-side | 0.036 | 0.080 | 0.500 |
| 103 | pressure-side | 0.039 | 0.080 | 0.500 |
| 104 | pressure-side | 0.041 | 0.080 | 0.500 |
| 105 | pressure-side | 0.043 | 0.080 | 0.500 |
| 106 | pressure-side | 0.046 | 0.080 | 0.500 |
| 107 | pressure-side | 0.048 | 0.080 | 0.500 |
| 108 | pressure-side | 0.050 | 0.080 | 0.500 |
| 109 | pressure-side | 0.053 | 0.080 | 0.500 |
| 110 | pressure-side | 0.055 | 0.080 | 0.500 |
| 111 | pressure-side | 0.057 | 0.080 | 0.500 |
| 112 | pressure-side | 0.060 | 0.080 | 0.500 |
| 113 | pressure-side | 0.062 | 0.080 | 0.500 |
| 114 | pressure-side | 0.064 | 0.080 | 0.500 |
| 115 | pressure-side | 0.067 | 0.080 | 0.500 |
| 116 | pressure-side | 0.069 | 0.079 | 0.500 |
| 117 | pressure-side | 0.071 | 0.079 | 0.500 |
| 118 | pressure-side | 0.074 | 0.079 | 0.500 |
| 119 | pressure-side | 0.076 | 0.079 | 0.500 |
| 120 | pressure-side | 0.078 | 0.078 | 0.500 |
| 121 | pressure-side | 0.081 | 0.078 | 0.500 |
| 122 | pressure-side | 0.083 | 0.077 | 0.500 |
| 123 | pressure-side | 0.085 | 0.077 | 0.500 |
| 124 | pressure-side | 0.087 | 0.076 | 0.500 |
| 125 | pressure-side | 0.090 | 0.076 | 0.500 |
| 126 | pressure-side | 0.092 | 0.075 | 0.500 |
| 127 | pressure-side | 0.094 | 0.075 | 0.500 |
| 128 | pressure-side | 0.096 | 0.074 | 0.500 |
| 129 | pressure-side | 0.098 | 0.073 | 0.500 |
| 130 | pressure-side | 0.100 | 0.072 | 0.500 |
| 131 | pressure-side | 0.103 | 0.072 | 0.500 |
| 132 | pressure-side | 0.105 | 0.071 | 0.500 |
| 133 | pressure-side | 0.107 | 0.070 | 0.500 |
| 134 | pressure-side | 0.109 | 0.069 | 0.500 |
| 135 | pressure-side | 0.111 | 0.068 | 0.500 |
| 136 | pressure-side | 0.113 | 0.067 | 0.500 |
| 137 | pressure-side | 0.115 | 0.066 | 0.500 |
| 138 | pressure-side | 0.117 | 0.065 | 0.500 |
| 139 | pressure-side | 0.119 | 0.064 | 0.500 |
| 140 | pressure-side | 0.121 | 0.062 | 0.500 |
| 141 | pressure-side | 0.123 | 0.061 | 0.500 |
| 142 | pressure-side | 0.125 | 0.060 | 0.500 |
| 143 | pressure-side | 0.127 | 0.059 | 0.500 |
| 144 | pressure-side | 0.129 | 0.057 | 0.500 |
| 145 | pressure-side | 0.131 | 0.056 | 0.500 |
| 146 | pressure-side | 0.133 | 0.055 | 0.500 |
| 147 | pressure-side | 0.135 | 0.053 | 0.500 |
| 148 | pressure-side | 0.137 | 0.052 | 0.500 |
| 149 | pressure-side | 0.138 | 0.051 | 0.500 |
| 150 | pressure-side | 0.140 | 0.049 | 0.500 |
| 151 | pressure-side | 0.142 | 0.048 | 0.500 |
| 152 | pressure-side | 0.144 | 0.046 | 0.500 |
| 153 | pressure-side | 0.146 | 0.045 | 0.500 |
| 154 | pressure-side | 0.147 | 0.043 | 0.500 |
| 155 | pressure-side | 0.149 | 0.042 | 0.500 |
| 156 | pressure-side | 0.151 | 0.040 | 0.500 |
| 157 | pressure-side | 0.153 | 0.039 | 0.500 |
| 158 | pressure-side | 0.154 | 0.037 | 0.500 |
| 159 | pressure-side | 0.156 | 0.036 | 0.500 |
| 160 | pressure-side | 0.158 | 0.034 | 0.500 |
| 161 | pressure-side | 0.159 | 0.032 | 0.500 |
| 162 | pressure-side | 0.161 | 0.031 | 0.500 |
| 163 | pressure-side | 0.163 | 0.029 | 0.500 |
| 164 | pressure-side | 0.164 | 0.028 | 0.500 |
| 165 | pressure-side | 0.166 | 0.026 | 0.500 |

TABLE I-continued

Non-Dimensionalized (X Y Z/Span)

| N | Location | X | Y | Z |
|---|---|---|---|---|
| 166 | pressure-side | 0.168 | 0.024 | 0.500 |
| 167 | pressure-side | 0.169 | 0.023 | 0.500 |
| 168 | pressure-side | 0.171 | 0.021 | 0.500 |
| 169 | pressure-side | 0.173 | 0.020 | 0.500 |
| 170 | pressure-side | 0.174 | 0.018 | 0.500 |
| 171 | pressure-side | 0.176 | 0.016 | 0.500 |
| 172 | pressure-side | 0.177 | 0.015 | 0.500 |
| 173 | pressure-side | 0.179 | 0.013 | 0.500 |
| 174 | pressure-side | 0.181 | 0.011 | 0.500 |
| 175 | pressure-side | 0.182 | 0.010 | 0.500 |
| 176 | pressure-side | 0.184 | 0.008 | 0.500 |
| 177 | pressure-side | 0.186 | 0.006 | 0.500 |
| 178 | pressure-side | 0.187 | 0.005 | 0.500 |
| 179 | pressure-side | 0.189 | 0.003 | 0.500 |
| 180 | pressure-side | 0.190 | 0.001 | 0.500 |
| 181 | pressure-side | 0.192 | 0.000 | 0.500 |
| 182 | pressure-side | 0.194 | −0.002 | 0.500 |
| 183 | pressure-side | 0.195 | −0.004 | 0.500 |
| 184 | pressure-side | 0.197 | −0.005 | 0.500 |
| 185 | pressure-side | 0.198 | −0.007 | 0.500 |
| 186 | pressure-side | 0.200 | −0.009 | 0.500 |
| 187 | pressure-side | 0.201 | −0.010 | 0.500 |
| 188 | pressure-side | 0.203 | −0.012 | 0.500 |
| 189 | pressure-side | 0.204 | −0.014 | 0.500 |
| 190 | pressure-side | 0.206 | −0.016 | 0.500 |
| 191 | pressure-side | 0.207 | −0.017 | 0.500 |
| 192 | pressure-side | 0.209 | −0.019 | 0.500 |
| 193 | pressure-side | 0.210 | −0.021 | 0.500 |
| 194 | pressure-side | 0.212 | −0.023 | 0.500 |
| 195 | pressure-side | 0.214 | −0.024 | 0.500 |
| 196 | pressure-side | 0.214 | −0.024 | 0.500 |
| 197 | pressure-side | 0.215 | −0.024 | 0.500 |
| 198 | pressure-side | 0.215 | −0.024 | 0.500 |
| 199 | pressure-side | 0.216 | −0.024 | 0.500 |
| 200 | pressure-side | 0.216 | −0.024 | 0.500 |
| 1 | suction-side | 0.037 | 0.100 | 0.600 |
| 2 | suction-side | 0.039 | 0.102 | 0.600 |
| 3 | suction-side | 0.040 | 0.104 | 0.600 |
| 4 | suction-side | 0.043 | 0.105 | 0.600 |
| 5 | suction-side | 0.045 | 0.106 | 0.600 |
| 6 | suction-side | 0.047 | 0.107 | 0.600 |
| 7 | suction-side | 0.050 | 0.108 | 0.600 |
| 8 | suction-side | 0.052 | 0.108 | 0.600 |
| 9 | suction-side | 0.055 | 0.109 | 0.600 |
| 10 | suction-side | 0.057 | 0.109 | 0.600 |
| 11 | suction-side | 0.060 | 0.109 | 0.600 |
| 12 | suction-side | 0.062 | 0.109 | 0.600 |
| 13 | suction-side | 0.065 | 0.109 | 0.600 |
| 14 | suction-side | 0.068 | 0.109 | 0.600 |
| 15 | suction-side | 0.070 | 0.109 | 0.600 |
| 16 | suction-side | 0.073 | 0.109 | 0.600 |
| 17 | suction-side | 0.075 | 0.109 | 0.600 |
| 18 | suction-side | 0.078 | 0.108 | 0.600 |
| 19 | suction-side | 0.080 | 0.108 | 0.600 |
| 20 | suction-side | 0.083 | 0.107 | 0.600 |
| 21 | suction-side | 0.085 | 0.107 | 0.600 |
| 22 | suction-side | 0.087 | 0.106 | 0.600 |
| 23 | suction-side | 0.090 | 0.105 | 0.600 |
| 24 | suction-side | 0.092 | 0.104 | 0.600 |
| 25 | suction-side | 0.095 | 0.104 | 0.600 |
| 26 | suction-side | 0.097 | 0.103 | 0.600 |
| 27 | suction-side | 0.099 | 0.101 | 0.600 |
| 28 | suction-side | 0.102 | 0.100 | 0.600 |
| 29 | suction-side | 0.104 | 0.099 | 0.600 |
| 30 | suction-side | 0.106 | 0.098 | 0.600 |
| 31 | suction-side | 0.108 | 0.097 | 0.600 |
| 32 | suction-side | 0.110 | 0.095 | 0.600 |
| 33 | suction-side | 0.112 | 0.094 | 0.600 |
| 34 | suction-side | 0.115 | 0.092 | 0.600 |
| 35 | suction-side | 0.117 | 0.091 | 0.600 |
| 36 | suction-side | 0.119 | 0.089 | 0.600 |
| 37 | suction-side | 0.121 | 0.088 | 0.600 |
| 38 | suction-side | 0.122 | 0.086 | 0.600 |
| 39 | suction-side | 0.124 | 0.085 | 0.600 |
| 40 | suction-side | 0.126 | 0.083 | 0.600 |
| 41 | suction-side | 0.128 | 0.081 | 0.600 |
| 42 | suction-side | 0.130 | 0.079 | 0.600 |
| 43 | suction-side | 0.132 | 0.078 | 0.600 |
| 44 | suction-side | 0.133 | 0.076 | 0.600 |
| 45 | suction-side | 0.135 | 0.074 | 0.600 |
| 46 | suction-side | 0.137 | 0.072 | 0.600 |
| 47 | suction-side | 0.139 | 0.070 | 0.600 |
| 48 | suction-side | 0.140 | 0.069 | 0.600 |
| 49 | suction-side | 0.142 | 0.067 | 0.600 |
| 50 | suction-side | 0.144 | 0.065 | 0.600 |
| 51 | suction-side | 0.145 | 0.063 | 0.600 |
| 52 | suction-side | 0.147 | 0.061 | 0.600 |
| 53 | suction-side | 0.148 | 0.059 | 0.600 |
| 54 | suction-side | 0.150 | 0.057 | 0.600 |
| 55 | suction-side | 0.152 | 0.055 | 0.600 |
| 56 | suction-side | 0.153 | 0.053 | 0.600 |
| 57 | suction-side | 0.155 | 0.051 | 0.600 |
| 58 | suction-side | 0.156 | 0.049 | 0.600 |
| 59 | suction-side | 0.158 | 0.047 | 0.600 |
| 60 | suction-side | 0.159 | 0.045 | 0.600 |
| 61 | suction-side | 0.161 | 0.043 | 0.600 |
| 62 | suction-side | 0.163 | 0.041 | 0.600 |
| 63 | suction-side | 0.164 | 0.039 | 0.600 |
| 64 | suction-side | 0.166 | 0.037 | 0.600 |
| 65 | suction-side | 0.167 | 0.035 | 0.600 |
| 66 | suction-side | 0.169 | 0.033 | 0.600 |
| 67 | suction-side | 0.170 | 0.031 | 0.600 |
| 68 | suction-side | 0.172 | 0.029 | 0.600 |
| 69 | suction-side | 0.173 | 0.027 | 0.600 |
| 70 | suction-side | 0.175 | 0.025 | 0.600 |
| 71 | suction-side | 0.176 | 0.023 | 0.600 |
| 72 | suction-side | 0.178 | 0.021 | 0.600 |
| 73 | suction-side | 0.179 | 0.019 | 0.600 |
| 74 | suction-side | 0.181 | 0.017 | 0.600 |
| 75 | suction-side | 0.182 | 0.015 | 0.600 |
| 76 | suction-side | 0.184 | 0.013 | 0.600 |
| 77 | suction-side | 0.185 | 0.011 | 0.600 |
| 78 | suction-side | 0.187 | 0.009 | 0.600 |
| 79 | suction-side | 0.188 | 0.007 | 0.600 |
| 80 | suction-side | 0.190 | 0.005 | 0.600 |
| 81 | suction-side | 0.191 | 0.003 | 0.600 |
| 82 | suction-side | 0.193 | 0.001 | 0.600 |
| 83 | suction-side | 0.194 | −0.001 | 0.600 |
| 84 | suction-side | 0.196 | −0.003 | 0.600 |
| 85 | suction-side | 0.197 | −0.005 | 0.600 |
| 86 | suction-side | 0.198 | −0.007 | 0.600 |
| 87 | suction-side | 0.200 | −0.009 | 0.600 |
| 88 | suction-side | 0.201 | −0.011 | 0.600 |
| 89 | suction-side | 0.203 | −0.013 | 0.600 |
| 90 | suction-side | 0.204 | −0.015 | 0.600 |
| 91 | suction-side | 0.206 | −0.018 | 0.600 |
| 92 | suction-side | 0.207 | −0.020 | 0.600 |
| 93 | suction-side | 0.209 | −0.022 | 0.600 |
| 94 | suction-side | 0.210 | −0.024 | 0.600 |
| 95 | suction-side | 0.211 | −0.028 | 0.600 |
| 96 | suction-side | 0.211 | −0.028 | 0.600 |
| 97 | suction-side | 0.211 | −0.027 | 0.600 |
| 98 | suction-side | 0.211 | −0.026 | 0.600 |
| 99 | suction-side | 0.211 | −0.027 | 0.600 |
| 100 | suction-side | 0.211 | −0.026 | 0.600 |
| 101 | pressure-side | 0.037 | 0.100 | 0.600 |
| 102 | pressure-side | 0.039 | 0.098 | 0.600 |
| 103 | pressure-side | 0.041 | 0.098 | 0.600 |
| 104 | pressure-side | 0.044 | 0.097 | 0.600 |
| 105 | pressure-side | 0.046 | 0.097 | 0.600 |
| 106 | pressure-side | 0.049 | 0.097 | 0.600 |
| 107 | pressure-side | 0.051 | 0.097 | 0.600 |
| 108 | pressure-side | 0.054 | 0.097 | 0.600 |
| 109 | pressure-side | 0.056 | 0.096 | 0.600 |
| 110 | pressure-side | 0.058 | 0.096 | 0.600 |
| 111 | pressure-side | 0.061 | 0.096 | 0.600 |
| 112 | pressure-side | 0.063 | 0.096 | 0.600 |
| 113 | pressure-side | 0.066 | 0.095 | 0.600 |
| 114 | pressure-side | 0.068 | 0.095 | 0.600 |
| 115 | pressure-side | 0.070 | 0.095 | 0.600 |
| 116 | pressure-side | 0.073 | 0.094 | 0.600 |
| 117 | pressure-side | 0.075 | 0.094 | 0.600 |

TABLE I-continued

Non-Dimensionalized (X Y Z/Span)

| N | Location | X | Y | Z |
|---|---|---|---|---|
| 118 | pressure-side | 0.077 | 0.093 | 0.600 |
| 119 | pressure-side | 0.080 | 0.092 | 0.600 |
| 120 | pressure-side | 0.082 | 0.092 | 0.600 |
| 121 | pressure-side | 0.084 | 0.091 | 0.600 |
| 122 | pressure-side | 0.087 | 0.090 | 0.600 |
| 123 | pressure-side | 0.089 | 0.089 | 0.600 |
| 124 | pressure-side | 0.091 | 0.088 | 0.600 |
| 125 | pressure-side | 0.093 | 0.087 | 0.600 |
| 126 | pressure-side | 0.095 | 0.087 | 0.600 |
| 127 | pressure-side | 0.098 | 0.085 | 0.600 |
| 128 | pressure-side | 0.100 | 0.084 | 0.600 |
| 129 | pressure-side | 0.102 | 0.083 | 0.600 |
| 130 | pressure-side | 0.104 | 0.082 | 0.600 |
| 131 | pressure-side | 0.106 | 0.081 | 0.600 |
| 132 | pressure-side | 0.108 | 0.080 | 0.600 |
| 133 | pressure-side | 0.110 | 0.078 | 0.600 |
| 134 | pressure-side | 0.112 | 0.077 | 0.600 |
| 135 | pressure-side | 0.114 | 0.076 | 0.600 |
| 136 | pressure-side | 0.116 | 0.074 | 0.600 |
| 137 | pressure-side | 0.118 | 0.073 | 0.600 |
| 138 | pressure-side | 0.120 | 0.071 | 0.600 |
| 139 | pressure-side | 0.121 | 0.070 | 0.600 |
| 140 | pressure-side | 0.123 | 0.068 | 0.600 |
| 141 | pressure-side | 0.125 | 0.067 | 0.600 |
| 142 | pressure-side | 0.127 | 0.065 | 0.600 |
| 143 | pressure-side | 0.129 | 0.064 | 0.600 |
| 144 | pressure-side | 0.130 | 0.062 | 0.600 |
| 145 | pressure-side | 0.132 | 0.060 | 0.600 |
| 146 | pressure-side | 0.134 | 0.059 | 0.600 |
| 147 | pressure-side | 0.135 | 0.057 | 0.600 |
| 148 | pressure-side | 0.137 | 0.055 | 0.600 |
| 149 | pressure-side | 0.138 | 0.054 | 0.600 |
| 150 | pressure-side | 0.140 | 0.052 | 0.600 |
| 151 | pressure-side | 0.142 | 0.050 | 0.600 |
| 152 | pressure-side | 0.143 | 0.049 | 0.600 |
| 153 | pressure-side | 0.145 | 0.047 | 0.600 |
| 154 | pressure-side | 0.146 | 0.045 | 0.600 |
| 155 | pressure-side | 0.148 | 0.043 | 0.600 |
| 156 | pressure-side | 0.149 | 0.041 | 0.600 |
| 157 | pressure-side | 0.151 | 0.040 | 0.600 |
| 158 | pressure-side | 0.152 | 0.038 | 0.600 |
| 159 | pressure-side | 0.154 | 0.036 | 0.600 |
| 160 | pressure-side | 0.155 | 0.034 | 0.600 |
| 161 | pressure-side | 0.157 | 0.032 | 0.600 |
| 162 | pressure-side | 0.158 | 0.031 | 0.600 |
| 163 | pressure-side | 0.160 | 0.029 | 0.600 |
| 164 | pressure-side | 0.161 | 0.027 | 0.600 |
| 165 | pressure-side | 0.163 | 0.025 | 0.600 |
| 166 | pressure-side | 0.164 | 0.023 | 0.600 |
| 167 | pressure-side | 0.166 | 0.021 | 0.600 |
| 168 | pressure-side | 0.167 | 0.020 | 0.600 |
| 169 | pressure-side | 0.169 | 0.018 | 0.600 |
| 170 | pressure-side | 0.170 | 0.016 | 0.600 |
| 171 | pressure-side | 0.172 | 0.014 | 0.600 |
| 172 | pressure-side | 0.173 | 0.012 | 0.600 |
| 173 | pressure-side | 0.175 | 0.011 | 0.600 |
| 174 | pressure-side | 0.176 | 0.009 | 0.600 |
| 175 | pressure-side | 0.178 | 0.007 | 0.600 |
| 176 | pressure-side | 0.179 | 0.005 | 0.600 |
| 177 | pressure-side | 0.181 | 0.004 | 0.600 |
| 178 | pressure-side | 0.182 | 0.002 | 0.600 |
| 179 | pressure-side | 0.184 | 0.000 | 0.600 |
| 180 | pressure-side | 0.185 | −0.002 | 0.600 |
| 181 | pressure-side | 0.187 | −0.004 | 0.600 |
| 182 | pressure-side | 0.188 | −0.005 | 0.600 |
| 183 | pressure-side | 0.190 | −0.007 | 0.600 |
| 184 | pressure-side | 0.192 | −0.009 | 0.600 |
| 185 | pressure-side | 0.193 | −0.011 | 0.600 |
| 186 | pressure-side | 0.195 | −0.012 | 0.600 |
| 187 | pressure-side | 0.196 | −0.014 | 0.600 |
| 188 | pressure-side | 0.198 | −0.016 | 0.600 |
| 189 | pressure-side | 0.199 | −0.018 | 0.600 |
| 190 | pressure-side | 0.201 | −0.020 | 0.600 |
| 191 | pressure-side | 0.202 | −0.021 | 0.600 |
| 192 | pressure-side | 0.204 | −0.023 | 0.600 |
| 193 | pressure-side | 0.205 | −0.025 | 0.600 |
| 194 | pressure-side | 0.207 | −0.027 | 0.600 |
| 195 | pressure-side | 0.208 | −0.028 | 0.600 |
| 196 | pressure-side | 0.209 | −0.029 | 0.600 |
| 197 | pressure-side | 0.209 | −0.029 | 0.600 |
| 198 | pressure-side | 0.210 | −0.028 | 0.600 |
| 199 | pressure-side | 0.211 | −0.028 | 0.600 |
| 200 | pressure-side | 0.211 | −0.028 | 0.600 |
| 1 | suction-side | 0.043 | 0.119 | 0.700 |
| 2 | suction-side | 0.045 | 0.121 | 0.700 |
| 3 | suction-side | 0.047 | 0.122 | 0.700 |
| 4 | suction-side | 0.049 | 0.122 | 0.700 |
| 5 | suction-side | 0.052 | 0.123 | 0.700 |
| 6 | suction-side | 0.054 | 0.123 | 0.700 |
| 7 | suction-side | 0.057 | 0.123 | 0.700 |
| 8 | suction-side | 0.059 | 0.123 | 0.700 |
| 9 | suction-side | 0.062 | 0.123 | 0.700 |
| 10 | suction-side | 0.064 | 0.122 | 0.700 |
| 11 | suction-side | 0.067 | 0.122 | 0.700 |
| 12 | suction-side | 0.069 | 0.121 | 0.700 |
| 13 | suction-side | 0.072 | 0.121 | 0.700 |
| 14 | suction-side | 0.074 | 0.120 | 0.700 |
| 15 | suction-side | 0.076 | 0.119 | 0.700 |
| 16 | suction-side | 0.079 | 0.118 | 0.700 |
| 17 | suction-side | 0.081 | 0.117 | 0.700 |
| 18 | suction-side | 0.083 | 0.116 | 0.700 |
| 19 | suction-side | 0.086 | 0.115 | 0.700 |
| 20 | suction-side | 0.088 | 0.114 | 0.700 |
| 21 | suction-side | 0.090 | 0.113 | 0.700 |
| 22 | suction-side | 0.092 | 0.112 | 0.700 |
| 23 | suction-side | 0.094 | 0.110 | 0.700 |
| 24 | suction-side | 0.096 | 0.109 | 0.700 |
| 25 | suction-side | 0.098 | 0.108 | 0.700 |
| 26 | suction-side | 0.100 | 0.106 | 0.700 |
| 27 | suction-side | 0.102 | 0.105 | 0.700 |
| 28 | suction-side | 0.104 | 0.103 | 0.700 |
| 29 | suction-side | 0.106 | 0.102 | 0.700 |
| 30 | suction-side | 0.108 | 0.100 | 0.700 |
| 31 | suction-side | 0.110 | 0.098 | 0.700 |
| 32 | suction-side | 0.112 | 0.097 | 0.700 |
| 33 | suction-side | 0.114 | 0.095 | 0.700 |
| 34 | suction-side | 0.115 | 0.093 | 0.700 |
| 35 | suction-side | 0.117 | 0.092 | 0.700 |
| 36 | suction-side | 0.119 | 0.090 | 0.700 |
| 37 | suction-side | 0.121 | 0.088 | 0.700 |
| 38 | suction-side | 0.122 | 0.086 | 0.700 |
| 39 | suction-side | 0.124 | 0.084 | 0.700 |
| 40 | suction-side | 0.126 | 0.083 | 0.700 |
| 41 | suction-side | 0.127 | 0.081 | 0.700 |
| 42 | suction-side | 0.129 | 0.079 | 0.700 |
| 43 | suction-side | 0.131 | 0.077 | 0.700 |
| 44 | suction-side | 0.132 | 0.075 | 0.700 |
| 45 | suction-side | 0.134 | 0.073 | 0.700 |
| 46 | suction-side | 0.135 | 0.071 | 0.700 |
| 47 | suction-side | 0.137 | 0.069 | 0.700 |
| 48 | suction-side | 0.139 | 0.068 | 0.700 |
| 49 | suction-side | 0.140 | 0.066 | 0.700 |
| 50 | suction-side | 0.142 | 0.064 | 0.700 |
| 51 | suction-side | 0.143 | 0.062 | 0.700 |
| 52 | suction-side | 0.145 | 0.060 | 0.700 |
| 53 | suction-side | 0.146 | 0.058 | 0.700 |
| 54 | suction-side | 0.148 | 0.056 | 0.700 |
| 55 | suction-side | 0.149 | 0.054 | 0.700 |
| 56 | suction-side | 0.151 | 0.052 | 0.700 |
| 57 | suction-side | 0.152 | 0.050 | 0.700 |
| 58 | suction-side | 0.154 | 0.048 | 0.700 |
| 59 | suction-side | 0.155 | 0.046 | 0.700 |
| 60 | suction-side | 0.157 | 0.044 | 0.700 |
| 61 | suction-side | 0.158 | 0.042 | 0.700 |
| 62 | suction-side | 0.160 | 0.040 | 0.700 |
| 63 | suction-side | 0.161 | 0.038 | 0.700 |
| 64 | suction-side | 0.163 | 0.036 | 0.700 |
| 65 | suction-side | 0.164 | 0.034 | 0.700 |
| 66 | suction-side | 0.166 | 0.032 | 0.700 |
| 67 | suction-side | 0.167 | 0.030 | 0.700 |
| 68 | suction-side | 0.169 | 0.028 | 0.700 |
| 69 | suction-side | 0.170 | 0.026 | 0.700 |

TABLE I-continued

Non-Dimensionalized (X Y Z/Span)

| N | Location | X | Y | Z |
|---|---|---|---|---|
| 70 | suction-side | 0.171 | 0.024 | 0.700 |
| 71 | suction-side | 0.173 | 0.022 | 0.700 |
| 72 | suction-side | 0.174 | 0.020 | 0.700 |
| 73 | suction-side | 0.176 | 0.018 | 0.700 |
| 74 | suction-side | 0.177 | 0.016 | 0.700 |
| 75 | suction-side | 0.179 | 0.014 | 0.700 |
| 76 | suction-side | 0.180 | 0.012 | 0.700 |
| 77 | suction-side | 0.182 | 0.010 | 0.700 |
| 78 | suction-side | 0.183 | 0.008 | 0.700 |
| 79 | suction-side | 0.184 | 0.006 | 0.700 |
| 80 | suction-side | 0.186 | 0.004 | 0.700 |
| 81 | suction-side | 0.187 | 0.002 | 0.700 |
| 82 | suction-side | 0.189 | 0.000 | 0.700 |
| 83 | suction-side | 0.190 | −0.002 | 0.700 |
| 84 | suction-side | 0.191 | −0.004 | 0.700 |
| 85 | suction-side | 0.193 | −0.006 | 0.700 |
| 86 | suction-side | 0.194 | −0.009 | 0.700 |
| 87 | suction-side | 0.196 | −0.011 | 0.700 |
| 88 | suction-side | 0.197 | −0.013 | 0.700 |
| 89 | suction-side | 0.198 | −0.015 | 0.700 |
| 90 | suction-side | 0.200 | −0.017 | 0.700 |
| 91 | suction-side | 0.201 | −0.019 | 0.700 |
| 92 | suction-side | 0.203 | −0.021 | 0.700 |
| 93 | suction-side | 0.204 | −0.023 | 0.700 |
| 94 | suction-side | 0.205 | −0.025 | 0.700 |
| 95 | suction-side | 0.206 | −0.029 | 0.700 |
| 96 | suction-side | 0.206 | −0.029 | 0.700 |
| 97 | suction-side | 0.206 | −0.029 | 0.700 |
| 98 | suction-side | 0.207 | −0.027 | 0.700 |
| 99 | suction-side | 0.207 | −0.028 | 0.700 |
| 100 | suction-side | 0.207 | −0.028 | 0.700 |
| 101 | pressure-side | 0.043 | 0.119 | 0.700 |
| 102 | pressure-side | 0.044 | 0.117 | 0.700 |
| 103 | pressure-side | 0.047 | 0.116 | 0.700 |
| 104 | pressure-side | 0.049 | 0.115 | 0.700 |
| 105 | pressure-side | 0.051 | 0.115 | 0.700 |
| 106 | pressure-side | 0.054 | 0.114 | 0.700 |
| 107 | pressure-side | 0.056 | 0.114 | 0.700 |
| 108 | pressure-side | 0.058 | 0.113 | 0.700 |
| 109 | pressure-side | 0.061 | 0.113 | 0.700 |
| 110 | pressure-side | 0.063 | 0.112 | 0.700 |
| 111 | pressure-side | 0.065 | 0.111 | 0.700 |
| 112 | pressure-side | 0.067 | 0.111 | 0.700 |
| 113 | pressure-side | 0.070 | 0.110 | 0.700 |
| 114 | pressure-side | 0.072 | 0.109 | 0.700 |
| 115 | pressure-side | 0.074 | 0.108 | 0.700 |
| 116 | pressure-side | 0.076 | 0.107 | 0.700 |
| 117 | pressure-side | 0.078 | 0.106 | 0.700 |
| 118 | pressure-side | 0.081 | 0.105 | 0.700 |
| 119 | pressure-side | 0.083 | 0.103 | 0.700 |
| 120 | pressure-side | 0.085 | 0.102 | 0.700 |
| 121 | pressure-side | 0.087 | 0.101 | 0.700 |
| 122 | pressure-side | 0.089 | 0.100 | 0.700 |
| 123 | pressure-side | 0.091 | 0.098 | 0.700 |
| 124 | pressure-side | 0.093 | 0.097 | 0.700 |
| 125 | pressure-side | 0.095 | 0.096 | 0.700 |
| 126 | pressure-side | 0.097 | 0.094 | 0.700 |
| 127 | pressure-side | 0.099 | 0.093 | 0.700 |
| 128 | pressure-side | 0.100 | 0.092 | 0.700 |
| 129 | pressure-side | 0.102 | 0.090 | 0.700 |
| 130 | pressure-side | 0.104 | 0.089 | 0.700 |
| 131 | pressure-side | 0.106 | 0.087 | 0.700 |
| 132 | pressure-side | 0.108 | 0.086 | 0.700 |
| 133 | pressure-side | 0.110 | 0.084 | 0.700 |
| 134 | pressure-side | 0.111 | 0.082 | 0.700 |
| 135 | pressure-side | 0.113 | 0.081 | 0.700 |
| 136 | pressure-side | 0.115 | 0.079 | 0.700 |
| 137 | pressure-side | 0.117 | 0.078 | 0.700 |
| 138 | pressure-side | 0.118 | 0.076 | 0.700 |
| 139 | pressure-side | 0.120 | 0.074 | 0.700 |
| 140 | pressure-side | 0.122 | 0.073 | 0.700 |
| 141 | pressure-side | 0.123 | 0.071 | 0.700 |
| 142 | pressure-side | 0.125 | 0.069 | 0.700 |
| 143 | pressure-side | 0.127 | 0.067 | 0.700 |
| 144 | pressure-side | 0.128 | 0.066 | 0.700 |
| 145 | pressure-side | 0.130 | 0.064 | 0.700 |
| 146 | pressure-side | 0.132 | 0.062 | 0.700 |
| 147 | pressure-side | 0.133 | 0.060 | 0.700 |
| 148 | pressure-side | 0.135 | 0.059 | 0.700 |
| 149 | pressure-side | 0.136 | 0.057 | 0.700 |
| 150 | pressure-side | 0.138 | 0.055 | 0.700 |
| 151 | pressure-side | 0.139 | 0.053 | 0.700 |
| 152 | pressure-side | 0.141 | 0.051 | 0.700 |
| 153 | pressure-side | 0.142 | 0.050 | 0.700 |
| 154 | pressure-side | 0.144 | 0.048 | 0.700 |
| 155 | pressure-side | 0.145 | 0.046 | 0.700 |
| 156 | pressure-side | 0.147 | 0.044 | 0.700 |
| 157 | pressure-side | 0.148 | 0.042 | 0.700 |
| 158 | pressure-side | 0.150 | 0.040 | 0.700 |
| 159 | pressure-side | 0.151 | 0.039 | 0.700 |
| 160 | pressure-side | 0.153 | 0.037 | 0.700 |
| 161 | pressure-side | 0.154 | 0.035 | 0.700 |
| 162 | pressure-side | 0.156 | 0.033 | 0.700 |
| 163 | pressure-side | 0.157 | 0.031 | 0.700 |
| 164 | pressure-side | 0.159 | 0.029 | 0.700 |
| 165 | pressure-side | 0.160 | 0.027 | 0.700 |
| 166 | pressure-side | 0.162 | 0.025 | 0.700 |
| 167 | pressure-side | 0.163 | 0.023 | 0.700 |
| 168 | pressure-side | 0.164 | 0.022 | 0.700 |
| 169 | pressure-side | 0.166 | 0.020 | 0.700 |
| 170 | pressure-side | 0.167 | 0.018 | 0.700 |
| 171 | pressure-side | 0.169 | 0.016 | 0.700 |
| 172 | pressure-side | 0.170 | 0.014 | 0.700 |
| 173 | pressure-side | 0.172 | 0.012 | 0.700 |
| 174 | pressure-side | 0.173 | 0.010 | 0.700 |
| 175 | pressure-side | 0.175 | 0.008 | 0.700 |
| 176 | pressure-side | 0.176 | 0.006 | 0.700 |
| 177 | pressure-side | 0.177 | 0.004 | 0.700 |
| 178 | pressure-side | 0.179 | 0.003 | 0.700 |
| 179 | pressure-side | 0.180 | 0.001 | 0.700 |
| 180 | pressure-side | 0.182 | −0.001 | 0.700 |
| 181 | pressure-side | 0.183 | −0.003 | 0.700 |
| 182 | pressure-side | 0.185 | −0.005 | 0.700 |
| 183 | pressure-side | 0.186 | −0.007 | 0.700 |
| 184 | pressure-side | 0.187 | −0.009 | 0.700 |
| 185 | pressure-side | 0.189 | −0.011 | 0.700 |
| 186 | pressure-side | 0.190 | −0.013 | 0.700 |
| 187 | pressure-side | 0.192 | −0.015 | 0.700 |
| 188 | pressure-side | 0.193 | −0.016 | 0.700 |
| 189 | pressure-side | 0.195 | −0.018 | 0.700 |
| 190 | pressure-side | 0.196 | −0.020 | 0.700 |
| 191 | pressure-side | 0.198 | −0.022 | 0.700 |
| 192 | pressure-side | 0.199 | −0.024 | 0.700 |
| 193 | pressure-side | 0.200 | −0.026 | 0.700 |
| 194 | pressure-side | 0.202 | −0.028 | 0.700 |
| 195 | pressure-side | 0.203 | −0.030 | 0.700 |
| 196 | pressure-side | 0.204 | −0.030 | 0.700 |
| 197 | pressure-side | 0.205 | −0.030 | 0.700 |
| 198 | pressure-side | 0.205 | −0.030 | 0.700 |
| 199 | pressure-side | 0.206 | −0.029 | 0.700 |
| 200 | pressure-side | 0.206 | −0.029 | 0.700 |
| 1 | suction-side | 0.051 | 0.134 | 0.800 |
| 2 | suction-side | 0.053 | 0.135 | 0.800 |
| 3 | suction-side | 0.055 | 0.136 | 0.800 |
| 4 | suction-side | 0.058 | 0.136 | 0.800 |
| 5 | suction-side | 0.060 | 0.136 | 0.800 |
| 6 | suction-side | 0.062 | 0.136 | 0.800 |
| 7 | suction-side | 0.065 | 0.135 | 0.800 |
| 8 | suction-side | 0.067 | 0.135 | 0.800 |
| 9 | suction-side | 0.069 | 0.134 | 0.800 |
| 10 | suction-side | 0.072 | 0.133 | 0.800 |
| 11 | suction-side | 0.074 | 0.132 | 0.800 |
| 12 | suction-side | 0.076 | 0.131 | 0.800 |
| 13 | suction-side | 0.078 | 0.130 | 0.800 |
| 14 | suction-side | 0.080 | 0.129 | 0.800 |
| 15 | suction-side | 0.083 | 0.128 | 0.800 |
| 16 | suction-side | 0.085 | 0.127 | 0.800 |
| 17 | suction-side | 0.087 | 0.126 | 0.800 |
| 18 | suction-side | 0.089 | 0.124 | 0.800 |
| 19 | suction-side | 0.091 | 0.123 | 0.800 |
| 20 | suction-side | 0.093 | 0.121 | 0.800 |
| 21 | suction-side | 0.094 | 0.120 | 0.800 |

TABLE I-continued

| | | Non-Dimensionalized (X Y Z/Span) | | |
|---|---|---|---|---|
| N | Location | X | Y | Z |
| 22 | suction-side | 0.096 | 0.118 | 0.800 |
| 23 | suction-side | 0.098 | 0.117 | 0.800 |
| 24 | suction-side | 0.100 | 0.115 | 0.800 |
| 25 | suction-side | 0.102 | 0.114 | 0.800 |
| 26 | suction-side | 0.103 | 0.112 | 0.800 |
| 27 | suction-side | 0.105 | 0.110 | 0.800 |
| 28 | suction-side | 0.107 | 0.109 | 0.800 |
| 29 | suction-side | 0.108 | 0.107 | 0.800 |
| 30 | suction-side | 0.110 | 0.105 | 0.800 |
| 31 | suction-side | 0.111 | 0.103 | 0.800 |
| 32 | suction-side | 0.113 | 0.101 | 0.800 |
| 33 | suction-side | 0.114 | 0.100 | 0.800 |
| 34 | suction-side | 0.116 | 0.098 | 0.800 |
| 35 | suction-side | 0.118 | 0.096 | 0.800 |
| 36 | suction-side | 0.119 | 0.094 | 0.800 |
| 37 | suction-side | 0.121 | 0.092 | 0.800 |
| 38 | suction-side | 0.122 | 0.090 | 0.800 |
| 39 | suction-side | 0.123 | 0.088 | 0.800 |
| 40 | suction-side | 0.125 | 0.086 | 0.800 |
| 41 | suction-side | 0.126 | 0.085 | 0.800 |
| 42 | suction-side | 0.128 | 0.083 | 0.800 |
| 43 | suction-side | 0.129 | 0.081 | 0.800 |
| 44 | suction-side | 0.131 | 0.079 | 0.800 |
| 45 | suction-side | 0.132 | 0.077 | 0.800 |
| 46 | suction-side | 0.134 | 0.075 | 0.800 |
| 47 | suction-side | 0.135 | 0.073 | 0.800 |
| 48 | suction-side | 0.136 | 0.071 | 0.800 |
| 49 | suction-side | 0.138 | 0.069 | 0.800 |
| 50 | suction-side | 0.139 | 0.067 | 0.800 |
| 51 | suction-side | 0.141 | 0.065 | 0.800 |
| 52 | suction-side | 0.142 | 0.063 | 0.800 |
| 53 | suction-side | 0.143 | 0.061 | 0.800 |
| 54 | suction-side | 0.145 | 0.059 | 0.800 |
| 55 | suction-side | 0.146 | 0.058 | 0.800 |
| 56 | suction-side | 0.148 | 0.056 | 0.800 |
| 57 | suction-side | 0.149 | 0.054 | 0.800 |
| 58 | suction-side | 0.150 | 0.052 | 0.800 |
| 59 | suction-side | 0.152 | 0.050 | 0.800 |
| 60 | suction-side | 0.153 | 0.048 | 0.800 |
| 61 | suction-side | 0.155 | 0.046 | 0.800 |
| 62 | suction-side | 0.156 | 0.044 | 0.800 |
| 63 | suction-side | 0.157 | 0.042 | 0.800 |
| 64 | suction-side | 0.159 | 0.040 | 0.800 |
| 65 | suction-side | 0.160 | 0.038 | 0.800 |
| 66 | suction-side | 0.161 | 0.036 | 0.800 |
| 67 | suction-side | 0.163 | 0.034 | 0.800 |
| 68 | suction-side | 0.164 | 0.032 | 0.800 |
| 69 | suction-side | 0.166 | 0.030 | 0.800 |
| 70 | suction-side | 0.167 | 0.028 | 0.800 |
| 71 | suction-side | 0.168 | 0.026 | 0.800 |
| 72 | suction-side | 0.170 | 0.024 | 0.800 |
| 73 | suction-side | 0.171 | 0.022 | 0.800 |
| 74 | suction-side | 0.172 | 0.020 | 0.800 |
| 75 | suction-side | 0.174 | 0.018 | 0.800 |
| 76 | suction-side | 0.175 | 0.016 | 0.800 |
| 77 | suction-side | 0.176 | 0.014 | 0.800 |
| 78 | suction-side | 0.178 | 0.012 | 0.800 |
| 79 | suction-side | 0.179 | 0.010 | 0.800 |
| 80 | suction-side | 0.180 | 0.008 | 0.800 |
| 81 | suction-side | 0.182 | 0.006 | 0.800 |
| 82 | suction-side | 0.183 | 0.004 | 0.800 |
| 83 | suction-side | 0.184 | 0.002 | 0.800 |
| 84 | suction-side | 0.186 | 0.000 | 0.800 |
| 85 | suction-side | 0.187 | −0.002 | 0.800 |
| 86 | suction-side | 0.188 | −0.004 | 0.800 |
| 87 | suction-side | 0.190 | −0.006 | 0.800 |
| 88 | suction-side | 0.191 | −0.008 | 0.800 |
| 89 | suction-side | 0.192 | −0.010 | 0.800 |
| 90 | suction-side | 0.194 | −0.012 | 0.800 |
| 91 | suction-side | 0.195 | −0.014 | 0.800 |
| 92 | suction-side | 0.196 | −0.016 | 0.800 |
| 93 | suction-side | 0.197 | −0.018 | 0.800 |
| 94 | suction-side | 0.199 | −0.020 | 0.800 |
| 95 | suction-side | 0.199 | −0.024 | 0.800 |
| 96 | suction-side | 0.199 | −0.024 | 0.800 |
| 97 | suction-side | 0.200 | −0.023 | 0.800 |
| 98 | suction-side | 0.200 | −0.023 | 0.800 |
| 99 | suction-side | 0.200 | −0.022 | 0.800 |
| 100 | suction-side | 0.200 | −0.022 | 0.800 |
| 101 | pressure-side | 0.051 | 0.134 | 0.800 |
| 102 | pressure-side | 0.052 | 0.132 | 0.800 |
| 103 | pressure-side | 0.054 | 0.131 | 0.800 |
| 104 | pressure-side | 0.056 | 0.130 | 0.800 |
| 105 | pressure-side | 0.059 | 0.130 | 0.800 |
| 106 | pressure-side | 0.061 | 0.129 | 0.800 |
| 107 | pressure-side | 0.063 | 0.128 | 0.800 |
| 108 | pressure-side | 0.065 | 0.127 | 0.800 |
| 109 | pressure-side | 0.068 | 0.127 | 0.800 |
| 110 | pressure-side | 0.070 | 0.126 | 0.800 |
| 111 | pressure-side | 0.072 | 0.125 | 0.800 |
| 112 | pressure-side | 0.074 | 0.124 | 0.800 |
| 113 | pressure-side | 0.076 | 0.122 | 0.800 |
| 114 | pressure-side | 0.078 | 0.121 | 0.800 |
| 115 | pressure-side | 0.080 | 0.120 | 0.800 |
| 116 | pressure-side | 0.082 | 0.119 | 0.800 |
| 117 | pressure-side | 0.084 | 0.117 | 0.800 |
| 118 | pressure-side | 0.086 | 0.116 | 0.800 |
| 119 | pressure-side | 0.087 | 0.114 | 0.800 |
| 120 | pressure-side | 0.089 | 0.113 | 0.800 |
| 121 | pressure-side | 0.091 | 0.111 | 0.800 |
| 122 | pressure-side | 0.093 | 0.110 | 0.800 |
| 123 | pressure-side | 0.094 | 0.108 | 0.800 |
| 124 | pressure-side | 0.096 | 0.107 | 0.800 |
| 125 | pressure-side | 0.098 | 0.105 | 0.800 |
| 126 | pressure-side | 0.099 | 0.103 | 0.800 |
| 127 | pressure-side | 0.101 | 0.102 | 0.800 |
| 128 | pressure-side | 0.103 | 0.100 | 0.800 |
| 129 | pressure-side | 0.104 | 0.098 | 0.800 |
| 130 | pressure-side | 0.106 | 0.097 | 0.800 |
| 131 | pressure-side | 0.107 | 0.095 | 0.800 |
| 132 | pressure-side | 0.109 | 0.093 | 0.800 |
| 133 | pressure-side | 0.111 | 0.092 | 0.800 |
| 134 | pressure-side | 0.112 | 0.090 | 0.800 |
| 135 | pressure-side | 0.114 | 0.088 | 0.800 |
| 136 | pressure-side | 0.115 | 0.086 | 0.800 |
| 137 | pressure-side | 0.117 | 0.085 | 0.800 |
| 138 | pressure-side | 0.118 | 0.083 | 0.800 |
| 139 | pressure-side | 0.120 | 0.081 | 0.800 |
| 140 | pressure-side | 0.121 | 0.079 | 0.800 |
| 141 | pressure-side | 0.123 | 0.077 | 0.800 |
| 142 | pressure-side | 0.124 | 0.076 | 0.800 |
| 143 | pressure-side | 0.126 | 0.074 | 0.800 |
| 144 | pressure-side | 0.127 | 0.072 | 0.800 |
| 145 | pressure-side | 0.129 | 0.070 | 0.800 |
| 146 | pressure-side | 0.130 | 0.068 | 0.800 |
| 147 | pressure-side | 0.131 | 0.067 | 0.800 |
| 148 | pressure-side | 0.133 | 0.065 | 0.800 |
| 149 | pressure-side | 0.134 | 0.063 | 0.800 |
| 150 | pressure-side | 0.136 | 0.061 | 0.800 |
| 151 | pressure-side | 0.137 | 0.059 | 0.800 |
| 152 | pressure-side | 0.139 | 0.057 | 0.800 |
| 153 | pressure-side | 0.140 | 0.056 | 0.800 |
| 154 | pressure-side | 0.142 | 0.054 | 0.800 |
| 155 | pressure-side | 0.143 | 0.052 | 0.800 |
| 156 | pressure-side | 0.144 | 0.050 | 0.800 |
| 157 | pressure-side | 0.146 | 0.048 | 0.800 |
| 158 | pressure-side | 0.147 | 0.046 | 0.800 |
| 159 | pressure-side | 0.149 | 0.044 | 0.800 |
| 160 | pressure-side | 0.150 | 0.043 | 0.800 |
| 161 | pressure-side | 0.151 | 0.041 | 0.800 |
| 162 | pressure-side | 0.153 | 0.039 | 0.800 |
| 163 | pressure-side | 0.154 | 0.037 | 0.800 |
| 164 | pressure-side | 0.155 | 0.035 | 0.800 |
| 165 | pressure-side | 0.157 | 0.033 | 0.800 |
| 166 | pressure-side | 0.158 | 0.031 | 0.800 |
| 167 | pressure-side | 0.159 | 0.029 | 0.800 |
| 168 | pressure-side | 0.161 | 0.027 | 0.800 |
| 169 | pressure-side | 0.162 | 0.025 | 0.800 |
| 170 | pressure-side | 0.163 | 0.024 | 0.800 |
| 171 | pressure-side | 0.165 | 0.022 | 0.800 |
| 172 | pressure-side | 0.166 | 0.020 | 0.800 |
| 173 | pressure-side | 0.167 | 0.018 | 0.800 |

TABLE I-continued

Non-Dimensionalized (X Y Z/Span)

| N | Location | X | Y | Z |
|---|---|---|---|---|
| 174 | pressure-side | 0.169 | 0.016 | 0.800 |
| 175 | pressure-side | 0.170 | 0.014 | 0.800 |
| 176 | pressure-side | 0.171 | 0.012 | 0.800 |
| 177 | pressure-side | 0.173 | 0.010 | 0.800 |
| 178 | pressure-side | 0.174 | 0.008 | 0.800 |
| 179 | pressure-side | 0.175 | 0.006 | 0.800 |
| 180 | pressure-side | 0.177 | 0.004 | 0.800 |
| 181 | pressure-side | 0.178 | 0.002 | 0.800 |
| 182 | pressure-side | 0.179 | 0.000 | 0.800 |
| 183 | pressure-side | 0.180 | −0.001 | 0.800 |
| 184 | pressure-side | 0.182 | −0.003 | 0.800 |
| 185 | pressure-side | 0.183 | −0.005 | 0.800 |
| 186 | pressure-side | 0.184 | −0.007 | 0.800 |
| 187 | pressure-side | 0.186 | −0.009 | 0.800 |
| 188 | pressure-side | 0.187 | −0.011 | 0.800 |
| 189 | pressure-side | 0.188 | −0.013 | 0.800 |
| 190 | pressure-side | 0.190 | −0.015 | 0.800 |
| 191 | pressure-side | 0.191 | −0.017 | 0.800 |
| 192 | pressure-side | 0.192 | −0.019 | 0.800 |
| 193 | pressure-side | 0.194 | −0.021 | 0.800 |
| 194 | pressure-side | 0.195 | −0.023 | 0.800 |
| 195 | pressure-side | 0.197 | −0.024 | 0.800 |
| 196 | pressure-side | 0.197 | −0.024 | 0.800 |
| 197 | pressure-side | 0.198 | −0.024 | 0.800 |
| 198 | pressure-side | 0.198 | −0.024 | 0.800 |
| 199 | pressure-side | 0.199 | −0.024 | 0.800 |
| 200 | pressure-side | 0.199 | −0.024 | 0.800 |
| 1 | suction-side | 0.062 | 0.144 | 0.900 |
| 2 | suction-side | 0.064 | 0.145 | 0.900 |
| 3 | suction-side | 0.066 | 0.146 | 0.900 |
| 4 | suction-side | 0.068 | 0.146 | 0.900 |
| 5 | suction-side | 0.070 | 0.145 | 0.900 |
| 6 | suction-side | 0.073 | 0.145 | 0.900 |
| 7 | suction-side | 0.075 | 0.144 | 0.900 |
| 8 | suction-side | 0.077 | 0.143 | 0.900 |
| 9 | suction-side | 0.079 | 0.142 | 0.900 |
| 10 | suction-side | 0.081 | 0.141 | 0.900 |
| 11 | suction-side | 0.082 | 0.140 | 0.900 |
| 12 | suction-side | 0.084 | 0.139 | 0.900 |
| 13 | suction-side | 0.086 | 0.138 | 0.900 |
| 14 | suction-side | 0.088 | 0.137 | 0.900 |
| 15 | suction-side | 0.090 | 0.136 | 0.900 |
| 16 | suction-side | 0.091 | 0.134 | 0.900 |
| 17 | suction-side | 0.093 | 0.133 | 0.900 |
| 18 | suction-side | 0.095 | 0.132 | 0.900 |
| 19 | suction-side | 0.096 | 0.130 | 0.900 |
| 20 | suction-side | 0.098 | 0.129 | 0.900 |
| 21 | suction-side | 0.100 | 0.127 | 0.900 |
| 22 | suction-side | 0.101 | 0.126 | 0.900 |
| 23 | suction-side | 0.103 | 0.124 | 0.900 |
| 24 | suction-side | 0.104 | 0.122 | 0.900 |
| 25 | suction-side | 0.105 | 0.121 | 0.900 |
| 26 | suction-side | 0.107 | 0.119 | 0.900 |
| 27 | suction-side | 0.108 | 0.117 | 0.900 |
| 28 | suction-side | 0.110 | 0.116 | 0.900 |
| 29 | suction-side | 0.111 | 0.114 | 0.900 |
| 30 | suction-side | 0.112 | 0.112 | 0.900 |
| 31 | suction-side | 0.114 | 0.111 | 0.900 |
| 32 | suction-side | 0.115 | 0.109 | 0.900 |
| 33 | suction-side | 0.116 | 0.107 | 0.900 |
| 34 | suction-side | 0.118 | 0.105 | 0.900 |
| 35 | suction-side | 0.119 | 0.104 | 0.900 |
| 36 | suction-side | 0.120 | 0.102 | 0.900 |
| 37 | suction-side | 0.121 | 0.100 | 0.900 |
| 38 | suction-side | 0.122 | 0.098 | 0.900 |
| 39 | suction-side | 0.124 | 0.096 | 0.900 |
| 40 | suction-side | 0.125 | 0.095 | 0.900 |
| 41 | suction-side | 0.126 | 0.093 | 0.900 |
| 42 | suction-side | 0.127 | 0.091 | 0.900 |
| 43 | suction-side | 0.128 | 0.089 | 0.900 |
| 44 | suction-side | 0.130 | 0.087 | 0.900 |
| 45 | suction-side | 0.131 | 0.086 | 0.900 |
| 46 | suction-side | 0.132 | 0.084 | 0.900 |
| 47 | suction-side | 0.133 | 0.082 | 0.900 |
| 48 | suction-side | 0.134 | 0.080 | 0.900 |
| 49 | suction-side | 0.136 | 0.078 | 0.900 |
| 50 | suction-side | 0.137 | 0.076 | 0.900 |
| 51 | suction-side | 0.138 | 0.075 | 0.900 |
| 52 | suction-side | 0.139 | 0.073 | 0.900 |
| 53 | suction-side | 0.140 | 0.071 | 0.900 |
| 54 | suction-side | 0.141 | 0.069 | 0.900 |
| 55 | suction-side | 0.143 | 0.067 | 0.900 |
| 56 | suction-side | 0.144 | 0.065 | 0.900 |
| 57 | suction-side | 0.145 | 0.064 | 0.900 |
| 58 | suction-side | 0.146 | 0.062 | 0.900 |
| 59 | suction-side | 0.147 | 0.060 | 0.900 |
| 60 | suction-side | 0.148 | 0.058 | 0.900 |
| 61 | suction-side | 0.150 | 0.056 | 0.900 |
| 62 | suction-side | 0.151 | 0.054 | 0.900 |
| 63 | suction-side | 0.152 | 0.053 | 0.900 |
| 64 | suction-side | 0.153 | 0.051 | 0.900 |
| 65 | suction-side | 0.154 | 0.049 | 0.900 |
| 66 | suction-side | 0.155 | 0.047 | 0.900 |
| 67 | suction-side | 0.157 | 0.045 | 0.900 |
| 68 | suction-side | 0.158 | 0.043 | 0.900 |
| 69 | suction-side | 0.159 | 0.042 | 0.900 |
| 70 | suction-side | 0.160 | 0.040 | 0.900 |
| 71 | suction-side | 0.161 | 0.038 | 0.900 |
| 72 | suction-side | 0.162 | 0.036 | 0.900 |
| 73 | suction-side | 0.164 | 0.034 | 0.900 |
| 74 | suction-side | 0.165 | 0.032 | 0.900 |
| 75 | suction-side | 0.166 | 0.031 | 0.900 |
| 76 | suction-side | 0.167 | 0.029 | 0.900 |
| 77 | suction-side | 0.168 | 0.027 | 0.900 |
| 78 | suction-side | 0.169 | 0.025 | 0.900 |
| 79 | suction-side | 0.171 | 0.023 | 0.900 |
| 80 | suction-side | 0.172 | 0.021 | 0.900 |
| 81 | suction-side | 0.173 | 0.020 | 0.900 |
| 82 | suction-side | 0.174 | 0.018 | 0.900 |
| 83 | suction-side | 0.175 | 0.016 | 0.900 |
| 84 | suction-side | 0.176 | 0.014 | 0.900 |
| 85 | suction-side | 0.178 | 0.012 | 0.900 |
| 86 | suction-side | 0.179 | 0.010 | 0.900 |
| 87 | suction-side | 0.180 | 0.009 | 0.900 |
| 88 | suction-side | 0.181 | 0.007 | 0.900 |
| 89 | suction-side | 0.182 | 0.005 | 0.900 |
| 90 | suction-side | 0.183 | 0.003 | 0.900 |
| 91 | suction-side | 0.185 | 0.001 | 0.900 |
| 92 | suction-side | 0.186 | −0.001 | 0.900 |
| 93 | suction-side | 0.187 | −0.002 | 0.900 |
| 94 | suction-side | 0.188 | −0.008 | 0.900 |
| 95 | suction-side | 0.188 | −0.004 | 0.900 |
| 96 | suction-side | 0.189 | −0.008 | 0.900 |
| 97 | suction-side | 0.189 | −0.007 | 0.900 |
| 98 | suction-side | 0.189 | −0.007 | 0.900 |
| 99 | suction-side | 0.189 | −0.006 | 0.900 |
| 100 | suction-side | 0.189 | −0.006 | 0.900 |
| 101 | pressure-side | 0.062 | 0.144 | 0.900 |
| 102 | pressure-side | 0.063 | 0.142 | 0.900 |
| 103 | pressure-side | 0.065 | 0.141 | 0.900 |
| 104 | pressure-side | 0.067 | 0.140 | 0.900 |
| 105 | pressure-side | 0.069 | 0.140 | 0.900 |
| 106 | pressure-side | 0.071 | 0.139 | 0.900 |
| 107 | pressure-side | 0.073 | 0.139 | 0.900 |
| 108 | pressure-side | 0.075 | 0.138 | 0.900 |
| 109 | pressure-side | 0.077 | 0.137 | 0.900 |
| 110 | pressure-side | 0.079 | 0.136 | 0.900 |
| 111 | pressure-side | 0.081 | 0.135 | 0.900 |
| 112 | pressure-side | 0.083 | 0.134 | 0.900 |
| 113 | pressure-side | 0.084 | 0.133 | 0.900 |
| 114 | pressure-side | 0.086 | 0.131 | 0.900 |
| 115 | pressure-side | 0.088 | 0.130 | 0.900 |
| 116 | pressure-side | 0.089 | 0.129 | 0.900 |
| 117 | pressure-side | 0.091 | 0.127 | 0.900 |
| 118 | pressure-side | 0.093 | 0.126 | 0.900 |
| 119 | pressure-side | 0.094 | 0.124 | 0.900 |
| 120 | pressure-side | 0.096 | 0.123 | 0.900 |
| 121 | pressure-side | 0.097 | 0.121 | 0.900 |
| 122 | pressure-side | 0.098 | 0.120 | 0.900 |
| 123 | pressure-side | 0.100 | 0.118 | 0.900 |
| 124 | pressure-side | 0.101 | 0.116 | 0.900 |
| 125 | pressure-side | 0.103 | 0.115 | 0.900 |

TABLE I-continued

Non-Dimensionalized (X Y Z/Span)

| N | Location | X | Y | Z |
|---|---|---|---|---|
| 126 | pressure-side | 0.104 | 0.113 | 0.900 |
| 127 | pressure-side | 0.105 | 0.112 | 0.900 |
| 128 | pressure-side | 0.107 | 0.110 | 0.900 |
| 129 | pressure-side | 0.108 | 0.108 | 0.900 |
| 130 | pressure-side | 0.109 | 0.107 | 0.900 |
| 131 | pressure-side | 0.111 | 0.105 | 0.900 |
| 132 | pressure-side | 0.112 | 0.103 | 0.900 |
| 133 | pressure-side | 0.113 | 0.101 | 0.900 |
| 134 | pressure-side | 0.114 | 0.100 | 0.900 |
| 135 | pressure-side | 0.116 | 0.098 | 0.900 |
| 136 | pressure-side | 0.117 | 0.096 | 0.900 |
| 137 | pressure-side | 0.118 | 0.095 | 0.900 |
| 138 | pressure-side | 0.119 | 0.093 | 0.900 |
| 139 | pressure-side | 0.121 | 0.091 | 0.900 |
| 140 | pressure-side | 0.122 | 0.089 | 0.900 |
| 141 | pressure-side | 0.123 | 0.088 | 0.900 |
| 142 | pressure-side | 0.124 | 0.086 | 0.900 |
| 143 | pressure-side | 0.125 | 0.084 | 0.900 |
| 144 | pressure-side | 0.127 | 0.082 | 0.900 |
| 145 | pressure-side | 0.128 | 0.081 | 0.900 |
| 146 | pressure-side | 0.129 | 0.079 | 0.900 |
| 147 | pressure-side | 0.130 | 0.077 | 0.900 |
| 148 | pressure-side | 0.131 | 0.075 | 0.900 |
| 149 | pressure-side | 0.133 | 0.074 | 0.900 |
| 150 | pressure-side | 0.134 | 0.072 | 0.900 |
| 151 | pressure-side | 0.135 | 0.070 | 0.900 |
| 152 | pressure-side | 0.136 | 0.068 | 0.900 |
| 153 | pressure-side | 0.137 | 0.066 | 0.900 |
| 154 | pressure-side | 0.138 | 0.065 | 0.900 |
| 155 | pressure-side | 0.139 | 0.063 | 0.900 |
| 156 | pressure-side | 0.141 | 0.061 | 0.900 |
| 157 | pressure-side | 0.142 | 0.059 | 0.900 |
| 158 | pressure-side | 0.143 | 0.057 | 0.900 |
| 159 | pressure-side | 0.144 | 0.056 | 0.900 |
| 160 | pressure-side | 0.145 | 0.054 | 0.900 |
| 161 | pressure-side | 0.146 | 0.052 | 0.900 |
| 162 | pressure-side | 0.147 | 0.050 | 0.900 |
| 163 | pressure-side | 0.149 | 0.048 | 0.900 |
| 164 | pressure-side | 0.150 | 0.047 | 0.900 |
| 165 | pressure-side | 0.151 | 0.045 | 0.900 |
| 166 | pressure-side | 0.152 | 0.043 | 0.900 |
| 167 | pressure-side | 0.153 | 0.041 | 0.900 |
| 168 | pressure-side | 0.154 | 0.040 | 0.900 |
| 169 | pressure-side | 0.155 | 0.038 | 0.900 |
| 170 | pressure-side | 0.157 | 0.036 | 0.900 |
| 171 | pressure-side | 0.158 | 0.034 | 0.900 |
| 172 | pressure-side | 0.159 | 0.032 | 0.900 |
| 173 | pressure-side | 0.160 | 0.031 | 0.900 |
| 174 | pressure-side | 0.161 | 0.029 | 0.900 |
| 175 | pressure-side | 0.162 | 0.027 | 0.900 |
| 176 | pressure-side | 0.163 | 0.025 | 0.900 |
| 177 | pressure-side | 0.164 | 0.023 | 0.900 |
| 178 | pressure-side | 0.166 | 0.022 | 0.900 |
| 179 | pressure-side | 0.167 | 0.020 | 0.900 |
| 180 | pressure-side | 0.168 | 0.018 | 0.900 |
| 181 | pressure-side | 0.169 | 0.016 | 0.900 |
| 182 | pressure-side | 0.170 | 0.014 | 0.900 |
| 183 | pressure-side | 0.171 | 0.013 | 0.900 |
| 184 | pressure-side | 0.173 | 0.011 | 0.900 |
| 185 | pressure-side | 0.174 | 0.009 | 0.900 |
| 186 | pressure-side | 0.175 | 0.007 | 0.900 |
| 187 | pressure-side | 0.176 | 0.006 | 0.900 |
| 188 | pressure-side | 0.177 | 0.004 | 0.900 |
| 189 | pressure-side | 0.178 | 0.002 | 0.900 |
| 190 | pressure-side | 0.180 | 0.000 | 0.900 |
| 191 | pressure-side | 0.181 | −0.001 | 0.900 |
| 192 | pressure-side | 0.182 | −0.003 | 0.900 |
| 193 | pressure-side | 0.183 | −0.005 | 0.900 |
| 194 | pressure-side | 0.185 | −0.007 | 0.900 |
| 195 | pressure-side | 0.186 | −0.008 | 0.900 |
| 196 | pressure-side | 0.186 | −0.008 | 0.900 |
| 197 | pressure-side | 0.187 | −0.008 | 0.900 |
| 198 | pressure-side | 0.188 | −0.008 | 0.900 |
| 199 | pressure-side | 0.188 | −0.008 | 0.900 |
| 200 | pressure-side | 0.188 | −0.008 | 0.900 |
| 1 | suction-side | 0.081 | 0.145 | 1.000 |
| 2 | suction-side | 0.083 | 0.146 | 1.000 |
| 3 | suction-side | 0.085 | 0.146 | 1.000 |
| 4 | suction-side | 0.087 | 0.146 | 1.000 |
| 5 | suction-side | 0.089 | 0.146 | 1.000 |
| 6 | suction-side | 0.090 | 0.145 | 1.000 |
| 7 | suction-side | 0.092 | 0.144 | 1.000 |
| 8 | suction-side | 0.094 | 0.143 | 1.000 |
| 9 | suction-side | 0.095 | 0.142 | 1.000 |
| 10 | suction-side | 0.097 | 0.141 | 1.000 |
| 11 | suction-side | 0.099 | 0.140 | 1.000 |
| 12 | suction-side | 0.100 | 0.139 | 1.000 |
| 13 | suction-side | 0.102 | 0.137 | 1.000 |
| 14 | suction-side | 0.103 | 0.136 | 1.000 |
| 15 | suction-side | 0.104 | 0.135 | 1.000 |
| 16 | suction-side | 0.106 | 0.133 | 1.000 |
| 17 | suction-side | 0.107 | 0.132 | 1.000 |
| 18 | suction-side | 0.108 | 0.130 | 1.000 |
| 19 | suction-side | 0.110 | 0.129 | 1.000 |
| 20 | suction-side | 0.111 | 0.127 | 1.000 |
| 21 | suction-side | 0.112 | 0.126 | 1.000 |
| 22 | suction-side | 0.113 | 0.124 | 1.000 |
| 23 | suction-side | 0.114 | 0.123 | 1.000 |
| 24 | suction-side | 0.116 | 0.121 | 1.000 |
| 25 | suction-side | 0.117 | 0.120 | 1.000 |
| 26 | suction-side | 0.118 | 0.118 | 1.000 |
| 27 | suction-side | 0.119 | 0.117 | 1.000 |
| 28 | suction-side | 0.120 | 0.115 | 1.000 |
| 29 | suction-side | 0.121 | 0.113 | 1.000 |
| 30 | suction-side | 0.122 | 0.112 | 1.000 |
| 31 | suction-side | 0.123 | 0.110 | 1.000 |
| 32 | suction-side | 0.124 | 0.109 | 1.000 |
| 33 | suction-side | 0.125 | 0.107 | 1.000 |
| 34 | suction-side | 0.126 | 0.105 | 1.000 |
| 35 | suction-side | 0.127 | 0.104 | 1.000 |
| 36 | suction-side | 0.128 | 0.102 | 1.000 |
| 37 | suction-side | 0.129 | 0.100 | 1.000 |
| 38 | suction-side | 0.130 | 0.099 | 1.000 |
| 39 | suction-side | 0.131 | 0.097 | 1.000 |
| 40 | suction-side | 0.132 | 0.095 | 1.000 |
| 41 | suction-side | 0.133 | 0.094 | 1.000 |
| 42 | suction-side | 0.134 | 0.092 | 1.000 |
| 43 | suction-side | 0.135 | 0.091 | 1.000 |
| 44 | suction-side | 0.136 | 0.089 | 1.000 |
| 45 | suction-side | 0.137 | 0.087 | 1.000 |
| 46 | suction-side | 0.138 | 0.086 | 1.000 |
| 47 | suction-side | 0.139 | 0.084 | 1.000 |
| 48 | suction-side | 0.140 | 0.082 | 1.000 |
| 49 | suction-side | 0.142 | 0.081 | 1.000 |
| 50 | suction-side | 0.143 | 0.079 | 1.000 |
| 51 | suction-side | 0.144 | 0.077 | 1.000 |
| 52 | suction-side | 0.145 | 0.076 | 1.000 |
| 53 | suction-side | 0.146 | 0.074 | 1.000 |
| 54 | suction-side | 0.147 | 0.073 | 1.000 |
| 55 | suction-side | 0.148 | 0.071 | 1.000 |
| 56 | suction-side | 0.149 | 0.069 | 1.000 |
| 57 | suction-side | 0.150 | 0.068 | 1.000 |
| 58 | suction-side | 0.151 | 0.066 | 1.000 |
| 59 | suction-side | 0.152 | 0.064 | 1.000 |
| 60 | suction-side | 0.153 | 0.063 | 1.000 |
| 61 | suction-side | 0.154 | 0.061 | 1.000 |
| 62 | suction-side | 0.155 | 0.059 | 1.000 |
| 63 | suction-side | 0.156 | 0.058 | 1.000 |
| 64 | suction-side | 0.157 | 0.056 | 1.000 |
| 65 | suction-side | 0.158 | 0.055 | 1.000 |
| 66 | suction-side | 0.159 | 0.053 | 1.000 |
| 67 | suction-side | 0.160 | 0.051 | 1.000 |
| 68 | suction-side | 0.161 | 0.050 | 1.000 |
| 69 | suction-side | 0.162 | 0.048 | 1.000 |
| 70 | suction-side | 0.163 | 0.046 | 1.000 |
| 71 | suction-side | 0.164 | 0.045 | 1.000 |
| 72 | suction-side | 0.165 | 0.043 | 1.000 |
| 73 | suction-side | 0.166 | 0.042 | 1.000 |
| 74 | suction-side | 0.167 | 0.040 | 1.000 |
| 75 | suction-side | 0.168 | 0.038 | 1.000 |
| 76 | suction-side | 0.169 | 0.037 | 1.000 |
| 77 | suction-side | 0.170 | 0.035 | 1.000 |

TABLE I-continued

Non-Dimensionalized (X Y Z/Span)

| N | Location | X | Y | Z |
|---|---|---|---|---|
| 78 | suction-side | 0.171 | 0.033 | 1.000 |
| 79 | suction-side | 0.172 | 0.032 | 1.000 |
| 80 | suction-side | 0.173 | 0.030 | 1.000 |
| 81 | suction-side | 0.174 | 0.029 | 1.000 |
| 82 | suction-side | 0.175 | 0.027 | 1.000 |
| 83 | suction-side | 0.176 | 0.025 | 1.000 |
| 84 | suction-side | 0.177 | 0.024 | 1.000 |
| 85 | suction-side | 0.178 | 0.022 | 1.000 |
| 86 | suction-side | 0.179 | 0.020 | 1.000 |
| 87 | suction-side | 0.180 | 0.019 | 1.000 |
| 88 | suction-side | 0.181 | 0.017 | 1.000 |
| 89 | suction-side | 0.182 | 0.016 | 1.000 |
| 90 | suction-side | 0.184 | 0.014 | 1.000 |
| 91 | suction-side | 0.185 | 0.012 | 1.000 |
| 92 | suction-side | 0.186 | 0.011 | 1.000 |
| 93 | suction-side | 0.187 | 0.009 | 1.000 |
| 94 | suction-side | 0.187 | 0.004 | 1.000 |
| 95 | suction-side | 0.188 | 0.007 | 1.000 |
| 96 | suction-side | 0.188 | 0.004 | 1.000 |
| 97 | suction-side | 0.188 | 0.005 | 1.000 |
| 98 | suction-side | 0.188 | 0.005 | 1.000 |
| 99 | suction-side | 0.188 | 0.006 | 1.000 |
| 100 | suction-side | 0.188 | 0.006 | 1.000 |
| 101 | pressure-side | 0.081 | 0.143 | 1.000 |
| 102 | pressure-side | 0.081 | 0.145 | 1.000 |
| 103 | pressure-side | 0.082 | 0.142 | 1.000 |
| 104 | pressure-side | 0.084 | 0.140 | 1.000 |
| 105 | pressure-side | 0.085 | 0.139 | 1.000 |
| 106 | pressure-side | 0.087 | 0.138 | 1.000 |
| 107 | pressure-side | 0.089 | 0.137 | 1.000 |
| 108 | pressure-side | 0.090 | 0.136 | 1.000 |
| 109 | pressure-side | 0.092 | 0.135 | 1.000 |
| 110 | pressure-side | 0.094 | 0.134 | 1.000 |
| 111 | pressure-side | 0.095 | 0.133 | 1.000 |
| 112 | pressure-side | 0.097 | 0.132 | 1.000 |
| 113 | pressure-side | 0.098 | 0.131 | 1.000 |
| 114 | pressure-side | 0.100 | 0.130 | 1.000 |
| 115 | pressure-side | 0.101 | 0.129 | 1.000 |
| 116 | pressure-side | 0.103 | 0.128 | 1.000 |
| 117 | pressure-side | 0.104 | 0.126 | 1.000 |
| 118 | pressure-side | 0.105 | 0.125 | 1.000 |
| 119 | pressure-side | 0.106 | 0.124 | 1.000 |
| 120 | pressure-side | 0.108 | 0.122 | 1.000 |
| 121 | pressure-side | 0.109 | 0.121 | 1.000 |
| 122 | pressure-side | 0.110 | 0.119 | 1.000 |
| 123 | pressure-side | 0.111 | 0.118 | 1.000 |
| 124 | pressure-side | 0.112 | 0.116 | 1.000 |
| 125 | pressure-side | 0.114 | 0.115 | 1.000 |
| 126 | pressure-side | 0.115 | 0.113 | 1.000 |
| 127 | pressure-side | 0.116 | 0.112 | 1.000 |
| 128 | pressure-side | 0.117 | 0.110 | 1.000 |
| 129 | pressure-side | 0.118 | 0.109 | 1.000 |
| 130 | pressure-side | 0.119 | 0.107 | 1.000 |
| 131 | pressure-side | 0.120 | 0.105 | 1.000 |
| 132 | pressure-side | 0.121 | 0.104 | 1.000 |
| 133 | pressure-side | 0.122 | 0.102 | 1.000 |
| 134 | pressure-side | 0.123 | 0.101 | 1.000 |
| 135 | pressure-side | 0.124 | 0.099 | 1.000 |
| 136 | pressure-side | 0.125 | 0.097 | 1.000 |
| 137 | pressure-side | 0.126 | 0.096 | 1.000 |
| 138 | pressure-side | 0.127 | 0.094 | 1.000 |
| 139 | pressure-side | 0.128 | 0.093 | 1.000 |
| 140 | pressure-side | 0.129 | 0.091 | 1.000 |
| 141 | pressure-side | 0.130 | 0.089 | 1.000 |
| 142 | pressure-side | 0.131 | 0.088 | 1.000 |
| 143 | pressure-side | 0.132 | 0.086 | 1.000 |
| 144 | pressure-side | 0.133 | 0.085 | 1.000 |
| 145 | pressure-side | 0.134 | 0.083 | 1.000 |
| 146 | pressure-side | 0.135 | 0.082 | 1.000 |
| 147 | pressure-side | 0.136 | 0.080 | 1.000 |
| 148 | pressure-side | 0.137 | 0.078 | 1.000 |
| 149 | pressure-side | 0.138 | 0.077 | 1.000 |
| 150 | pressure-side | 0.139 | 0.075 | 1.000 |
| 151 | pressure-side | 0.140 | 0.074 | 1.000 |
| 152 | pressure-side | 0.141 | 0.072 | 1.000 |
| 153 | pressure-side | 0.142 | 0.070 | 1.000 |
| 154 | pressure-side | 0.143 | 0.069 | 1.000 |
| 155 | pressure-side | 0.144 | 0.067 | 1.000 |
| 156 | pressure-side | 0.146 | 0.066 | 1.000 |
| 157 | pressure-side | 0.147 | 0.064 | 1.000 |
| 158 | pressure-side | 0.148 | 0.062 | 1.000 |
| 159 | pressure-side | 0.149 | 0.061 | 1.000 |
| 160 | pressure-side | 0.150 | 0.059 | 1.000 |
| 161 | pressure-side | 0.151 | 0.058 | 1.000 |
| 162 | pressure-side | 0.152 | 0.056 | 1.000 |
| 163 | pressure-side | 0.153 | 0.054 | 1.000 |
| 164 | pressure-side | 0.154 | 0.053 | 1.000 |
| 165 | pressure-side | 0.155 | 0.051 | 1.000 |
| 166 | pressure-side | 0.156 | 0.050 | 1.000 |
| 167 | pressure-side | 0.157 | 0.048 | 1.000 |
| 168 | pressure-side | 0.158 | 0.046 | 1.000 |
| 169 | pressure-side | 0.159 | 0.045 | 1.000 |
| 170 | pressure-side | 0.160 | 0.043 | 1.000 |
| 171 | pressure-side | 0.161 | 0.042 | 1.000 |
| 172 | pressure-side | 0.162 | 0.040 | 1.000 |
| 173 | pressure-side | 0.163 | 0.038 | 1.000 |
| 174 | pressure-side | 0.164 | 0.037 | 1.000 |
| 175 | pressure-side | 0.165 | 0.035 | 1.000 |
| 176 | pressure-side | 0.166 | 0.034 | 1.000 |
| 177 | pressure-side | 0.167 | 0.032 | 1.000 |
| 178 | pressure-side | 0.168 | 0.030 | 1.000 |
| 179 | pressure-side | 0.169 | 0.029 | 1.000 |
| 180 | pressure-side | 0.170 | 0.027 | 1.000 |
| 181 | pressure-side | 0.171 | 0.026 | 1.000 |
| 182 | pressure-side | 0.172 | 0.024 | 1.000 |
| 183 | pressure-side | 0.173 | 0.022 | 1.000 |
| 184 | pressure-side | 0.174 | 0.021 | 1.000 |
| 185 | pressure-side | 0.175 | 0.019 | 1.000 |
| 186 | pressure-side | 0.176 | 0.018 | 1.000 |
| 187 | pressure-side | 0.177 | 0.016 | 1.000 |
| 188 | pressure-side | 0.178 | 0.014 | 1.000 |
| 189 | pressure-side | 0.179 | 0.013 | 1.000 |
| 190 | pressure-side | 0.180 | 0.011 | 1.000 |
| 191 | pressure-side | 0.181 | 0.010 | 1.000 |
| 192 | pressure-side | 0.182 | 0.008 | 1.000 |
| 193 | pressure-side | 0.183 | 0.007 | 1.000 |
| 194 | pressure-side | 0.184 | 0.005 | 1.000 |
| 195 | pressure-side | 0.186 | 0.004 | 1.000 |
| 196 | pressure-side | 0.186 | 0.004 | 1.000 |
| 197 | pressure-side | 0.186 | 0.004 | 1.000 |
| 198 | pressure-side | 0.187 | 0.004 | 1.000 |
| 199 | pressure-side | 0.187 | 0.004 | 1.000 |
| 200 | pressure-side | 0.187 | 0.004 | 1.000 |

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. In a turbomachine including a row of substantially identical buckets circumferentially mounted on a rotor, each bucket including a respective airfoil with opposed pressure and suction sidewalls extending chordwise between opposed leading and trailing edges and spanwise between a root and a tip, a flow passage between each pair of airfoils, each flow passage comprising:
   a pressure sidewall of a first airfoil;
   a suction sidewall of a second airfoil substantially facing the pressure sidewall of the first airfoil; and
   a throat including an area defined at least in part by a minimum gap between the pressure sidewall of the first airfoil and the suction sidewall of the second airfoil for each corresponding chord along spans of the first and second airfoils, a width of the throat at at least one of the tips or the roots of the airfoils being no more than about 15% more than a width of the throat at a respective first or second distance from the at least one of the tips or the roots.

2. The flow passage of claim 1, wherein the first distance is no more than about 25% of the span of one of the first airfoil or the second airfoil.

3. The flow passage of claim 2, wherein the first distance is no more than about 20% of the span of the one of the first airfoil or the second airfoil.

4. The flow passage of claim 1, wherein the width of the throat increases by no more than about 10% of a width of the throat at the at least one of the first or second distance.

5. The flow passage of claim 1, wherein an absolute value of a rate of change of the width of the throat versus span increases with decreasing distance to at least one of the tips or the roots of the first and second airfoils within the first distance from the at least one of the tips or the roots.

6. The flow passage of claim 1, wherein the first distance and the second distance are no more than about 20% of a span of the first airfoil, a width of the throat at the tips is no more than about 10% wider than the width of the throat at the first distance, and a width of the throat at the roots is no more than about 10% wider than the width of the throat at the second distance.

7. The flow passage of claim 1, wherein at least one of the suction sidewall or the pressure sidewall of at least one airfoil includes a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall.

8. The flow passage of claim 1, further comprising a first end bounded at least in part by a first endwall extending between one of the roots or the tips of the first and second airfoils.

9. The flow passage of claim 8, wherein the row of substantially identical buckets is part of a diffuser of an axial turbine.

10. The flow passage of claim 1, wherein the row of substantially identical buckets is in a last stage of an axial turbine.

11. A stage of a turbine comprising:
    a plurality of airfoils mounted on a rotor of a turbine about an axis of rotation of the turbine in a substantially circumferential, spaced-apart fashion, each airfoil including respective opposed pressure and suction sidewalls extending chordwise between respective opposed leading and trailing edges and spanwise between opposed inner and outer endwalls, a respective root of each airfoil connected to one of the inner and outer endwalls, and at least one of the suction sidewall or the pressure sidewall including a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall; and
    a total throat including a component throat between adjacent airfoils of the plurality of airfoils, each component throat including a minimum gap between a pressure sidewall of a first airfoil and a suction sidewall of a second airfoil adjacent to the first airfoil for all corresponding points along spans of the first and second airfoils, a width of the component throat increasing with decreasing distance to at least one of the tips of the roots within a first distance away from the at least one of the tips or the roots.

12. The turbine nozzle of claim 11, wherein an absolute value of a rate of change of the width of the component throat with respect to span also increases with decreasing distance to the at least one of the tips of the roots within the first distance away from the at least one of the tips or the roots.

13. The turbine nozzle of claim 11, wherein the width of the component throat at at least one of the tips or the roots is no more than about 15% wider than a respective width of the component throat at the first distance away from the respective at least one of the tips or the roots.

14. The turbine nozzle of claim 13, wherein the width of the component throat at the tips is no more than about 115% of the width of the component throat at about 75% span.

15. The turbine nozzle of claim 13, wherein width of the component throat at the roots is no more than about 115% of the width of the component throat at about 25% span.

16. The turbine nozzle of claim 11, wherein the stage is a last stage of an axial turbine.

17. The turbine nozzle of claim 11, wherein both the pressure sidewall and the suction sidewall of each airfoil includes a nominal profile substantially in accordance with non-dimensional Cartesian coordinate values of X, Y, and Z set forth in TABLE I, wherein the coordinate values are convertible to distances by multiplying the values by a desired span expressed in units of distance, and wherein X and Y values connected by smooth continuing arcs define airfoil profile sections at each distance Z along the airfoil, the profile sections at the Z distances being joined smoothly with one another to form the airfoil profile.

18. A turbine system comprising:
    a compressor section;
    a combustion section; and
    a turbine section, wherein a stage of the turbine section includes a plurality of substantially identical airfoils substantially circumferentially spaced apart about an axis of rotation of the turbine section, each airfoil including opposed pressure and suction sidewalls extending chordwise between opposed leading and trailing edges and spanwise between opposed respective roots and tips, and at least one of the suction sidewall or the pressure sidewall of each airfoil including a nominal profile substantially in accordance with non-dimensional Cartesian coordinate values of X, Y, and Z set forth in TABLE I, wherein the coordinate values are non-dimensionalized and convertible to distances by multiplying the coordinate values by a desired span in units of distance, and wherein X and Y values connected by smooth continuing arcs define profile sections of the at least one of the suction sidewall or the pressure sidewall at each distance Z along the airfoil, the profile sections at the Z distances being joined smoothly with one another to form the profile of the at least one of the suction sidewall or the pressure sidewall; and a total throat including a component throat between each pair of adjacent airfoils, each component throat including an area defined at least in part by a minimum gap between a pressure sidewall of a first airfoil and a suction sidewall of an adjacent second airfoil for all points along spans of the first and second airfoils.

19. The turbine system of claim 18, wherein a width of the component throat increases with decreasing distance to the roots of the first and second airfoils within a first distance from the roots and within a second distance from the tips, and at least one of the first distance or the second distance is no more than 25% of the spans of the first and second airfoils.

20. The turbine system of claim 18, wherein a width of the component throat at at least one of the roots or the tips is no more than about 110% of the width of the component throat at about 20% span away from the respective at least one of the roots or the tips.

* * * * *